US012632997B2

(12) United States Patent
Lee et al.

(10) Patent No.: US 12,632,997 B2
(45) Date of Patent: May 19, 2026

(54) POINT CLOUD DATA TRANSMISSION DEVICE, POINT CLOUD DATA TRANSMISSION METHOD, POINT CLOUD DATA RECEPTION DEVICE, AND POINT CLOUD DATA RECEPTION METHOD

(71) Applicant: LG ELECTRONICS INC., Seoul (KR)

(72) Inventors: Sooyeon Lee, Seoul (KR); Sejin Oh, Seoul (KR); Yousun Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 411 days.

(21) Appl. No.: 18/015,835

(22) PCT Filed: Jul. 13, 2021

(86) PCT No.: PCT/KR2021/008940
§ 371 (c)(1),
(2) Date: Jan. 12, 2023

(87) PCT Pub. No.: WO2022/015006
PCT Pub. Date: Jan. 20, 2022

(65) Prior Publication Data
US 2023/0260163 A1     Aug. 17, 2023

(30) Foreign Application Priority Data
Jul. 13, 2020     (KR) ........................ 10-2020-0085870

(51) Int. Cl.
*G06T 9/40* (2006.01)
*G06T 17/00* (2006.01)

(52) U.S. Cl.
CPC ................ *G06T 9/40* (2013.01); *G06T 17/00* (2013.01); *G06T 2210/56* (2013.01)

(58) Field of Classification Search
None
See application file for complete search history.

(56) References Cited

U.S. PATENT DOCUMENTS 10,609,423 B2 * 3/2020 Chuang .................. H04N 19/96
2020/0107048 A1 * 4/2020 Yea ...................... H04N 19/169
(Continued)

FOREIGN PATENT DOCUMENTS

KR     1020190044629     4/2019

OTHER PUBLICATIONS

Zhang et al., "Implicit Geometry Partition for Point Cloud Compression", 2020 (Year: 2020).*

(Continued)

*Primary Examiner* — Hilina K Demeter
(74) *Attorney, Agent, or Firm* — BRYAN CAVE LEIGHTON PAISNER LLP

(57) ABSTRACT

A point cloud data transmission method according to embodiments may comprise the steps of: acquiring point cloud data; encoding geometry information including the positions of points of the point cloud data; encoding, on the basis of the geometry information, attribute information including attribute values of the points of the point cloud data; and transmitting the encoded geometry information, the encoded attribute information, and signaling information.

20 Claims, 44 Drawing Sheets

(56) References Cited

U.S. PATENT DOCUMENTS

| | | | | | |
|---|---|---|---|---|---|
| 2021/0218994 | A1* | 7/2021 | Flynn | ................... | G06T 9/001 |
| 2021/0312670 | A1* | 10/2021 | Mammou | .............. | G06T 9/40 |

OTHER PUBLICATIONS

Li et al., "Advanced 3D Motion Prediction for Video-Based Dynamic Point Cloud Compression", (Year: 2020).*

Lu et al., "MoNet: Motion-Based Point Cloud Prediction Network", (Year: 2022).*

Li et al., "Motion Estimation and Coding Structure for Inter-Prediction of LiDAR Point Cloud", (Year: 2021).*

Mammou, Khaled et al., "G-PCC codec description v2", International Organisation for Standardisation Organisation Internationale De Normalisation ISO/IEC JTC1/SC29/WG11 Coding of Moving Pictures and Audio. N18189. Jan. 2019, Marrakech, MA.

Gao, Zhen et al., "[G-PCC] [New proposal] Predictive Geometry Coding", International Organisation for Standardisation Organisation Internationale De Normalisation ISO/IEC JTC1/SC29/WG11 Coding of Moving Pictures and Audio. Oct. 2019, Geneva, CH.

Flynn, David, et al., "G-PCC: Combined octree-predictive geometry coding", International Organisation for Standardisation Organisation Internationale De Normalisation ISO/IEC JTC1/SC29/WG11 Coding of Moving Pictures and Audio. Jan. 2020, Brussels, Belgium.

Flynn, David, et al., "G-PCC: An IDCM specific QP for in-tree geometry quantisation", International Organisation for Standardisation Organisation Internationale De Normalisation ISO/IEC JTCI/SC29AVG11 Coding of Moving Pictures and Audio. Jamiary 2020, Brussels, Belgium.

* cited by examiner

FIG. 3
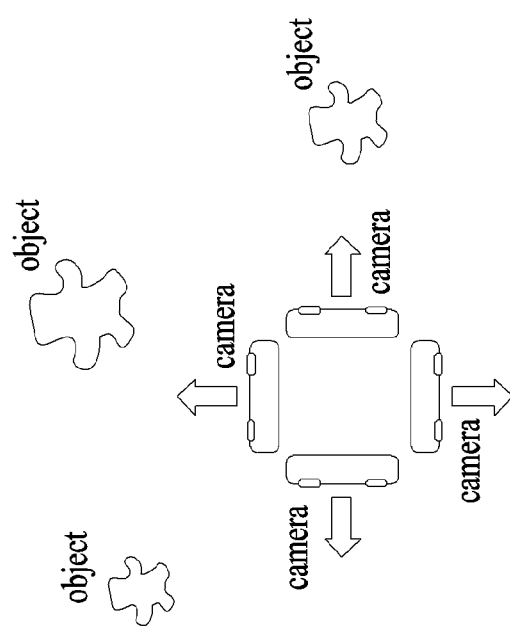
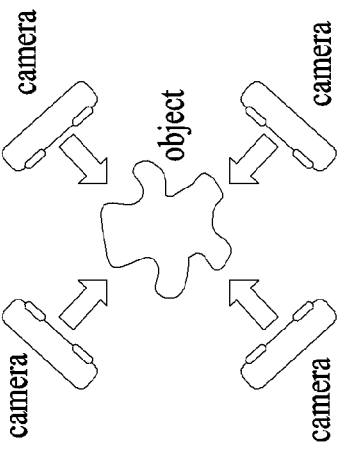

FIG. 7
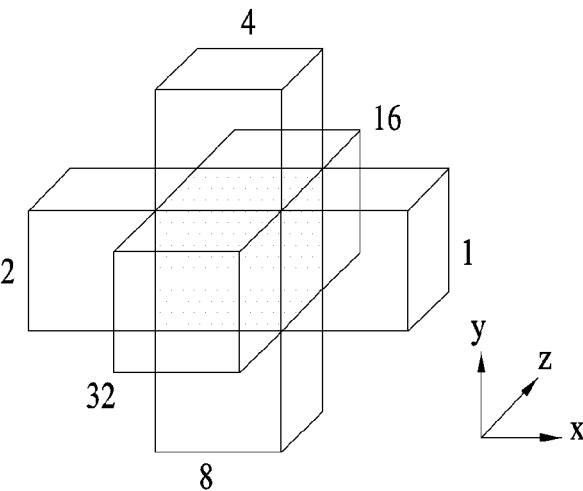
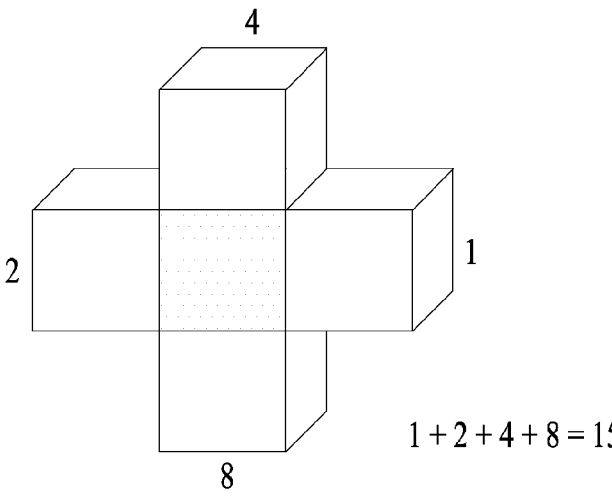
$$1 + 2 + 4 + 8 = 15$$

Level of details

FIG. 17

| mode | Equation |
|---|---|
| Mode 0 (no prediction) | |
| Mode1 (Delta prediction) | $p0$ |
| Mode2 (linear prediction) | $2p0 - p1$ |
| Mode3 (Parallelogram prediction) | $p0+p1-p2$ |

FIG. 22

| seq_parameter_set( ) { | Descriptor |
|---|---|
| main_profile_compatibility_flag | u(1) |
| unique_point_positions_constraint_flag | u(1) |
| level_idc | u(8) |
| sps_seq_parameter_set_id | ue(v) |
| sps_bounding_box_present_flag | u(1) |
| if( sps_bounding_box_present_flag ) { | |
| sps_bounding_box_offset_x | se(v) |
| sps_bounding_box_offset_y | se(v) |
| sps_bounding_box_offset_z | se(v) |
| sps_bounding_box_offset_log2_scale | ue(v) |
| sps_bounding_box_size_width | ue(v) |
| sps_bounding_box_size_height | ue(v) |
| sps_bounding_box_size_depth | ue(v) |
| } | |
| sps_source_scale_factor_numerator_minus1 | ue(v) |
| sps_source_scale_factor_denominator_minus1 | ue(v) |
| sps_num_attribute_sets | ue(v) |
| for( i = 0; i< sps_num_attribute_sets; i++ ) { | |
| attribute_dimension_minus1[ i ] | ue(v) |
| attribute_instance_id[ i ] | ue(v) |
| if(attribute_dimension_minus1[ i ] > 0 ) | |
| attribute_secondary_bitdepth_minus1[ i ] | ue(v) |
| attribute_cicp_colour_primaries[ i ] | ue(v) |
| attribute_cicp_transfer_characteristics[ i ] | ue(v) |
| attribute_cicp_matrix_coeffs[ i ] | ue(v) |
| attribute_cicp_video_full_range_flag[ i ] | u(1) |
| known_attribute_label_flag[ i ] | u(1) |
| if( known_attribute_label_flag[ i ] ) | |
| known_attribute_label[ i ] | ue(v) |
| else | |
| attribute_label_four_bytes[ i ] | u(32) |
| } | |
| log2_max_frame_idx | u(5) |
| axis_coding_order | u(3) |
| sps_bypass_stream_enabled_flag | u(1) |
| sps_extension_flag | u(1) |
| if( sps_extension_flag ) | |
| while( more_data_in_byte_stream( ) ) | |
| sps_extension_data_flag | u(1) |
| byte_alignment( ) | |
| } | |

FIG. 23

| seq_parameter_set_rbsp( ) { | Descriptor |
|---|---|
| ... | |
| IDCM_flag | u(1) |
| If(IDCM_flag) { | |
| IDCM_threshold_low | ue(v) |
| IDCM_threshold_high | ue(v) |
| IDCM_track_mode | ue(v) |
| IDCM_slice_index[] | ue(v) |
| IDCM_original_index[] | ue(v) |
| imaginary_point_prediction_mode<br>} | ue(v) |
| ... | |
| } | |

FIG. 24

| IDCM_track_mode | description |
|---|---|
| 0001 | Mode1 |
| 0010 | Mode2 |
| 0011 | Mode3 |
| 0100 | Mode4 |
| 0101 - 1111 | Reserved |

FIG. 25

| imaginary_point_prediction_mode | description |
|---|---|
| 0001 | Mode1 |
| 0010 | Mode2 |
| 0011 | Mode3 |
| 0100 | Mode4 |
| 0101 - 1111 | Reserved |

FIG. 26

| tile_parameter_set( ) { | Descriptor |
|---|---|
| num_tiles | ue(v) |
| for( i = 0; i < num_tiles; i++ ) { | |
| tile_bounding_box_offset_x[ i ] | se(v) |
| tile_bounding_box_offset_y[ i ] | se(v) |
| tile_bounding_box_offset_z[ i ] | se(v) |
| tile_bounding_box_size_width[ i ] | ue(v) |
| tile_bounding_box_size_height[ i ] | ue(v) |
| tile_bounding_box_size_depth[ i ]  } | ue(v) |
| byte_alignment( ) | |
| } | |
| | |

FIG. 27

| tile_parameter_set( ) { <br> … | Descriptor |
|---|---|
| IDCM_flag | u(1) |
| If(IDCM_flag) { | |
|   IDCM_threshold_low | ue(v) |
|   IDCM_threshold_high | ue(v) |
|   IDCM_track_mode | ue(v) |
|   IDCM_slice_index[] | ue(v) |
|   IDCM_original_index[] | ue(v) |
|   imaginary_point_prediction_mode | ue(v) |
|   } | |
| … | |
| } | |

FIG. 28

| geometry_parameter_set( ) { | Descriptor |
|---|---|
|    gps_geom_parameter_set_id | ue(v) |
|    gps_seq_parameter_set_id | ue(v) |
|    gps_box_present_flag | u(1) |
|    if ( gps_box_present_flag ){ | |
|      gps_gsh_box_log2_scale_present_flag | u(1) |
|      if ( gps_gsh_box_log2_scale_present_flag == 0 ) | |
|        gps_gsh_box_log2_scale | ue(v) |
|    } | |
|    unique_geometry_points_flag | u(1) |
|    geometry_planar_mode_flag | u(1) |
|    if( geometry_planar_mode_flag ){ | |
|      geom_planar_mode_th_idcm | ue(v) |
|      geom_planar_mode_th[ 1 ] | ue(v) |
|      geom_planar_mode_th[ 2 ] | ue(v) |
|    } | |
|    geometry_angular_mode_flag | u(1) |
|    if ( geometry_angular_mode_flag ){ | |
|      lidar_head_position[0] | se(v) |
|      lidar_head_position[1] | se(v) |
|      lidar_head_position[2] | se(v) |
|      number_lasers | ue(v) |
|      for( i = 0; i < number_lasers; i++ ) { | |
|        laser_angle[ i ] | se(v) |
|        laser_correction[ i ] | se(v) |
|      } | |
|      planar_buffer_disabled | u(1) |
|      implicit_qtbt_angular_max_node_min_dim_log2_to_split_z | se(v) |
|      implicit_qtbt_angular_max_diff_to_split_z | se(v) |
|    } | |
|    neighbour_context_restriction_flag | u(1) |
|    inferred_direct_coding_mode_enabled_flag | u(1) |
|    bitwise_occupancy_coding_flag | u(1) |
|    adjacent_child_contextualization_enabled_flag | u(1) |
|    log2_neighbour_avail_boundary | ue(v) |
|    log2_intra_pred_max_node_size | ue(v) |
|    log2_trisoup_node_size | ue(v) |
|    geom_scaling_enabled_flag | u(1) |
|    if ( geom_scaling_enabled_flag ) | |
|      geom_base_qp | ue(v) |
|    gps_implicit_geom_partition_flag | u(1) |
|    if ( gps_implicit_geom_partition_flag ) { | |
|      gps_max_num_implicit_qtbt_before_ot | ue(v) |
|      gps_min_size_implicit_qtbt | ue(v) |
|    } | |
|    gps_extension_flag | u(1) |
|    if ( gps_extension_flag ) | |
|      while( more_data_in_byte_stream ( ) ) | |
|        gps_extension_data_flag | u(1) |
|    byte_alignment( ) | |
| } | |

FIG. 29

| geometry_parameter_set( ) { | Descriptor |
|---|---|
| ... | |
| IDCM_flag | u(1) |
| If(IDCM_flag) { | |
| IDCM_threshold_low | ue(v) |
| IDCM_threshold_high | ue(v) |
| IDCM_track_mode | ue(v) |
| IDCM_slice_index[] | ue(v) |
| IDCM_original_index[] | ue(v) |
| imaginary_point_prediction_mode | ue(v) |
| } | |
| ... | |
| } | |

FIG. 30

| attribute_parameter_set ( ) { | Descriptor |
|---|---|
| aps_attr_parameter_set_id | ue(v) |
| aps_seq_parameter_set_id | ue(v) |
| attr_coding_type | ue(v) |
| aps_attr_initial_qp | ue(v) |
| aps_attr_chroma_qp_offset | se(v) |
| aps_slice_qp_delta_present_flag | u(1) |
| LodParametersPresent = ( attr_coding_type == 0 || attr_coding_type == 2 ) ? 1 : 0 | |
| if ( LodParametersPresent ) { | |
|   lifting_num_pred_nearest_neighbours_minus1 | ue(v) |
|   lifting_search_range_minus1 | ue(v) |
|   for ( k = 0; k < 3; k++ ) | |
|     lifting_neighbour_bias[ k ] | ue(v) |
|   if ( attr_coding_type == 2 ) | |
|     lifting_scalability_enabled_flag | u(1) |
|   if ( ! lifting_scalability_enabled_flag ) { | |
|     lifting_num_detail_levels_minus1<br>[Ed. The V7.0 code use the variable without minus1. It should be aligned] | ue(v) |
|     if ( lifting_num_detail_levels_minus1 > 0 ) { | |
|       lifting_lod_regular_sampling_enabled_flag | u(1) |
|       for ( idx = 0; idx < num_detail_levels_minus1; idx++ ) { | |
|         if ( lifting_lod_regular_sampling_enabled_flag ) | |
|           lifting_sampling_period_minus2[ idx ] | ue(v) |
|         else | |
|           lifting_sampling_distance_squared_scale_minus1[ idx ] | ue(v) |
|         if ( idx != 0 ) | |
|           lifting_sampling_distance_squared_offset[ idx ] | ue(v) |
|       } | |
|     } | |
|   } | |
|   if ( attr_coding_type == 0 ) { | |
|     lifting_adaptive_prediction_threshold | ue(v) |
|     lifting_intra_lod_prediction_num_layers | ue(v) |
|     lifting_max_num_direct_predictors | ue(v) |
|     inter_component_prediction_enabled_flag | u(1) |
|   } | |
| } | |
| if ( attribute_coding_type == 1 ) { //RAHT | |
|   raht_prediction_enabled_flag | u(1) |
|   if (raht_prediction_enabled_flag) { | |
|   raht_prediction_threshold0 | ue(v) |
|     raht_prediction_threshold1 | ue(v) |
|   } | |
| } | |
| aps_extension_flag | u(1) |
| if( aps_extension_flag ) | |
|   while( more_data_in_byte_stream( ) ) | |
|     aps_extension_data_flag | u(1) |
| byte_alignment( ) | |
| } | |

FIG. 31

| attribute_parameter_set( ) { | Descriptor |
|---|---|
| ... | |
| IDCM_flag | u(1) |
| If(IDCM_flag) { | |
| IDCM_threshold_low | ue(v) |
| IDCM_threshold_high | ue(v) |
| IDCM_track_mode | ue(v) |
| IDCM_slice_index[] | ue(v) |
| IDCM_original_index[] | ue(v) |
| imaginary_point_prediction_mode | ue(v) |
| } | |
| ... | |
| } | |

FIG. 32

| geometry_slice_bitstream( ) { | Descriptor |
|---|---|
| geometry_slice_header( ) | |
| geometry_slice_data( ) | |
| } | |

FIG. 33

| geometry_slice_header( ) { | Descriptor |
|---|---|
| gsh_geometry_parameter_set_id | ue(v) |
| gsh_tile_id | ue(v) |
| gsh_slice_id | ue(v) |
| frame_idx | u(n) |
| gsh_num_points | u(24) |
| if( gps_box_present_flag ) { | |
|    if( gps_gsh_box_log2_scale_present_flag ) | |
|       gsh_box_log2_scale | ue(v) |
|    gsh_box_origin_x | ue(v) |
|    gsh_box_origin_y | ue(v) |
|    gsh_box_origin_z | ue(v) |
| } | |
| if ( gps_implicit_geom_partition_flag ) { | |
|    gsh_log2_max_nodesize_x | ue(v) |
|    gsh_log2_max_nodesize_y_minus_x | se(v) |
|    gsh_log2_max_nodesize_z_minus_y | se(v) |
| } else { | |
|    gsh_log2_max_nodesize | ue(v) |
| } | |
| if( geom_scaling_enabled_flag ) { | |
|    geom_slice_qp_offset | se(v) |
|    geom_octree_qp_offsets_enabled_flag | u(1) |
|    if( geom_octree_qp_offsets_enabled_flag ) | |
|       geom_octree_qp_offsets_depth | ue(v) |
| } | |
| byte_alignment( ) | |
| } | |

FIG. 34

| geometry_slice_header( ) { | Descriptor |
|---|---|
| ... | |
| IDCM_flag | u(1) |
| If(IDCM_flag) { | |
| IDCM_threshold_low | ue(v) |
| IDCM_threshold_high | ue(v) |
| IDCM_track_mode | ue(v) |
| IDCM_slice_index[] | ue(v) |
| IDCM_original_index[] | ue(v) |
| imaginary_point_prediction_mode | ue(v) |
| } | |
| ... | |
| } | |

FIG. 35

| geometry_slice_data( ) { | Descriptor |
|---|---|
| for( depth = 0; depth < MaxGeometryOctreeDepth; depth++ ) { | |
| for( nodeIdx = 0; nodeIdx < NumNodesAtDepth[ depth ]; nodeIdx++ ) { | |
| xN = NodeX[ depth ][ nodeIdx ] | |
| yN = NodeY[ depth ][ nodeIdx ] | |
| zN = NodeZ[ depth ][ nodeIdx ] | |
| geometry_node( depth, nodeIdx, xN, yN, zN ) | |
| } | |
| } | |
| if ( log2_trisoup_node_size > 0 ) | |
| geometry_trisoup_data( ) | |
| } | |

FIG. 36

| geometry_slice_data( ) { | Descriptor |
|---|---|
| ... | |
| IDCM_flag | u(1) |
| If(IDCM_flag) { | |
| IDCM_threshold_low | ue(v) |
| IDCM_threshold_high | ue(v) |
| IDCM_track_mode | ue(v) |
| IDCM_slice_index[] | ue(v) |
| IDCM_original_index[] | ue(v) |
| imaginary_point_prediction_mode | ue(v) |
| } | |
| ... | |
| } | |

FIG. 37

| | Descriptor |
|---|---|
| attribute_slice_bitstream( ) { | |
| attribute_slice_header( ) | |
| attribute_slice_data( ) | |
| ~ | |

FIG. 38

| attribute_slice_header( ) { | Descriptor |
|---|---|
| ash_attr_parameter_set_id | ue(v) |
| ash_attr_sps_attr_idx | ue(v) |
| ash_attr_geom_slice_id | ue(v) |
| if ( aps_slice_qp_delta_present_flag ) { | |
| ash_attr_qp_delta_luma | se(v) |
| if( attribute_dimension_minus1[ ash_attr_sps_attr_idx ] > 0 ) | |
| ash_attr_qp_delta_chroma | se(v) |
| } | |
| ash_attr_layer_qp_delta_present_flag | u(1) |
| if ( ash_attr_layer_qp_delta_present_flag ) { | |
| ash_attr_num_layer_qp_minus1 | ue(v) |
| for( i = 0; i < NumLayerQp; i++ ){ | |
| ash_attr_layer_qp_delta_luma[i] | se(v) |
| if( attribute_dimension_minus1[ ash_attr_sps_attr_idx ] > 0 ) | |
| ash_attr_layer_qp_delta_chroma[i] | se(v) |
| } | |
| } | |
| ash_attr_region_qp_delta_present_flag | u(1) |
| if ( ash_attr_region_qp_delta_present_flag ) { | |
| ash_attr_qp_region_box_origin_x | ue(v) |
| ash_attr_qp_region_box_origin_y | ue(v) |
| ash_attr_qp_region_box_origin_z | ue(v) |
| ash_attr_qp_region_box_width | ue(v) |
| ash_attr_qp_region_box_height | ue(v) |
| ash_attr_qp_region_box_depth | ue(v) |
| ash_attr_region_qp_delta | se(v) |
| } | |
| byte_alignment( ) | |
| } | |

FIG. 39

| attribute_slice_data( ) { | Descriptor |
|---|---|
|     dimension = attribute_dimension[ ash_attr_sps_attr_idx ] | |
|     zerorun | ae(v) |
|     for( i = 0; i < pointCount; i++ ) { | |
|     if( attr_coding_type == 0 && | |
|         maxPredDiff[ i ] > lifting_adaptive_prediction_threshold && | |
|         MaxNumPredictors > 1 ) { | |
|         predIndex[ i ] | ae(v) |
|     } | |
|     if( zerorun > 0 ) { | |
|         for( k = 0; k < dimension ; k++ ) | |
|         values[ k ][ i ] = 0 | |
|         zerorun −= 1 | |
|     } | |
|     else { | |
|         attribute_coding( dimension, i ) | ae(v) |
|         zerorun | ae(v) |
|     } | |
|     } | |
|     byte_alignment( ) | |
| } | |

POINT CLOUD DATA TRANSMISSION DEVICE, POINT CLOUD DATA TRANSMISSION METHOD, POINT CLOUD DATA RECEPTION DEVICE, AND POINT CLOUD DATA RECEPTION METHOD

This application is a National Phase application under 35 U.S.C. 371 of International Application No. PCT/KR2021/008940, filed on Jul. 13, 2021, which claims the benefit of Korean Application No. 10-2020-0085870, filed on Jul. 13, 2020, the contents of which are incorporated by reference herein in their entirety.

TECHNICAL FIELD

Embodiments relate to a method and apparatus for processing point cloud content.

BACKGROUND ART

Point cloud content is content represented by a point cloud, which is a set of points belonging to a coordinate system representing a three-dimensional space (or volume). The point cloud content may express media configured in three dimensions, and is used to provide various services such as virtual reality (VR), augmented reality (AR), mixed reality (MR), extended reality (XR), and self-driving services. However, tens of thousands to hundreds of thousands of point data are required to represent point cloud content. Therefore, there is a need for a method for efficiently processing a large amount of point data.

DISCLOSURE

Technical Problem

An object of the present disclosure devised to solve the above-described problems is to provide a point cloud data transmission device, a point cloud data transmission method, a point cloud data reception device, and a point cloud data reception method for efficiently transmitting and receiving a point cloud.

Another object of the present disclosure is to provide a point cloud data transmission device, a point cloud data transmission method, a point cloud data reception device, and a point cloud data reception method for addressing latency and encoding/decoding complexity.

Another object of the present disclosure is to provide a point cloud data transmission device, a point cloud data transmission method, a point cloud data reception device, and a point cloud data reception method for efficiently transmitting and receiving a geometry-point cloud compression (G-PCC) bitstream.

Another object of the present disclosure is to provide a point cloud data transmission device, a point cloud data transmission method, a point cloud data reception device, and a point cloud data reception method for performing transmission/reception through compression of point cloud data by applying a predication-based coding method so that the point cloud data may be efficiently compressed.

Another object of the present disclosure is to provide a point cloud data transmission device and a point cloud data transmission method adapted to be suitable for low-latency applications by using a predictive tree structure for geometry information compression of a point cloud data.

Another object of the present disclosure is to provide a point cloud data reception device and a point cloud data reception method adapted to be suitable for low-latency applications through separating processing by classifying points for direct processing in a predictive tree upon compressing geometry information based on a predictive tree structure.

Embodiments of the present disclosure are not limited only by the above-described objects and the scope of the present disclosure may be extended to other objects that may be inferred by those skilled in the art based on the entire contents of the present document.

Technical Solution

To achieve these objects and other advantages and in accordance with embodiments, a point cloud data transmission method may include acquiring point cloud data, encoding geometry information including positions of points of the point cloud data, encoding attribute information including attribute values of the points of the point cloud data based on the geometry information, and transmitting the encoded geometry information, the encoded attribute information, and signaling information.

The encoding the geometry information may include rearranging the points of the point cloud data through organization, generating a predictive tree based on the rearranged points of the point cloud data, and compressing positions of points in the predictive tree by performing prediction on the positions of the points in the predictive tree.

The generating the predictive tree may further include determining at least one inferred direct coding mode (IDCM) point to which a direct coding mode is to be applied from the predictive tree.

The determining the IDCM may include determining a current point as the at least one IDCM point based on a difference between an average value of distances of points in a parent and child relationship from a parent node of the current point to a root node while the predictive tree is being generated and a distance between the current point and a parent point of the current point being greater than a preset threshold.

The determining the IDCM may include positioning the at least one IDCM point at a leaf node based on the at least one IDCM point being positioned between a root node and the leaf node in the predictive tree.

The determining the IDCM may include calculating an imaginary value to be allocated to the determined at least one IDCM point and allocating the imaginary value to the determined at least one IDCM point.

In accordance with embodiments, a point cloud data transmission device may include an acquirer configured to acquire point cloud data, a geometry encoder configured to encode geometry information including positions of points of the point cloud data by applying a predictive tree, an attribute encoder configured to encode attribute information including attribute values of the points of the point cloud data based on the geometry information, and a transmitter configured to transmit the encoded geometry information, the encoded attribute information, and signaling information.

The geometry encoder may include an organizer configured to rearrange the points of the point cloud data through organization, a predictive tree generator configured to generate the predictive tree based on the rearranged points of the point cloud data, and a compressor configured to compress positions of points in the predictive tree by performing prediction on the positions of the points in the predictive tree.

The predictive tree generator may determine at least one inferred direct coding mode (IDCM) point to which a direct coding mode is to be applied from the predictive tree.

The predictive tree generator may determine a current point as the at least one IDCM point based on a difference between an average value of distances of points in a parent and child relationship from a parent node of the current point to a root node while the predictive tree is being generated and a distance between the current point and a parent point of the current point being greater than a preset threshold.

The predictive tree generator may position the at least one IDCM point at a leaf node based on the at least one IDCM point being positioned between a root node and the leaf node in the predictive tree.

The predictive tree generator may calculate an imaginary value to be allocated to the determined at least one IDCM point and allocate the imaginary value to the determined at least one IDCM point.

In accordance with embodiments, a point cloud data reception method may include receiving geometry information, attribute information, and signaling information, decoding the geometry information based on the signaling information to reconstruct the positions of points, decoding the attribute information based on the signaling information and the geometry information to reconstruct attribute values of the points, and rendering reconstructed point cloud data based on the positions of the points and the attribute values.

The decoding the geometry information may include reconstructing the positions of the points by performing prediction on the positions of the points.

The decoding the geometry information may include identifying at least one inferred direct coding mode (IDCM) point to which a direct coding mode is to be applied among the points based on the signaling information.

The decoding the geometry information may include reconstructing the at least one IDCM point to an original point based on the signaling information.

The decoding the geometry information may include performing prediction based on an imaginary value allocated to a position of the at least one IDCM point based on the signaling information.

The signaling information may include at least one of IDCM determination-related information, imaginary value-related information, threshold value-related information, or index-related information.

In accordance with embodiments, a point cloud data reception device may include a receiver configured to receive geometry information, attribute information, and signaling information, a geometry decoder configured to decode the geometry information based on the signaling information to reconstruct positions of points, an attribute decoder configured to decode the attribute information based on the signaling information and the geometry information to reconstruct attribute values of the points, and a renderer configured to render reconstructed point cloud data based on the positions of the points and the attribute values.

The geometry decoder may reconstruct the positions of the points by performing prediction on the positions of the points.

The geometry decoder may identify at least one inferred direct coding mode (IDCM) point to which a direct coding mode is to be applied among the points based on the signaling information.

The geometry decoder may reconstruct the at least one IDCM point to an original point based on the signaling information.

The geometry decoder may perform prediction based on an imaginary value allocated to a position of the at least one IDCM point based on the signaling information.

The signaling information may include at least one of IDCM determination-related information, imaginary value-related information, threshold value-related information, or index-related information.

Advantageous Effects

A point cloud data transmission method, a point cloud data transmission device, a point cloud data reception method, and a point cloud data reception device according to embodiments may provide a good-quality point cloud service.

A point cloud data transmission method, a point cloud data transmission device, a point cloud data reception method, and a point cloud data reception device according to embodiments may achieve various video codec methods.

A point cloud data transmission method, a point cloud data transmission device, a point cloud data reception method, and a point cloud data reception device according to embodiments may provide universal point cloud content such as a self-driving service (or an autonomous driving service).

A point cloud data transmission method, a point cloud data transmission device, a point cloud data reception method, and a point cloud data reception device according to embodiments may perform space-adaptive partition of point cloud data for independent encoding and decoding of the point cloud data, thereby improving parallel processing and providing scalability.

A point cloud data transmission method, a point cloud data transmission device, a point cloud data reception method, and a point cloud data reception device according to embodiments may perform encoding and decoding by partitioning the point cloud data in units of tiles and/or slices, and signal necessary data therefore, thereby improving encoding and decoding performance of the point cloud.

A point cloud data transmission method, a point cloud data transmission device, a point cloud data reception method, and a point cloud data reception device according to embodiments may use a prediction-based point cloud compression method, thereby providing fast encoding and decoding in an environment requiring low delay or low latency.

A point cloud data transmission method, a point cloud data transmission device, a point cloud data reception method, and a point cloud data reception device according to embodiments classify a corresponding point as a direct coding mode (DCM) if a point belonging to a predictive tree structure deviates from a pattern or variation trend of points of the entire predictive tree by a predetermined range when point cloud content is encoded/decoded based on predictive geometry coding, and separately process the point determined as the DCM (or IDCM) in a separate slice or positions the point at a leaf node in the predictive tree, so that an influence in a process of determining a predictive mode of the remaining points constituting the predictive tree may be minimized. Further, residuals signaled during encoding/decoding are reduced, so that the size of bitstreams may be reduced. Furthermore, since the DCM does not need to generate separate processing or a predictive process, an encoding/decoding time may be reduced.

BRIEF DESCRIPTION OF DRAWINGS

The accompanying drawings, which are included to provide a further understanding of the disclosure and are incorporated in and constitute a part of this application, illustrate embodiment(s) of the disclosure and together with the description serve to explain the principle of the disclosure.

FIG. 3 illustrates an exemplary process of capturing a point cloud video according to embodiments.

FIG. 7 illustrates an example of a neighbor node pattern according to embodiments.

FIG. 17 is a table showing an example of prediction modes for prediction-based geometry compression according to embodiments.

FIG. 22 is a diagram illustrating an example of a syntax structure of a sequence parameter set according to embodiments.

FIG. 23 is a diagram illustrating another example of the syntax structure of the sequence parameter set according to embodiments.

FIG. 24 is a table illustrating an IDCM determination method allocated to an IDCM_track_mode field according to embodiments.

FIG. 25 is a table illustrating an example of an imaginary value acquisition method assigned to an imaginary_point_prediction_mode field according to embodiments.

FIG. 26 is a diagram illustrating an example of a syntax structure of a tile parameter set according to embodiments.

FIG. 27 is a diagram illustrating another example of the syntax structure of the tile parameter set according to embodiments.

FIG. 28 is a diagram illustrating an example of a syntax structure of a geometry parameter set according to embodiments.

FIG. 29 is a diagram illustrating another example of the syntax structure of the geometry parameter set according to embodiments.

FIG. 30 is a diagram illustrating an example of a syntax structure of an attribute parameter set according to embodiments.

FIG. 31 is a diagram illustrating another example of the syntax structure of the attribute parameter set according to embodiments.

FIG. 32 is a diagram illustrating an example of a syntax structure of a geometry slice bitstream( ) according to embodiments.

FIG. 33 is a diagram illustrating an example of a syntax structure of a geometry slice header according to embodiments.

FIG. 34 is a diagram illustrating another example of the syntax structure of the geometry slice header according to embodiments.

FIG. 35 is a diagram illustrating an example of a syntax structure of geometry slice data according to embodiments.

FIG. 36 is a diagram illustrating another example of the syntax structure of the geometry slice data according to embodiments.

FIG. 37 is a diagram illustrating an example of a syntax structure of an attribute slice bitstream( ) according to embodiments.

FIG. 38 is a diagram illustrating an example of a syntax structure of an attribute slice header according to embodiments.

FIG. 39 is a diagram illustrating an example of a syntax structure of attribute slice data according to embodiments.

BEST MODE

Figure 1:
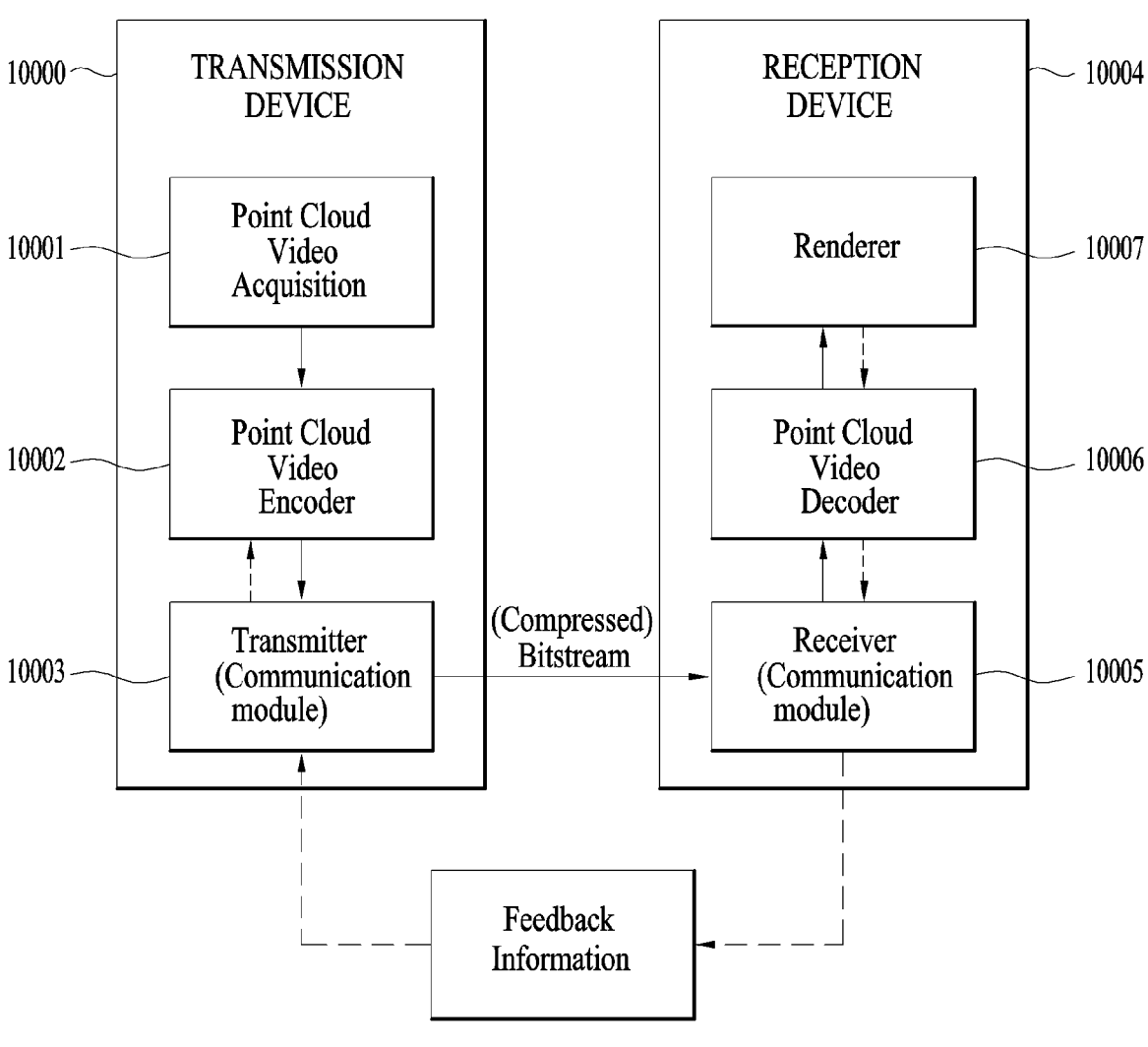
FIG. 1 illustrates an exemplary point cloud content providing system according to embodiments.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. It should be noted that the following examples are only for embodying the present disclosure and do not limit the scope of the present disclosure. What can be easily inferred by an expert in the technical field to which the present disclosure belongs from the detailed description and examples of the present disclosure is to be interpreted as being within the scope of the present disclosure.

The detailed description in this present specification should be construed in all aspects as illustrative and not restrictive. The scope of the disclosure should be determined by the appended claims and their legal equivalents, and all changes coming within the meaning and equivalency range of the appended claims are intended to be embraced therein.

Reference will now be made in detail to the preferred embodiments of the present disclosure, examples of which are illustrated in the accompanying drawings. The detailed description, which will be given below with reference to the accompanying drawings, is intended to explain exemplary embodiments of the present disclosure, rather than to show the only embodiments that can be implemented according to the present disclosure. The following detailed description includes specific details in order to provide a thorough understanding of the present disclosure. However, it will be apparent to those skilled in the art that the present disclosure may be practiced without such specific details. Although most terms used in this specification have been selected from general ones widely used in the art, some terms have been arbitrarily selected by the applicant and their meanings are explained in detail in the following description as needed. Thus, the present disclosure should be understood based upon the intended meanings of the terms rather than their simple names or meanings. In addition, the following drawings and detailed description should not be construed as being limited to the specifically described embodiments, but should be construed as including equivalents or substitutes of the embodiments described in the drawings and detailed description.

FIG. 1 shows an exemplary point cloud content providing system according to embodiments.

The point cloud content providing system illustrated in FIG. 1 may include a transmission device 10000 and a reception device 10004. The transmission device 10000 and the reception device 10004 are capable of wired or wireless communication to transmit and receive point cloud data.

The point cloud data transmission device 10000 according to the embodiments may secure and process point cloud video (or point cloud content) and transmit the same. According to embodiments, the transmission device 10000 may include a fixed station, a base transceiver system (BTS), a network, an artificial intelligence (AI) device and/or system, a robot, an AR/VR/XR device and/or server. According to embodiments, the transmission device 10000 may include a device, a robot, a vehicle, an AR/VR/XR device, a portable device, a home appliance, an Internet of Thing (IoT) device, and an AI device/server which are configured to perform communication with a base station and/or other wireless devices using a radio access technology (e.g., 5G New RAT (NR), Long Term Evolution (LTE)).

The transmission device 10000 according to the embodiments includes a point cloud video acquisition unit 10001, a point cloud video encoder 10002, and/or a transmitter (or communication module) 10003.

The point cloud video acquisition unit 10001 according to the embodiments acquires a point cloud video through a processing process such as capture, synthesis, or generation. The point cloud video is point cloud content represented by a point cloud, which is a set of points positioned in a 3D space, and may be referred to as point cloud video data. The point cloud video according to the embodiments may include one or more frames. One frame represents a still image/picture. Therefore, the point cloud video may include a point cloud image/frame/picture, and may be referred to as a point cloud image, frame, or picture.

The point cloud video encoder 10002 according to the embodiments encodes the acquired point cloud video data. The point cloud video encoder 10002 may encode the point cloud video data based on point cloud compression coding. The point cloud compression coding according to the embodiments may include geometry-based point cloud compression (G-PCC) coding and/or video-based point cloud compression (V-PCC) coding or next-generation coding. The point cloud compression coding according to the embodiments is not limited to the above-described embodiment. The point cloud video encoder 10002 may output a bitstream containing the encoded point cloud video data. The bitstream may contain not only the encoded point cloud video data, but also signaling information related to encoding of the point cloud video data.

The transmitter 10003 according to the embodiments transmits the bitstream containing the encoded point cloud video data. The bitstream according to the embodiments is encapsulated in a file or segment (for example, a streaming segment), and is transmitted over various networks such as a broadcasting network and/or a broadband network. Although not shown in the figure, the transmission device 10000 may include an encapsulator (or an encapsulation module) configured to perform an encapsulation operation. According to embodiments, the encapsulator may be included in the transmitter 10003. According to embodiments, the file or segment may be transmitted to the reception device 10004 over a network, or stored in a digital storage medium (e.g., USB, SD, CD, DVD, Blu-ray, HDD, SSD, etc.). The transmitter 10003 according to the embodiments is capable of wired/wireless communication with the reception device 10004 (or the receiver 10005) over a network of 4G, 5G, 6G, etc. In addition, the transmitter may perform a necessary data processing operation according to the network system (e.g., a 4G, 5G or 6G communication network system). The transmission device 10000 may transmit the encapsulated data in an on-demand manner.

The reception device 10004 according to the embodiments includes a receiver 10005, a point cloud video decoder 10006, and/or a renderer 10007. According to embodiments, the reception device 10004 may include a device, a robot, a vehicle, an AR/VR/XR device, a portable device, a home appliance, an Internet of Things (IoT) device, and an AI device/server which are configured to perform communication with a base station and/or other wireless devices using a radio access technology (e.g., 5G New RAT (NR), Long Term Evolution (LTE)).

The receiver 10005 according to the embodiments receives the bitstream containing the point cloud video data or the file/segment in which the bitstream is encapsulated from the network or storage medium. The receiver 10005 may perform necessary data processing according to the network system (for example, a communication network system of 4G, 5G, 6G, etc.). The receiver 10005 according to the embodiments may decapsulate the received file/ segment and output a bitstream. According to embodiments, the receiver 10005 may include a decapsulator (or a decapsulation module) configured to perform a decapsulation operation. The decapsulator may be implemented as an element (or component or module) separate from the receiver 10005.

The point cloud video decoder 10006 decodes the bitstream containing the point cloud video data. The point cloud video decoder 10006 may decode the point cloud video data according to the method by which the point cloud video data is encoded (for example, in a reverse process of the operation of the point cloud video encoder 10002). Accordingly, the point cloud video decoder 10006 may decode the point cloud video data by performing point cloud decompression coding, which is the inverse process of the point cloud compression. The point cloud decompression coding includes G-PCC coding.

The renderer 10007 renders the decoded point cloud video data. According to an embodiment, the renderer 10007 may render the decoded point cloud data according to a viewport. The renderer 10007 may output point cloud content by rendering not only the point cloud video data but also audio data. According to embodiments, the renderer 10007 may include a display configured to display the point cloud content. According to embodiments, the display may be implemented as a separate device or component rather than being included in the renderer 10007.

The arrows indicated by dotted lines in the drawing represent a transmission path of feedback information acquired by the reception device 10004. The feedback information is information for reflecting interactivity with a user who consumes the point cloud content, and includes information about the user (e.g., head orientation information, viewport information, and the like). In particular, when the point cloud content is content for a service (e.g., self-driving service, etc.) that requires interaction with the user, the feedback information may be provided to the content transmitting side (e.g., the transmission device 10000) and/or the service provider. According to embodiments, the feedback information may be used in the reception device 10004 as well as the transmission device 10000, or may not be provided.

The head orientation information according to the embodiments may represent information about a position, orientation, angle, and motion of a user's head. The reception device 10004 according to the embodiments may calculate viewport information based on the head orientation information. The viewport information is information about a region of a point cloud video that the user is viewing (that is, a region that the user is currently viewing). That is, the viewport information is information about a region that the user is currently viewing in the point cloud video. In other words, the viewport or viewport region may represent a region that the user is viewing in the point cloud video. A viewpoint is a point that the user is viewing in the point cloud video, and may represent a center point of the viewport region. That is, the viewport is a region centered on a viewpoint, and the size and shape of the region may be determined by a field of view (FOV). Accordingly, the reception device 10004 may extract the viewport information based on a vertical or horizontal FOV supported by the device as well as the head orientation information. In addition, the reception device 10004 may perform gaze analysis or the like based on the head orientation information and/or the viewport information to determine the way the user consumes a point cloud video, a region that the user gazes at in the point cloud video, and the gaze time. According to embodiments, the reception device 10004 may transmit feedback information including the result of the gaze analysis to the transmission device 10000. According to embodiments, a device such as a VR/XR/AR/MR display may extract a viewport region based on the position/orientation of a user's head and a vertical or horizontal FOV supported by the device. According to embodiments, the head orientation information and the viewport information may be referred to as feedback information, signaling information, or metadata.

The feedback information according to the embodiments may be acquired in the rendering and/or display process. The feedback information may be secured by one or more sensors included in the reception device 10004. According to embodiments, the feedback information may be secured by the renderer 10007 or a separate external element (or device, component, or the like). The dotted lines in FIG. 1 represent a process of transmitting the feedback information secured by the renderer 10007. The feedback information may not only be transmitted to the transmitting side, but also be consumed by the receiving side. That is, the point cloud content providing system may process (encode/decode/render) point cloud data based on the feedback information. For example, the point cloud video decoder 10006 and the renderer 10007 may preferentially decode and render only the point cloud video for a region currently viewed by the user, based on the feedback information, that is, the head orientation information and/or the viewport information.

The reception device 10004 may transmit the feedback information to the transmission device 10000. The transmission device 10000 (or the point cloud video encoder 10002) may perform an encoding operation based on the feedback information. Accordingly, the point cloud content providing system may efficiently process necessary data (e.g., point cloud data corresponding to the user's head position) based on the feedback information $4q$ rather than processing (encoding/decoding) the entire point cloud data, and provide point cloud content to the user.

According to embodiments, the transmission device 10000 may be called an encoder, a transmitting device, a transmitter, a transmission system, or the like, and the reception device 10004 may be called a decoder, a receiving device, a receiver, a reception system, or the like.

The point cloud data processed in the point cloud content providing system of FIG. 1 according to embodiments (through a series of processes of acquisition/encoding/transmission/decoding/rendering) may be referred to as point cloud content data or point cloud video data. According to embodiments, the point cloud content data may be used as a concept covering metadata or signaling information related to the point cloud data.

The elements of the point cloud content providing system illustrated in FIG. 1 may be implemented by hardware, software, a processor, and/or a combination thereof.

Figure 2:
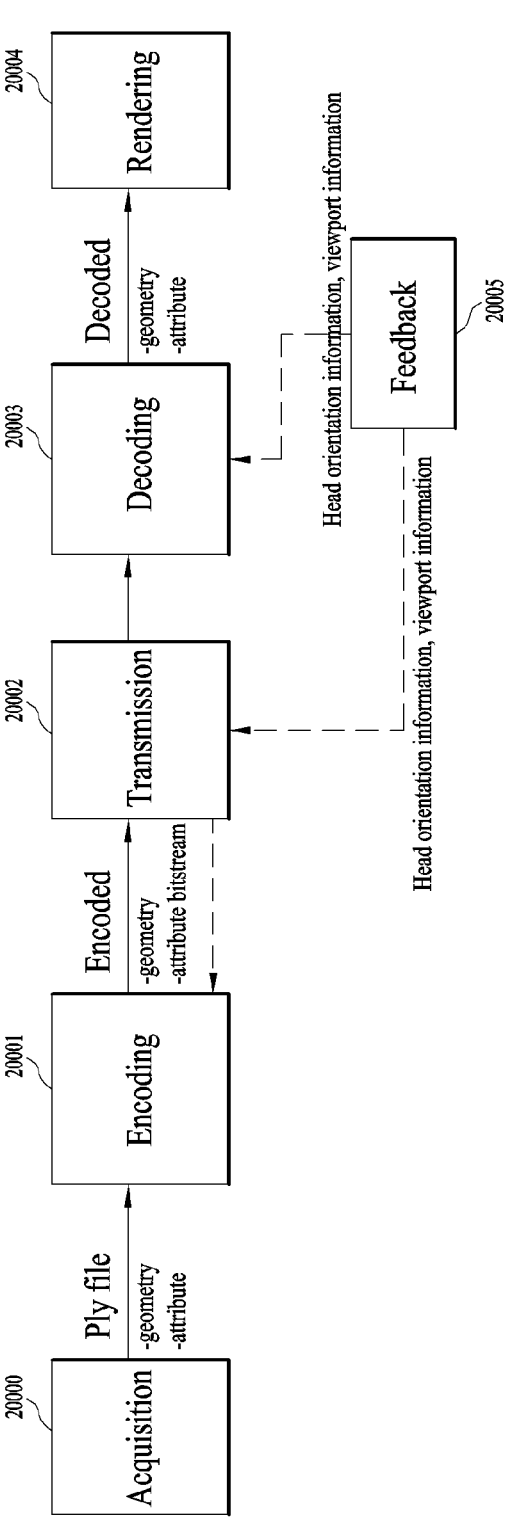
FIG. 2 is a block diagram illustrating a point cloud content providing operation according to embodiments.

FIG. 2 is a block diagram illustrating a point cloud content providing operation according to embodiments.

The block diagram of FIG. 2 shows the operation of the point cloud content providing system described in FIG. 1. As described above, the point cloud content providing system may process point cloud data based on point cloud compression coding (e.g., G-PCC). The point cloud content providing system according to the embodiments (for example, the point cloud transmission device 10000 or the point cloud video acquisition unit 10001) may acquire a point cloud video (20000). The point cloud video is represented by a point cloud belonging to a coordinate system for expressing a 3D space. The point cloud video according to the embodiments may include a Ply (Polygon File format or the Stanford Triangle format) file. When the point cloud video has one or more frames, the acquired point cloud video may include one or more Ply files. The Ply files contain point cloud data, such as point geometry and/or attributes. The geometry includes positions of points. The position of each point may be represented by parameters (for example, values of the X, Y, and Z axes) representing a three-dimensional coordinate system (e.g., a coordinate system composed of X, Y and Z axes). The attributes include attributes of points (e.g., information about texture, color (in YCbCr or RGB), reflectance r, transparency, etc. of each point). A point has one or more attributes. For example, a point may have an attribute that is a color, or two attributes that are color and reflectance. According to embodiments, the geometry may be called positions, geometry information, geometry data, or the like, and the attribute may be called attributes, attribute information, attribute data, or the like.

The point cloud content providing system (for example, the point cloud transmission device 10000 or the point cloud video acquisition unit 10001) may secure point cloud data from information (e.g., depth information, color information, etc.) related to the acquisition process of the point cloud video.

The point cloud content providing system (for example, the transmission device 10000 or the point cloud video encoder 10002) according to the embodiments may encode the point cloud data (20001). The point cloud content providing system may encode the point cloud data based on point cloud compression coding. As described above, the point cloud data may include the geometry and attributes of a point. Accordingly, the point cloud content providing system may perform geometry encoding of encoding the geometry and output a geometry bitstream. The point cloud content providing system may perform attribute encoding of encoding attributes and output an attribute bitstream. According to embodiments, the point cloud content providing system may perform the attribute encoding based on the geometry encoding. The geometry bitstream and the attribute bitstream according to the embodiments may be multiplexed and output as one bitstream. The bitstream according to the embodiments may further contain signaling information related to the geometry encoding and attribute encoding.

The point cloud content providing system (for example, the transmission device 10000 or the transmitter 10003) according to the embodiments may transmit the encoded point cloud data (20002). As illustrated in FIG. 1, the encoded point cloud data may be represented by a geometry bitstream and an attribute bitstream. In addition, the encoded point cloud data may be transmitted in the form of a bitstream together with signaling information related to encoding of the point cloud data (for example, signaling information related to the geometry encoding and the attribute encoding). The point cloud content providing system may encapsulate a bitstream that carries the encoded point cloud data and transmit the same in the form of a file or segment.

The point cloud content providing system (for example, the reception device 10004 or the receiver 10005) according to the embodiments may receive the bitstream containing the encoded point cloud data. In addition, the point cloud content providing system (for example, the reception device 10004 or the receiver 10005) may demultiplex the bitstream.

The point cloud content providing system (e.g., the reception device 10004 or the point cloud video decoder 10005) may decode the encoded point cloud data (e.g., the geometry bitstream, the attribute bitstream) transmitted in the bitstream. The point cloud content providing system (for example, the reception device 10004 or the point cloud video decoder 10005) may decode the point cloud video data based on the signaling information related to encoding of the point cloud video data contained in the bitstream. The point cloud content providing system (for example, the reception device 10004 or the point cloud video decoder 10005) may decode the geometry bitstream to reconstruct the positions (geometry) of points. The point cloud content providing system may reconstruct the attributes of the points by decoding the attribute bitstream based on the reconstructed geometry. The point cloud content providing system (for example, the reception device 10004 or the point cloud video decoder 10005) may reconstruct the point cloud video based on the positions according to the reconstructed geometry and the decoded attributes.

The point cloud content providing system according to the embodiments (for example, the reception device 10004 or the renderer 10007) may render the decoded point cloud data (20004). The point cloud content providing system (for example, the reception device 10004 or the renderer 10007) may render the geometry and attributes decoded through the decoding process, using various rendering methods. Points in the point cloud content may be rendered to a vertex having a certain thickness, a cube having a specific minimum size centered on the corresponding vertex position, or a circle centered on the corresponding vertex position. All or part of the rendered point cloud content is provided to the user through a display (e.g., a VR/AR display, a general display, etc.).

The point cloud content providing system (for example, the reception device 10004) according to the embodiments may secure feedback information (20005). The point cloud content providing system may encode and/or decode point cloud data based on the feedback information. The feedback information and the operation of the point cloud content providing system according to the embodiments are the same as the feedback information and the operation described with reference to FIG. 1, and thus detailed description thereof is omitted.

FIG. 3 illustrates an exemplary process of capturing a point cloud video according to embodiments.

FIG. 3 illustrates an exemplary point cloud video capture process of the point cloud content providing system described with reference to FIGS. 1 to 2.

Point cloud content includes a point cloud video (images and/or videos) representing an object and/or environment located in various 3D spaces (e.g., a 3D space representing a real environment, a 3D space representing a virtual environment, etc.). Accordingly, the point cloud content providing system according to the embodiments may capture a point cloud video using one or more cameras (e.g., an infrared camera capable of securing depth information, an RGB camera capable of extracting color information corresponding to the depth information, etc.), a projector (e.g., an infrared pattern projector to secure depth information), a LiDAR, or the like. The point cloud content providing system according to the embodiments may extract the shape of geometry composed of points in a 3D space from the depth information and extract the attributes of each point from the color information to secure point cloud data. An image and/or video according to the embodiments may be captured based on at least one of the inward-facing technique and the outward-facing technique.

The left part of FIG. 3 illustrates the inward-facing technique. The inward-facing technique refers to a technique of capturing images a central object with one or more cameras (or camera sensors) positioned around the central object. The inward-facing technique may be used to generate point cloud content providing a 360-degree image of a key object to the user (e.g., VR/AR content providing a 360- degree image of an object (e.g., a key object such as a character, player, object, or actor) to the user).

The right part of FIG. 3 illustrates the outward-facing technique. The outward-facing technique refers to a technique of capturing images an environment of a central object rather than the central object with one or more cameras (or camera sensors) positioned around the central object. The outward-facing technique may be used to generate point cloud content for providing a surrounding environment that appears from the user's point of view (e.g., content representing an external environment that may be provided to a user of a self-driving vehicle).

As shown in FIG. 3, the point cloud content may be generated based on the capturing operation of one or more cameras. In this case, the coordinate system may differ among the cameras, and accordingly the point cloud content providing system may calibrate one or more cameras to set a global coordinate system before the capturing operation. In addition, the point cloud content providing system may generate point cloud content by synthesizing an arbitrary image and/or video with an image and/or video captured by the above-described capture technique. The point cloud content providing system may not perform the capturing operation described in FIG. 3 when it generates point cloud content representing a virtual space. The point cloud content providing system according to the embodiments may perform post-processing on the captured image and/or video. In other words, the point cloud content providing system may remove an unwanted area (for example, a background), recognize a space to which the captured images and/or videos are connected, and, when there is a spatial hole, perform an operation of filling the spatial hole.

The point cloud content providing system may generate one piece of point cloud content by performing coordinate transformation on points of the point cloud video secured from each camera. The point cloud content providing system may perform coordinate transformation on the points based on the coordinates of the position of each camera. Accordingly, the point cloud content providing system may generate content representing one wide range, or may generate point cloud content having a high density of points.

Figure 4:
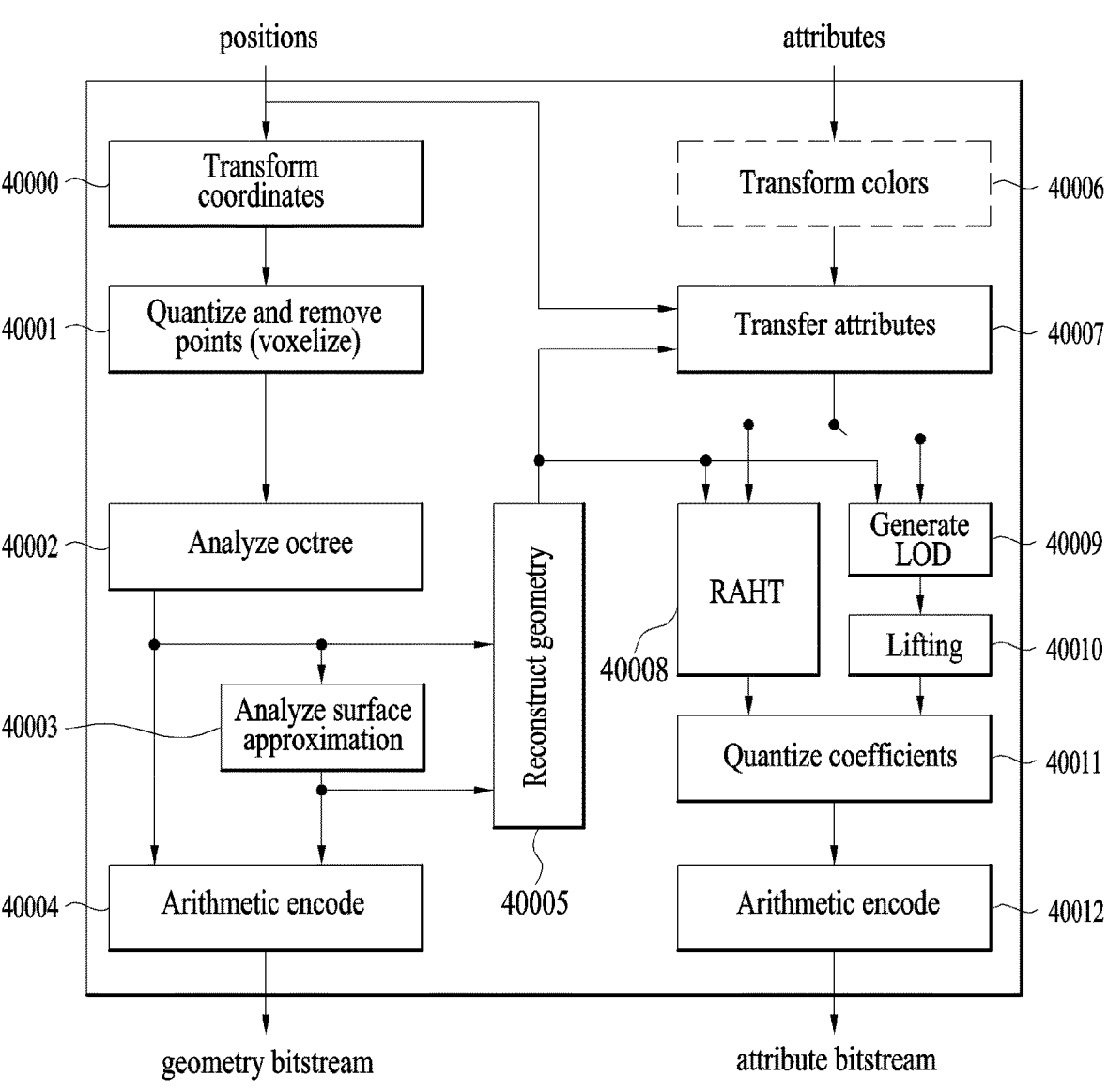
FIG. 4 illustrates an exemplary block diagram of point cloud video encoder according to embodiments.

FIG. 4 illustrates an exemplary point cloud video encoder according to embodiments.

FIG. 4 shows an example of the point cloud video encoder 10002 of FIG. 1. The point cloud video encoder reconstructs and encodes point cloud data (e.g., positions and/or attributes of the points) to adjust the quality of the point cloud content (to, for example, lossless, lossy, or near-lossless) according to the network condition or applications. When the overall size of the point cloud content is large (e.g., point cloud content of 60 Gbps is given for 30 fps), the point cloud content providing system may fail to stream the content in real time. Accordingly, the point cloud content providing system may reconstruct the point cloud content based on the maximum target bitrate to provide the same in accordance with the network environment or the like.

As described with reference to FIGS. 1 to 2, the point cloud video encoder may perform geometry encoding and attribute encoding. The geometry encoding is performed before the attribute encoding.

The point cloud video encoder according to the embodiments includes a coordinate transformer (Transform coordinates) 40000, a quantizer (Quantize and remove points (voxelize)) 40001, an octree analyzer (Analyze octree) 40002, and a surface approximation analyzer (Analyze surface approximation) 40003, an arithmetic encoder (Arithmetic encode) 40004, a geometry reconstructor (Reconstruct geometry) 40005, a color transformer (Transform colors) 40006, an attribute transformer (Transform attributes) 40007, a RAHT transformer (RAHT) 40008, an LOD generator (Generate LOD) 40009, a lifting transformer (Lifting) 40010, a coefficient quantizer (Quantize coefficients) 40011, and/or an arithmetic encoder (Arithmetic encode) 40012.

The coordinate transformer 40000, the quantizer 40001, the octree analyzer 40002, the surface approximation analyzer 40003, the arithmetic encoder 40004, and the geometry reconstructor 40005 may perform geometry encoding. The geometry encoding according to the embodiments may include octree geometry coding, direct coding, trisoup geometry encoding, and entropy encoding. The direct coding and trisoup geometry encoding are applied selectively or in combination. The geometry encoding is not limited to the above-described example.

As shown in the figure, the coordinate transformer 40000 according to the embodiments receives positions and transforms the same into coordinates. For example, the positions may be transformed into position information in a three-dimensional space (for example, a three-dimensional space represented by an XYZ coordinate system). The position information in the three-dimensional space according to the embodiments may be referred to as geometry information.

The quantizer 40001 according to the embodiments quantizes the geometry information. For example, the quantizer 40001 may quantize the points based on a minimum position value of all points (for example, a minimum value on each of the X, Y, and Z axes). The quantizer 40001 performs a quantization operation of multiplying the difference between the minimum position value and the position value of each point by a preset quantization scale value and then finding the nearest integer value by rounding the value obtained through the multiplication. Thus, one or more points may have the same quantized position (or position value). The quantizer 40001 according to the embodiments performs voxelization based on the quantized positions to reconstruct quantized points. The voxelization means a minimum unit representing position information in 3D space. Points of point cloud content (or 3D point cloud video) according to the embodiments may be included in one or more voxels. The term voxel, which is a compound of volume and pixel, refers to a 3D cubic space generated when a 3D space is divided into units (unit=1.0) based on the axes representing the 3D space (e.g., X-axis, Y-axis, and Z-axis). The quantizer 40001 may match groups of points in the 3D space with voxels. According to embodiments, one voxel may include only one point. According to embodiments, one voxel may include one or more points. In order to express one voxel as one point, the position of the center point of a voxel may be set based on the positions of one or more points included in the voxel. In this case, attributes of all positions included in one voxel may be combined and assigned to the voxel.

The octree analyzer 40002 according to the embodiments performs octree geometry coding (or octree coding) to present voxels in an octree structure. The octree structure represents points matched with voxels, based on the octal tree structure.

The surface approximation analyzer 40003 according to the embodiments may analyze and approximate the octree. The octree analysis and approximation according to the embodiments is a process of analyzing a region containing a plurality of points to efficiently provide octree and voxelization.

The arithmetic encoder 40004 according to the embodiments performs entropy encoding on the octree and/or the approximated octree. For example, the encoding scheme includes arithmetic encoding. As a result of the encoding, a geometry bitstream is generated.

The color transformer 40006, the attribute transformer 40007, the RAHT transformer 40008, the LOD generator 40009, the lifting transformer 40010, the coefficient quantizer 40011, and/or the arithmetic encoder 40012 perform attribute encoding. As described above, one point may have one or more attributes. The attribute encoding according to the embodiments is equally applied to the attributes that one point has. However, when an attribute (e.g., color) includes one or more elements, attribute encoding is independently applied to each element. The attribute encoding according to the embodiments includes color transform coding, attribute transform coding, region adaptive hierarchical transform (RAHT) coding, interpolation-based hierarchical nearest-neighbor prediction (prediction transform) coding, and inter-polation-based hierarchical nearest-neighbor prediction with an update/lifting step (lifting transform) coding. Depending on the point cloud content, the RAHT coding, the prediction transform coding and the lifting transform coding described above may be selectively used, or a combination of one or more of the coding schemes may be used. The attribute encoding according to the embodiments is not limited to the above-described example.

The color transformer 40006 according to the embodiments performs color transform coding of transforming color values (or textures) included in the attributes. For example, the color transformer 40006 may transform the format of color information (for example, from RGB to YCbCr). The operation of the color transformer 40006 according to embodiments may be optionally applied according to the color values included in the attributes.

The geometry reconstructor 40005 according to the embodiments reconstructs (decompresses) the octree and/or the approximated octree. The geometry reconstructor 40005 reconstructs the octree/voxels based on the result of analyzing the distribution of points. The reconstructed octree/voxels may be referred to as reconstructed geometry (restored geometry).

The attribute transformer 40007 according to the embodiments performs attribute transformation to transform the attributes based on the reconstructed geometry and/or the positions on which geometry encoding is not performed. As described above, since the attributes are dependent on the geometry, the attribute transformer 40007 may transform the attributes based on the reconstructed geometry information. For example, based on the position value of a point included in a voxel, the attribute transformer 40007 may transform the attribute of the point at the position. As described above, when the position of the center of a voxel is set based on the positions of one or more points included in the voxel, the attribute transformer 40007 transforms the attributes of the one or more points. When the trisoup geometry encoding is performed, the attribute transformer 40007 may transform the attributes based on the trisoup geometry encoding.

The attribute transformer 40007 may perform the attribute transformation by calculating the average of attributes or attribute values of neighboring points (e.g., color or reflectance of each point) within a specific position/radius from the position (or position value) of the center of each voxel. The attribute transformer 40007 may apply a weight according to the distance from the center to each point in calculating the average. Accordingly, each voxel has a position and a calculated attribute (or attribute value).

The attribute transformer 40007 may search for neighboring points existing within a specific position/radius from the position of the center of each voxel based on the K-D tree or the Morton code. The K-D tree is a binary search tree and supports a data structure capable of managing points based on the positions such that nearest neighbor search (NNS) can be performed quickly. The Morton code is generated by presenting coordinates (e.g., (x, y, z)) representing 3D positions of all points as bit values and mixing the bits. For example, when the coordinates representing the position of a point are (5, 9, 1), the bit values for the coordinates are (0101, 1001, 0001). Mixing the bit values according to the bit index in order of z, y, and x yields 010001000111. This value is expressed as a decimal number of 1095. That is, the Morton code value of the point having coordinates (5, 9, 1) is 1095. The attribute transformer 40007 may order the points based on the Morton code values and perform NNS through a depth-first traversal process. After the attribute transformation operation, the K-D tree or the Morton code is used when the NNS is needed in another transformation process for attribute coding.

As shown in the figure, the transformed attributes are input to the RAHT transformer 40008 and/or the LOD generator 40009.

The RAHT transformer 40008 according to the embodiments performs RAHT coding for predicting attribute information based on the reconstructed geometry information. For example, the RAHT transformer 40008 may predict attribute information of a node at a higher level in the octree based on the attribute information associated with a node at a lower level in the octree.

The LOD generator 40009 according to the embodiments generates a level of detail (LOD). The LOD according to the embodiments is a degree of detail of point cloud content. As the LOD value decrease, it indicates that the detail of the point cloud content is degraded. As the LOD value increases, it indicates that the detail of the point cloud content is enhanced. Points may be classified by the LOD.

The lifting transformer 40010 according to the embodiments performs lifting transform coding of transforming the attributes a point cloud based on weights. As described above, lifting transform coding may be optionally applied.

The coefficient quantizer 40011 according to the embodiments quantizes the attribute-coded attributes based on coefficients.

The arithmetic encoder 40012 according to the embodiments encodes the quantized attributes based on arithmetic coding.

Although not shown in the figure, the elements of the point cloud video encoder of FIG. 4 may be implemented by hardware including one or more processors or integrated circuits configured to communicate with one or more memories included in the point cloud content providing apparatus, software, firmware, or a combination thereof. The one or more processors may perform at least one of the operations and/or functions of the elements of the point cloud video encoder of FIG. 4 described above. Additionally, the one or more processors may operate or execute a set of software programs and/or instructions for performing the operations and/or functions of the elements of the point cloud video encoder of FIG. 4. The one or more memories according to the embodiments may include a high speed random access memory, or include a non-volatile memory (e.g., one or more magnetic disk storage devices, flash memory devices, or other non-volatile solid-state memory devices).

Figure 5:
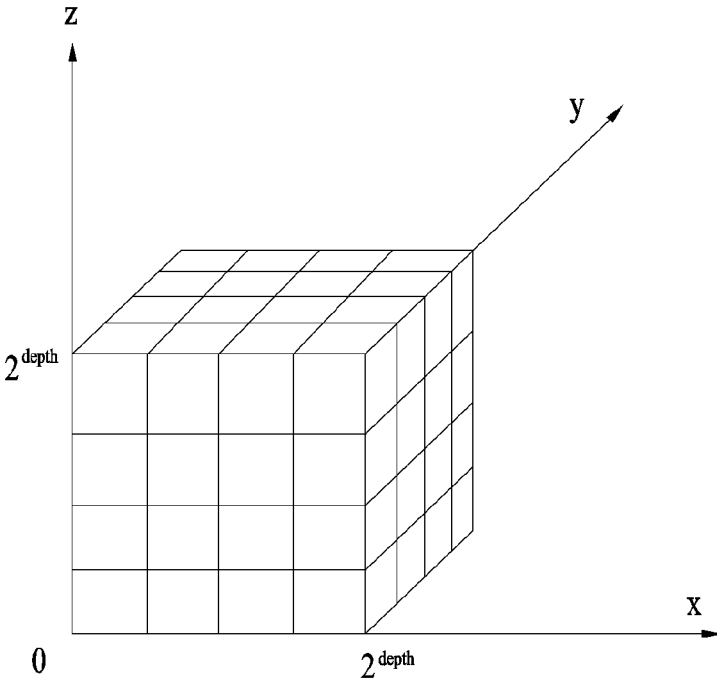
FIG. 5 illustrates an example of voxels in a 3D space according to embodiments.

FIG. 5 shows an example of voxels according to embodiments.

FIG. 5 shows voxels positioned in a 3D space represented by a coordinate system composed of three axes, which are the X-axis, the Y-axis, and the Z-axis. As described with reference to FIG. 4, the point cloud video encoder (e.g., the quantizer 40001) may perform voxelization. Voxel refers to a 3D cubic space generated when a 3D space is divided into units (unit=1.0) based on the axes representing the 3D space (e.g., X-axis, Y-axis, and Z-axis). FIG. 5 shows an example of voxels generated through an octree structure in which a cubical axis-aligned bounding box defined by two poles (0, 0, 0) and (2d, 2d, 2d) is recursively subdivided. One voxel includes at least one point. The spatial coordinates of a voxel may be estimated from the positional relationship with a voxel group. As described above, a voxel has an attribute (such as color or reflectance) like pixels of a 2D image/video. The details of the voxel are the same as those described with reference to FIG. 4, and therefore a description thereof is omitted.

Figure 6:
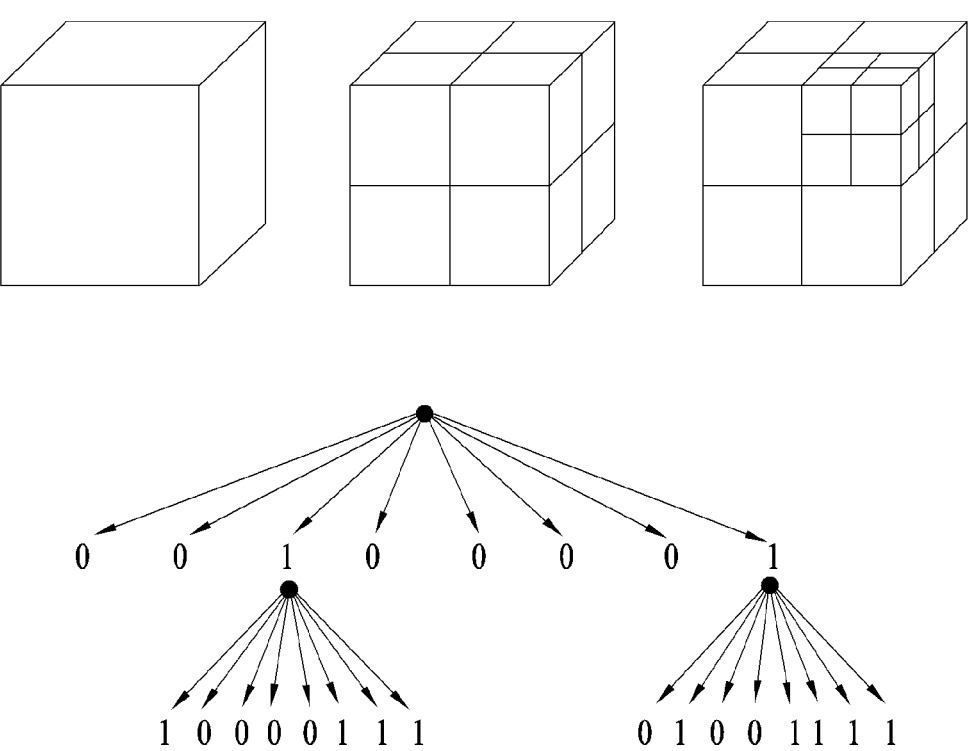
FIG. 6 illustrates an example of octree and occupancy code according to embodiments.

FIG. 6 shows an example of an octree and occupancy code according to embodiments.

As described with reference to FIGS. 1 to 4, the point cloud content providing system (point cloud video encoder 10002) or the octree analyzer 40002 of the point cloud video encoder performs octree geometry coding (or octree coding) based on an octree structure to efficiently manage the region and/or position of the voxel.

The upper part of FIG. 6 shows an octree structure. The 3D space of the point cloud content according to the embodiments is represented by axes (e.g., X-axis, Y-axis, and Z-axis) of the coordinate system. The octree structure is created by recursive subdividing of a cubical axis-aligned bounding box defined by two poles (0, 0, 0) and (2d, 2d, 2d). Here, 2d may be set to a value constituting the smallest bounding box surrounding all points of the point cloud content (or point cloud video). Here, d denotes the depth of the octree. The value of d is determined in Equation 1. In Equation 1, (xintn, yintn, zintn) denotes the positions (or position values) of quantized points.

$$d = Ceil\left(Log2\left(Max\left(x_n^{int}, y_n^{int}, z_n^{int}, n = 1, \ldots, N\right) + 1\right)\right) \quad \text{Equation 1}$$

As shown in the middle of the upper part of FIG. 6, the entire 3D space may be divided into eight spaces according to partition. Each divided space is represented by a cube with six faces. As shown in the upper right of FIG. 6, each of the eight spaces is divided again based on the axes of the coordinate system (e.g., X-axis, Y-axis, and Z-axis). Accordingly, each space is divided into eight smaller spaces. The divided smaller space is also represented by a cube with six faces. This partitioning scheme is applied until the leaf node of the octree becomes a voxel.

The lower part of FIG. 6 shows an octree occupancy code. The occupancy code of the octree is generated to indicate whether each of the eight divided spaces generated by dividing one space contains at least one point. Accordingly, a single occupancy code is represented by eight child nodes. Each child node represents the occupancy of a divided space, and the child node has a value in 1 bit. Accordingly, the occupancy code is represented as an 8-bit code. That is, when at least one point is contained in the space corresponding to a child node, the node is assigned a value of 1. When no point is contained in the space corresponding to the child node (the space is empty), the node is assigned a value of 0. Since the occupancy code shown in FIG. 6 is 00100001, it indicates that the spaces corresponding to the third child node and the eighth child node among the eight child nodes each contain at least one point. As shown in the figure, each of the third child node and the eighth child node has eight child nodes, and the child nodes are represented by an 8-bit occupancy code. The figure shows that the occupancy code of the third child node is 10000111, and the occupancy code of the eighth child node is 01001111. The point cloud video encoder (for example, the arithmetic encoder 40004) according to the embodiments may perform entropy encoding on the occupancy codes. In order to increase the compression efficiency, the point cloud video encoder may perform intra/inter-coding on the occupancy codes. The reception device (for example, the reception device 10004 or the point cloud video decoder 10006) according to the embodiments reconstructs the octree based on the occupancy codes.

The point cloud video encoder (for example, the octree analyzer 40002) according to the embodiments may perform voxelization and octree coding to store the positions of points. However, points are not always evenly distributed in the 3D space, and accordingly there may be a specific region in which fewer points are present. Accordingly, it is inefficient to perform voxelization for the entire 3D space. For example, when a specific region contains few points, voxelization does not need to be performed in the specific region.

Accordingly, for the above-described specific region (or a node other than the leaf node of the octree), the point cloud video encoder according to the embodiments may skip voxelization and perform direct coding to directly code the positions of points included in the specific region. The coordinates of a direct coding point according to the embodiments are referred to as direct coding mode (DCM). The point cloud video encoder according to the embodiments may also perform trisoup geometry encoding, which is to reconstruct the positions of the points in the specific region (or node) based on voxels, based on a surface model. The trisoup geometry encoding is geometry encoding that represents an object as a series of triangular meshes. Accordingly, the point cloud video decoder may generate a point cloud from the mesh surface. The direct coding and trisoup geometry encoding according to the embodiments may be selectively performed. In addition, the direct coding and trisoup geometry encoding according to the embodiments may be performed in combination with octree geometry coding (or octree coding).

To perform direct coding, the option to use the direct mode for applying direct coding should be activated. A node to which direct coding is to be applied is not a leaf node, and points less than a threshold should be present within a specific node. In addition, the total number of points to which direct coding is to be applied should not exceed a preset threshold. When the conditions above are satisfied, the point cloud video encoder (or the arithmetic encoder 40004) according to the embodiments may perform entropy coding on the positions (or position values) of the points.

The point cloud video encoder (for example, the surface approximation analyzer 40003) according to the embodiments may determine a specific level of the octree (a level less than the depth d of the octree), and the surface model may be used staring with that level to perform trisoup geometry encoding to reconstruct the positions of points in the region of the node based on voxels (Trisoup mode). The point cloud video encoder according to the embodiments may specify a level at which trisoup geometry encoding is to be applied. For example, when the specific level is equal to the depth of the octree, the point cloud video encoder does not operate in the trisoup mode. In other words, the point cloud video encoder according to the embodiments may operate in the trisoup mode only when the specified level is less than the value of depth of the octree. The 3D cube region of the nodes at the specified level according to the embodiments is called a block. One block may include one or more voxels. The block or voxel may correspond to a brick. Geometry is represented as a surface within each block. The surface according to embodiments may intersect with each edge of a block at most once.

One block has 12 edges, and accordingly there are at least 12 intersections in one block. Each intersection is called a vertex (or apex). A vertex present along an edge is detected when there is at least one occupied voxel adjacent to the edge among all blocks sharing the edge. The occupied voxel according to the embodiments refers to a voxel containing a point. The position of the vertex detected along the edge is the average position along the edge of all voxels adjacent to the edge among all blocks sharing the edge.

Once the vertex is detected, the point cloud video encoder according to the embodiments may perform entropy encoding on the starting point (x, y, z) of the edge, the direction vector (Δx, Δy, Δz) of the edge, and the vertex position value (relative position value within the edge). When the trisoup geometry encoding is applied, the point cloud video encoder according to the embodiments (for example, the geometry reconstructor 40005) may generate restored geometry (reconstructed geometry) by performing the triangle reconstruction, up-sampling, and voxelization processes.

The vertices positioned at the edge of the block determine a surface that passes through the block. The surface according to the embodiments is a non-planar polygon. In the triangle reconstruction process, a surface represented by a triangle is reconstructed based on the starting point of the edge, the direction vector of the edge, and the position values of the vertices. The triangle reconstruction process is performed according to Equation 2 by: i) calculating the centroid value of each vertex, ii) subtracting the center value from each vertex value, and iii) estimating the sum of the squares of the values obtained by the subtraction.

Equation 2

$$\begin{bmatrix} \mu_x \\ \mu_y \\ \mu_z \end{bmatrix} = \frac{1}{n} \sum_{i=1}^{n} \begin{bmatrix} x_i \\ y_i \\ z_i \end{bmatrix} \quad \text{①}$$

$$\begin{bmatrix} \bar{x}_i \\ \bar{y}_i \\ \bar{z}_i \end{bmatrix} = \begin{bmatrix} x_i \\ y_i \\ z_i \end{bmatrix} - \begin{bmatrix} \mu_x \\ \mu_y \\ \mu_z \end{bmatrix} \quad \text{②}$$

$$\begin{bmatrix} \sigma_x^2 \\ \sigma_y^2 \\ \sigma_z^2 \end{bmatrix} = \sum_{i=1}^{n} \begin{bmatrix} \bar{x}_i^2 \\ \bar{y}_i^2 \\ \bar{z}_i^2 \end{bmatrix} \quad \text{③}$$

Then, the minimum value of the sum is estimated, and the projection process is performed according to the axis with the minimum value. For example, when the element x is the minimum, each vertex is projected on the x-axis with respect to the center of the block, and projected on the (y, z) plane. When the values obtained through projection on the (y, z) plane are (ai, bi), the value of θ is estimated through atan 2(bi, ai), and the vertices are ordered based on the value of θ. The table 1 below shows a combination of vertices for creating a triangle according to the number of the vertices. The vertices are ordered from 1 to n. The table 1 below shows that for four vertices, two triangles may be constructed according to combinations of vertices. The first triangle may consist of vertices 1, 2, and 3 among the ordered vertices, and the second triangle may consist of vertices 3, 4, and 1 among the ordered vertices.

TABLE 1

| n | Triangles |
|---|-----------|
| | (1, 2, 3) |
| | (1, 2, 3), (3, 4, 1) |
| | (1, 2, 3), (3, 4, 5), (5, 1, 3) |
| | (1, 2, 3), (3, 4, 5), (5, 6, 1), (1, 3, 5) |
| | (1, 2, 3), (3, 4, 5), (5, 6, 7), (7, 1, 3), (3, 5, 7) |
| | (1, 2, 3), (3, 4, 5), (5, 6, 7), (7, 8, 1), (1, 3, 5), (5, 7, 1) |
| | (1, 2, 3), (3, 4, 5), (5, 6, 7), (7, 8, 9), (9, 1, 3), (3, 5, 7), (7, 9, 3) |
| 0 | (1, 2, 3), (3, 4, 5), (5, 6, 7), (7, 8, 9), (9, 10, 1), (1, 3, 5), (5, 7, 9), (9, 1, 5) |
| 1 | (1, 2, 3), (3, 4, 5), (5, 6, 7), (7, 8, 9), (9, 10, 11), (11, 1, 3), (3, 5, 7), (7, 9, 11), (11, 3, 7) |
| 2 | (1, 2, 3), (3, 4, 5), (5, 6, 7), (7, 8, 9), (9, 10, 11), (11, 12, 1), (1, 3, 5), (5, 7, 9), (9, 11, 1), (1, 5, 9) |

The upsampling process is performed to add points in the middle along the edge of the triangle and perform voxelization. The added points are generated based on the upsampling factor and the width of the block. The added points are called refined vertices. The point cloud video encoder according to the embodiments may voxelize the refined vertices. In addition, the point cloud video encoder may perform attribute encoding based on the voxelized positions (or position values). FIG. 7 shows an example of a neighbor node pattern according to embodiments.

In order to increase the compression efficiency of the point cloud video, the point cloud video encoder according to the embodiments may perform entropy coding based on context adaptive arithmetic coding. The point cloud video encoder may entropy encode based on a context adaptive arithmetic coding to enhance compression efficiency of the point cloud video.

As described with reference to FIGS. 1 to 6, the point cloud content providing system or the point cloud video encoder 10002 of FIG. 1, or the point cloud video encoder or arithmetic encoder 40004 of FIG. 4 may perform entropy coding on the occupancy code immediately. In addition, the point cloud content providing system or the point cloud video encoder may perform entropy encoding (intra encoding) based on the occupancy code of the current node and the occupancy of neighboring nodes, or perform entropy encoding (inter encoding) based on the occupancy code of the previous frame. A frame according to embodiments represents a set of point cloud videos generated at the same time. The compression efficiency of intra encoding/inter encoding according to the embodiments may depend on the number of neighboring nodes that are referenced. When the bits increase, the operation becomes complicated, but the encoding may be biased to one side, which may increase the compression efficiency. For example, when a 3-bit context is given, coding needs to be performed using 23=8 methods. The part divided for coding affects the complexity of implementation. Accordingly, it is necessary to meet an appropriate level of compression efficiency and complexity.

FIG. 7 illustrates a process of obtaining an occupancy pattern based on the occupancy of neighbor nodes. The point cloud video encoder according to the embodiments determines occupancy of neighbor nodes of each node of the octree and obtains a value of a neighbor pattern. The neighbor node pattern is used to infer the occupancy pattern of the node. The up part of FIG. 7 shows a cube corresponding to a node (a cube positioned in the middle) and six cubes (neighbor nodes) sharing at least one face with the cube. The nodes shown in the figure are nodes of the same depth. The numbers shown in the figure represent weights (1, 2, 4, 8, 16, and 32) associated with the six nodes, respectively. The weights are assigned sequentially according to the positions of neighboring nodes.

The down part of FIG. 7 shows neighbor node pattern values. A neighbor node pattern value is the sum of values multiplied by the weight of an occupied neighbor node (a neighbor node having a point). Accordingly, the neighbor node pattern values are 0 to 63. When the neighbor node pattern value is 0, it indicates that there is no node having a point (no occupied node) among the neighbor nodes of the node. When the neighbor node pattern value is 63, it indicates that all neighbor nodes are occupied nodes. As shown in the figure, since neighbor nodes to which weights 1, 2, 4, and 8 are assigned are occupied nodes, the neighbor node pattern value is 15, the sum of 1, 2, 4, and 8. The point cloud video encoder may perform coding according to the neighbor node pattern value (for example, when the neighbor node pattern value is 63, 64 kinds of coding may be performed). According to embodiments, the point cloud video encoder may reduce coding complexity by changing a neighbor node pattern value (for example, based on a table by which 64 is changed to 10 or 6).

Figure 8:
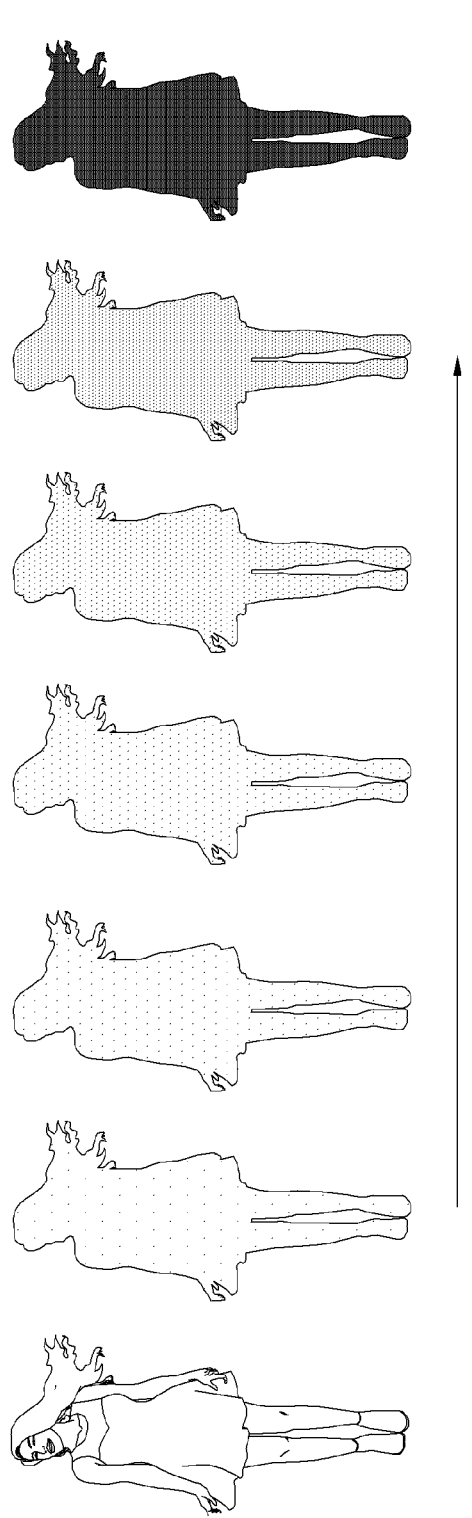
FIG. 8 illustrates an example of point configuration of a point cloud content for each LOD according to embodiments.

FIG. 8 illustrates an example of point configuration in each LOD according to embodiments.

As described with reference to FIGS. 1 to 7, encoded geometry is reconstructed (decompressed) before attribute encoding is performed. When direct coding is applied, the geometry reconstruction operation may include changing the placement of direct coded points (e.g., placing the direct coded points in front of the point cloud data). When trisoup geometry encoding is applied, the geometry reconstruction process is performed through triangle reconstruction, up-sampling, and voxelization. Since the attribute depends on the geometry, attribute encoding is performed based on the reconstructed geometry.

The point cloud video encoder (for example, the LOD generator 40009) may classify (or reorganize) points by LOD. FIG. 8 shows the point cloud content corresponding to LODs. The leftmost picture in FIG. 8 represents original point cloud content. The second picture from the left of FIG. 8 represents distribution of the points in the lowest LOD, and the rightmost picture in FIG. 8 represents distribution of the points in the highest LOD. That is, the points in the lowest LOD are sparsely distributed, and the points in the highest LOD are densely distributed. That is, as the LOD rises in the direction pointed by the arrow indicated at the bottom of FIG. 8, the space (or distance) between points is narrowed.

Figure 9:
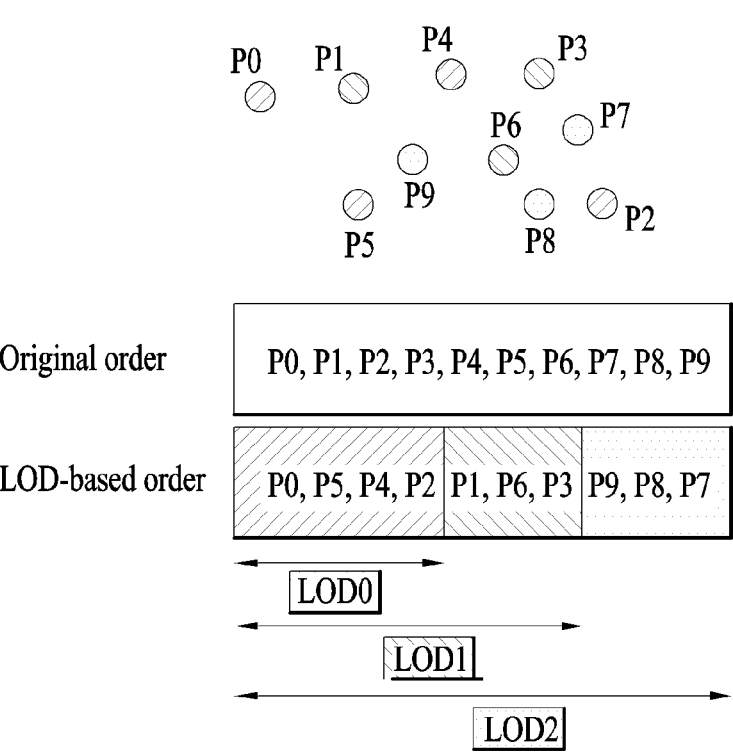
FIG. 9 illustrates an example of point configuration of a point cloud content for each LOD according to embodiments.

FIG. 9 illustrates an example of point configuration for each LOD according to embodiments.

As described with reference to FIGS. 1 to 8, the point cloud content providing system, or the point cloud video encoder (for example, the point cloud video encoder 10002 of FIG. 1, the point cloud video encoder of FIG. 4, or the LOD generator 40009) may generates an LOD. The LOD is generated by reorganizing the points into a set of refinement levels according to a set LOD distance value (or a set of Euclidean distances). The LOD generation process is performed not only by the point cloud video encoder, but also by the point cloud video decoder.

The upper part of FIG. 9 shows examples (P0 to P9) of points of the point cloud content distributed in a 3D space. In FIG. 9, the original order represents the order of points P0 to P9 before LOD generation. In FIG. 9, the LOD based order represents the order of points according to the LOD generation. Points are reorganized by LOD. Also, a high LOD contains the points belonging to lower LODs. As shown in FIG. 9, LOD0 contains P0, P5, P4 and P2. LOD1 contains the points of LOD0, P1, P6 and P3. LOD2 contains the points of LOD0, the points of LOD1, P9, P8 and P7.

As described with reference to FIG. 4, the point cloud video encoder according to the embodiments may perform prediction transform coding based on LOD, lifting transform coding based on LOD, and RAHT transform coding selectively or in combination.

The point cloud video encoder according to the embodiments may generate a predictor for points to perform prediction transform coding based on LOD for setting a predicted attribute (or predicted attribute value) of each point. That is, N predictors may be generated for N points. The predictor according to the embodiments may calculate a weight (=1/distance) based on the LOD value of each point, indexing information about neighboring points present within a set distance for each LOD, and a distance to the neighboring points.

The predicted attribute (or attribute value) according to the embodiments is set to the average of values obtained by multiplying the attributes (or attribute values) (e.g., color, reflectance, etc.) of neighbor points set in the predictor of each point by a weight (or weight value) calculated based on the distance to each neighbor point. The point cloud video encoder according to the embodiments (for example, the coefficient quantizer 40011) may quantize and inversely quantize the residual of each point (which may be called residual attribute, residual attribute value, attribute prediction residual value or prediction error attribute value and so on) obtained by subtracting a predicted attribute (or attribute value) each point from the attribute (i.e., original attribute value) of each point. The quantization process performed for a residual attribute value in a transmission device is configured as shown in Table 2. The inverse quantization process performed for a residual attribute value in a reception device is configured as shown in Table 3.

TABLE 2

```
int PCCQuantization(int value, int quantStep) {
if( value >=0) {
return floor(value / quantStep + 1.0 / 3.0);
} else {
return -floor(-value / quantStep + 1.0 / 3.0);
}
}
```

TABLE 3

```
int PCCInverseQuantization(int value, int quantStep) {
if( quantStep ==0) {
return value;
} else {
return value * quantStep;
}
}
```

When neighbor points are present in the predictor of each point, the point cloud video encoder (e.g., the arithmetic encoder 40012) according to the embodiments may perform entropy coding on the quantized and inversely quantized residual attribute values as described above. When there is no neighbor point in the predictor of each point, the point cloud video encoder (e.g., the arithmetic encoder 40012) according to the embodiments may perform entropy coding on attributes of a corresponding point without performing the above-described operation. The point cloud video encoder according to the embodiments (e.g., the lifting transformer 40010) may generate a predictor of each point, set an LOD calculated in the predictor and register neighbor points in the predictor, and set weights according to the distances to neighbor points to perform lifting transform coding. The lifting transform coding according to the embodiments is similar to the above-described LOD-based prediction transform coding but differs therefrom in that weights are cumulatively applied to attribute values. The process of cumulatively applying weights to the attribute values according to the embodiments is configured as follows.

1) Create an array Quantization Weight (QW) for storing the weight value of each point. The initial value of all elements of QW is 1.0. Multiply the QW values of the predictor indexes of the neighbor nodes registered in the predictor by the weight of the predictor of the current point, and add the values obtained by the multiplication.

2) Lift prediction process: Subtract the value obtained by multiplying the attribute value of the point by the weight from the existing attribute value to calculate a predicted attribute value.

3) Create temporary arrays called updateweight and update and initialize the temporary arrays to zero.

4) Cumulatively add the weights calculated by multiplying the weights calculated for all predictors by a weight stored in the QW corresponding to a predictor index to the updateweight array as indexes of neighbor nodes. Cumulatively add, to the update array, a value obtained by multiplying the attribute value of the index of a neighbor node by the calculated weight.

5) Lift update process: Divide the attribute values of the update array for all predictors by the weight value of the updateweight array of the predictor index, and add the existing attribute value to the values obtained by the division.

6) Calculate predicted attributes by multiplying the attribute values updated through the lift update process by the weight updated through the lift prediction process (stored in the QW) for all predictors. The point cloud video encoder (e.g., coefficient quantizer 40011) according to the embodiments quantizes the predicted attribute values. In addition, the point cloud video encoder (e.g., the arithmetic encoder 40012) performs entropy coding on the quantized attribute values.

The point cloud video encoder (for example, the RAHT transformer 40008) according to the embodiments may perform RAHT transform coding in which attributes of nodes of a higher level are predicted using the attributes associated with nodes of a lower level in the octree. RAHT transform coding is an example of attribute intra coding through an octree backward scan. The point cloud video encoder according to the embodiments scans the entire region from the voxel and repeats the merging process of merging the voxels into a larger block at each step until the root node is reached. The merging process according to the embodiments is performed only on the occupied nodes. The merging process is not performed on the empty node. The merging process is performed on an upper node immediately above the empty node.

Equation 3 below represents a RAHT transformation matrix. In Equation 3, $g_{l_{x,y,z}}$ denotes the average attribute value of voxels at level l. $g_{l_{x,y,z}}$ may be calculated based on $g_{l+1_{2x,y,z}}$ and $g_{l+1_{2x+1,y,z}}$. The weights for $g_{1_{2x,y,z}}$ and $g_{l_{2x+1,y,z}}$ are $w1=w_{l_{2x,y,z}}$ and $w2=w_{l_{2x+1,y,z}}$.

$$\begin{bmatrix} g_{l-1_{x,y,z}} \\ h_{l-1_{x,y,z}} \end{bmatrix} = T_{w1\ w2} \begin{bmatrix} g_{l_{2x,y,z}} \\ g_{l_{2x+1,y,z}} \end{bmatrix}$$

$$T_{w1\ w2} = \frac{1}{\sqrt{w1+w2}} \begin{bmatrix} \sqrt{w1} & \sqrt{w2} \\ -\sqrt{w2} & \sqrt{w1} \end{bmatrix}$$

Equation 3

Here, $g_{l-1_{x,y,z}}$ is a low-pass value and is used in the merging process at the next higher level. $h_{l-1_{x,y,z}}$ denotes high-pass coefficients. The high-pass coefficients at each step are quantized and subjected to entropy coding (for example, encoding by the arithmetic encoder 40012). The weights are calculated as $w_{l-1_{x,y,z}}=w_{l_{2x,y,z}}+w_{l_{2x+1,y,z}}$. The root node is created through the $g_{1_{0,0,0}}$ and $g_{1_{0,0,1}}$ as Equation 4.

$$\begin{bmatrix} gDC \\ h_{0_{0,0,0}} \end{bmatrix} = T_{w1000\ w1001} \begin{bmatrix} g_{1_{0,0,0z}} \\ g_{1_{0,0,1}} \end{bmatrix}$$

Equation 4

The value of gDC is also quantized and subjected to entropy coding like the high-pass coefficients.

Figure 10:
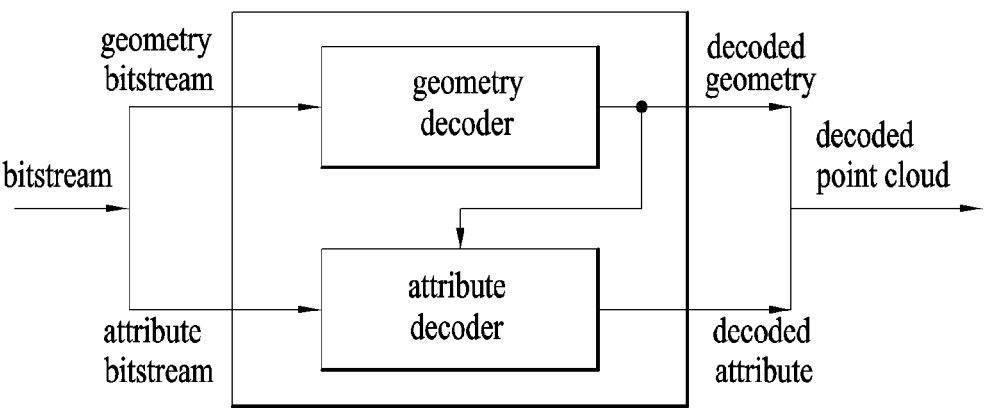
FIG. 10 illustrates an example of a block diagram of a point cloud video decoder according to embodiments.

FIG. 10 illustrates a point cloud video decoder according to embodiments.

The point cloud video decoder illustrated in FIG. 10 is an example of the point cloud video decoder 10006 described in FIG. 1, and may perform the same or similar operations as the operations of the point cloud video decoder 10006 illustrated in FIG. 1. As shown in the figure, the point cloud video decoder may receive a geometry bitstream and an attribute bitstream contained in one or more bitstreams. The point cloud video decoder includes a geometry decoder and an attribute decoder. The geometry decoder performs geometry decoding on the geometry bitstream and outputs decoded geometry. The attribute decoder performs attribute decoding on the attribute bitstream based on the decoded geometry, and outputs decoded attributes. The decoded geometry and decoded attributes are used to reconstruct point cloud content (a decoded point cloud).

Figure 11:
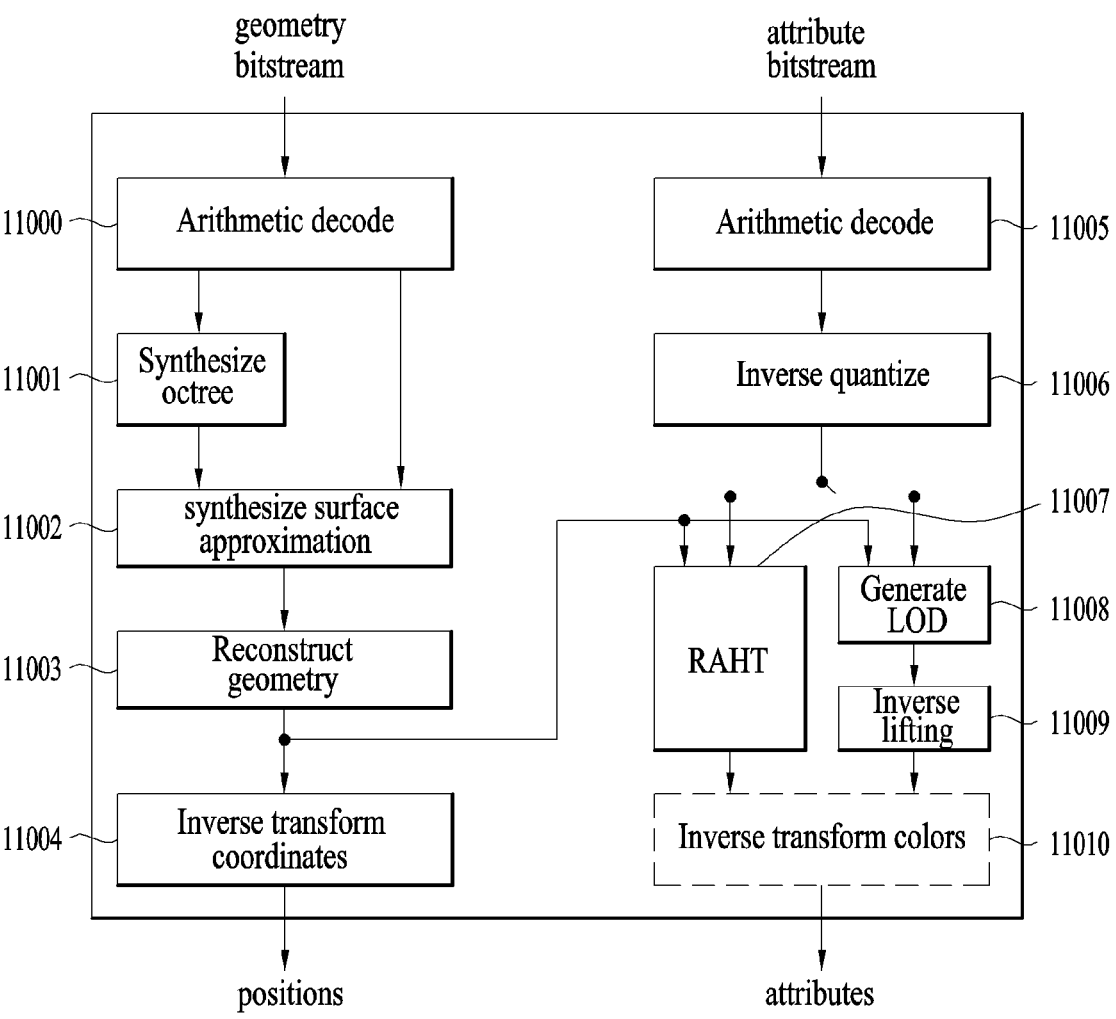
FIG. 11 illustrates an example of a point cloud video decoder according to embodiments.

FIG. 11 illustrates a point cloud video decoder according to embodiments.

The point cloud video decoder illustrated in FIG. 11 is an example of the point cloud video decoder illustrated in FIG. 10, and may perform a decoding operation, which is a reverse process of the encoding operation of the point cloud video encoder illustrated in FIGS. 1 to 9.

As described with reference to FIGS. 1 and 10, the point cloud video decoder may perform geometry decoding and attribute decoding. The geometry decoding is performed before the attribute decoding.

The point cloud video decoder according to the embodiments includes an arithmetic decoder (Arithmetic decode) 11000, an octree synthesizer (Synthesize octree) 11001, a surface approximation synthesizer (Synthesize surface approximation) 11002, and a geometry reconstructor (Reconstruct geometry) 11003, a coordinate inverse transformer (Inverse transform coordinates) 11004, an arithmetic decoder (Arithmetic decode) 11005, an inverse quantizer (Inverse quantize) 11006, a RAHT transformer 11007, an LOD generator (Generate LOD) 11008, an inverse lifter (inverse lifting) 11009, and/or a color inverse transformer (Inverse transform colors) 11010.

The arithmetic decoder 11000, the octree synthesizer 11001, the surface approximation synthesizer 11002, and the geometry reconstructor 11003, and the coordinate inverse transformer 11004 may perform geometry decoding. The geometry decoding according to the embodiments may include direct decoding and trisoup geometry decoding. The direct decoding and trisoup geometry decoding are selectively applied. The geometry decoding is not limited to the above-described example, and is performed as an inverse process of the geometry encoding described with reference to FIGS. 1 to 9.

The arithmetic decoder 11000 according to the embodiments decodes the received geometry bitstream based on the arithmetic coding. The operation of the arithmetic decoder 11000 corresponds to the inverse process of the arithmetic encoder 40004.

The octree synthesizer 11001 according to the embodiments may generate an octree by acquiring an occupancy code from the decoded geometry bitstream (or information on the geometry secured as a result of decoding). The occupancy code is configured as described in detail with reference to FIGS. 1 to 9.

When the trisoup geometry encoding is applied, the surface approximation synthesizer 11002 according to the embodiments may synthesize a surface based on the decoded geometry and/or the generated octree.

The geometry reconstructor 11003 according to the embodiments may regenerate geometry based on the surface and/or the decoded geometry. As described with reference to FIGS. 1 to 9, direct coding and trisoup geometry encoding are selectively applied. Accordingly, the geometry reconstructor 11003 directly imports and adds position information about the points to which direct coding is applied. When the trisoup geometry encoding is applied, the geometry reconstructor 11003 may reconstruct the geometry by performing the reconstruction operations of the geometry reconstructor 40005, for example, triangle reconstruction, up-sampling, and voxelization. Details are the same as those described with reference to FIG. 6, and thus description thereof is omitted. The reconstructed geometry may include a point cloud picture or frame that does not contain attributes.

The coordinate inverse transformer 11004 according to the embodiments may acquire positions of the points by transforming the coordinates based on the reconstructed geometry.

The arithmetic decoder 11005, the inverse quantizer 11006, the RAHT transformer 11007, the LOD generator 11008, the inverse lifter 11009, and/or the color inverse transformer 11010 may perform the attribute decoding described with reference to FIG. 10. The attribute decoding according to the embodiments includes region adaptive hierarchical transform (RAHT) decoding, interpolation-based hierarchical nearest-neighbor prediction (prediction transform) decoding, and interpolation-based hierarchical nearest-neighbor prediction with an update/lifting step (lifting transform) decoding. The three decoding schemes described above may be used selectively, or a combination of one or more decoding schemes may be used. The attribute decoding according to the embodiments is not limited to the above-described example.

The arithmetic decoder 11005 according to the embodiments decodes the attribute bitstream by arithmetic coding.

The inverse quantizer 11006 according to the embodiments inversely quantizes the information about the decoded attribute bitstream or attributes secured as a result of the decoding, and outputs the inversely quantized attributes (or attribute values). The inverse quantization may be selectively applied based on the attribute encoding of the point cloud video encoder.

According to embodiments, the RAHT transformer 11007, the LOD generator 11008, and/or the inverse lifter 11009 may process the reconstructed geometry and the inversely quantized attributes. As described above, the RAHT transformer 11007, the LOD generator 11008, and/or the inverse lifter 11009 may selectively perform a decoding operation corresponding to the encoding of the point cloud video encoder.

The color inverse transformer 11010 according to the embodiments performs inverse transform coding to inversely transform a color value (or texture) included in the decoded attributes. The operation of the color inverse transformer 11010 may be selectively performed based on the operation of the color transformer 40006 of the point cloud video encoder.

Although not shown in the figure, the elements of the point cloud video decoder of FIG. 11 may be implemented by hardware including one or more processors or integrated circuits configured to communicate with one or more memories included in the point cloud content providing apparatus, software, firmware, or a combination thereof. The one or more processors may perform at least one or more of the operations and/or functions of the elements of the point cloud video decoder of FIG. 11 described above. Additionally, the one or more processors may operate or execute a set of software programs and/or instructions for performing the operations and/or functions of the elements of the point cloud video decoder of FIG. 11.

Figure 12:
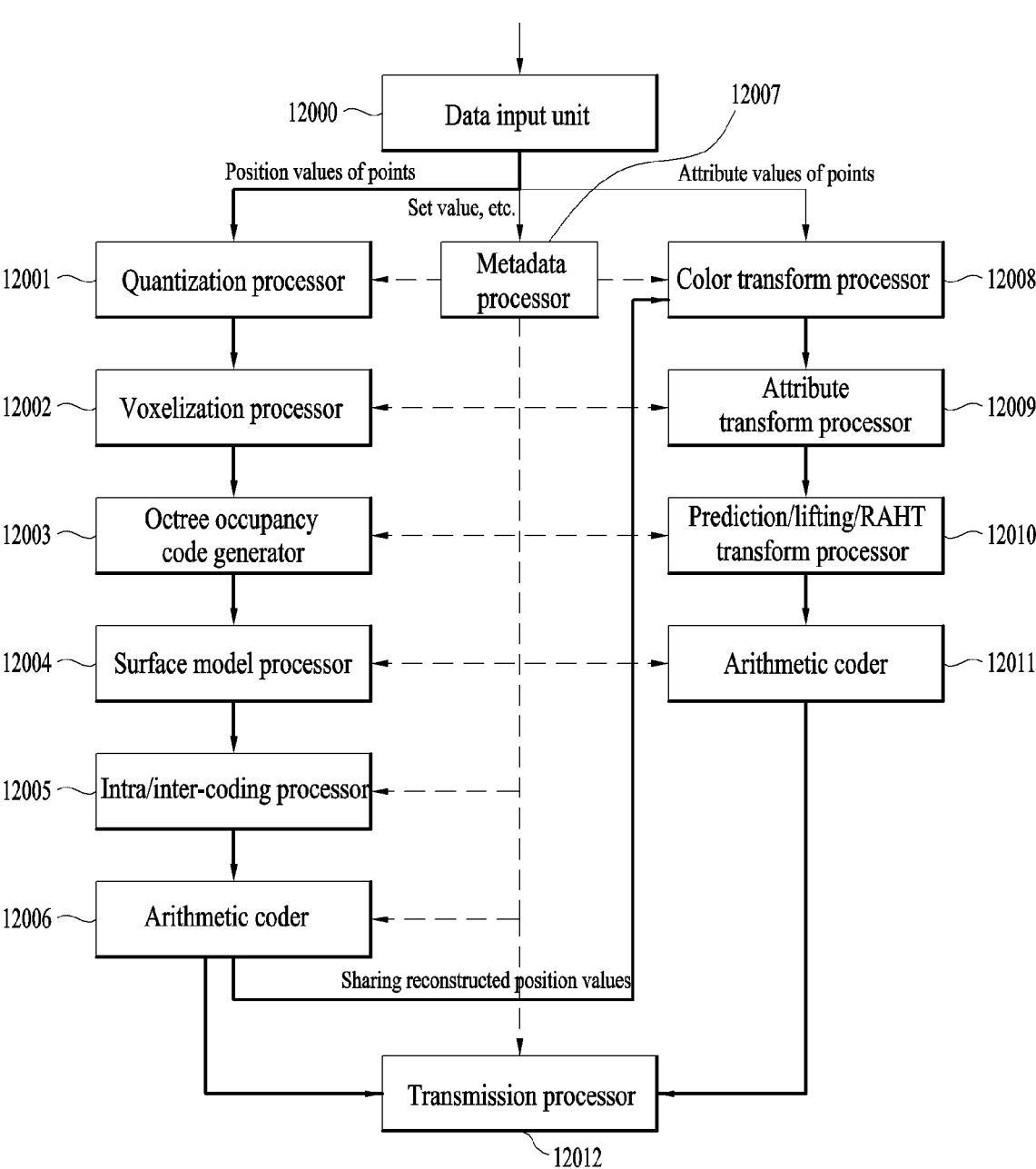
FIG. 12 illustrates a configuration for point cloud video encoding of a transmission device according to embodiments.

FIG. 12 illustrates a transmission device according to embodiments.

The transmission device shown in FIG. 12 is an example of the transmission device 10000 of FIG. 1 (or the point cloud video encoder of FIG. 4). The transmission device illustrated in FIG. 12 may perform one or more of the operations and methods the same as or similar to those of the point cloud video encoder described with reference to FIGS. 1 to 9. The transmission device according to the embodiments may include a data input unit 12000, a quantization processor 12001, a voxelization processor 12002, an octree occupancy code generator 12003, a surface model processor 12004, an intra/inter-coding processor 12005, an arithmetic coder 12006, a metadata processor 12007, a color transform processor 12008, an attribute transform processor 12009, a prediction/lifting/RAHT transform processor 12010, an arithmetic coder 12011 and/or a transmission processor 12012.

The data input unit 12000 according to the embodiments receives or acquires point cloud data. The data input unit 12000 may perform an operation and/or acquisition method the same as or similar to the operation and/or acquisition method of the point cloud video acquisition unit 10001 (or the acquisition process 20000 described with reference to FIG. 2).

The data input unit 12000, the quantization processor 12001, the voxelization processor 12002, the octree occupancy code generator 12003, the surface model processor 12004, the intra/inter-coding processor 12005, and the arithmetic coder 12006 perform geometry encoding. The geometry encoding according to the embodiments is the same as or similar to the geometry encoding described with reference to FIGS. 1 to 9, and thus a detailed description thereof is omitted.

The quantization processor 12001 according to the embodiments quantizes geometry (e.g., position values of points). The operation and/or quantization of the quantization processor 12001 is the same as or similar to the operation and/or quantization of the quantizer 40001 described with reference to FIG. 4. Details are the same as those described with reference to FIGS. 1 to 9.

The voxelization processor 12002 according to embodiments voxelizes the quantized position values of the points. The voxelization processor 12002 may perform an operation and/or process the same or similar to the operation and/or the voxelization process of the quantizer 40001 described with reference to FIG. 4. Details are the same as those described with reference to FIGS. 1 to 9.

The octree occupancy code generator 12003 according to the embodiments performs octree coding on the voxelized positions of the points based on an octree structure. The octree occupancy code generator 12003 may generate an occupancy code. The octree occupancy code generator 12003 may perform an operation and/or method the same as or similar to the operation and/or method of the point cloud video encoder (or the octree analyzer 40002) described with reference to FIGS. 4 and 6. Details are the same as those described with reference to FIGS. 1 to 9.

The surface model processor 12004 according to the embodiments may perform trigsoup geometry encoding based on a surface model to reconstruct the positions of points in a specific region (or node) on a voxel basis. The surface model processor 12004 may perform an operation and/or method the same as or similar to the operation and/or method of the point cloud video encoder (for example, the surface approximation analyzer 40003) described with reference to FIG. 4. Details are the same as those described with reference to FIGS. 1 to 9.

The intra/inter-coding processor 12005 according to the embodiments may perform intra/inter-coding on point cloud data. The intra/inter-coding processor 12005 may perform coding the same as or similar to the intra/inter-coding described with reference to FIG. 7. Details are the same as those described with reference to FIG. 7. According to embodiments, the intra/inter-coding processor 12005 may be included in the arithmetic coder 12006.

The arithmetic coder 12006 according to the embodiments performs entropy encoding on an octree of the point cloud data and/or an approximated octree. For example, the encoding scheme includes arithmetic encoding. The arithmetic coder 12006 performs an operation and/or method the same as or similar to the operation and/or method of the arithmetic encoder 40004.

The metadata processor 12007 according to the embodiments processes metadata about the point cloud data, for example, a set value, and provides the same to a necessary processing process such as geometry encoding and/or attribute encoding. Also, the metadata processor 12007 according to the embodiments may generate and/or process signaling information related to the geometry encoding and/or the attribute encoding. The signaling information according to the embodiments may be encoded separately from the geometry encoding and/or the attribute encoding. The signaling information according to the embodiments may be interleaved.

The color transform processor 12008, the attribute transform processor 12009, the prediction/lifting/RAHT transform processor 12010, and the arithmetic coder 12011 perform the attribute encoding. The attribute encoding according to the embodiments is the same as or similar to the attribute encoding described with reference to FIGS. 1 to 9, and thus a detailed description thereof is omitted.

The color transform processor 12008 according to the embodiments performs color transform coding to transform color values included in attributes. The color transform processor 12008 may perform color transform coding based on the reconstructed geometry. The reconstructed geometry is the same as described with reference to FIGS. 1 to 9. Also, it performs an operation and/or method the same as or similar to the operation and/or method of the color transformer 40006 described with reference to FIG. 4 is performed. A detailed description thereof is omitted.

The attribute transform processor 12009 according to the embodiments performs attribute transformation to transform the attributes based on the reconstructed geometry and/or the positions on which geometry encoding is not performed. The attribute transform processor 12009 performs an operation and/or method the same as or similar to the operation and/or method of the attribute transformer 40007 described with reference to FIG. 4. A detailed description thereof is omitted. The prediction/lifting/RAHT transform processor 12010 according to the embodiments may code the transformed attributes by any one or a combination of RAHT coding, prediction transform coding, and lifting transform coding. The prediction/lifting/RAHT transform processor 12010 performs at least one of the operations the same as or similar to the operations of the RAHT transformer 40008, the LOD generator 40009, and the lifting transformer 40010 described with reference to FIG. 4. In addition, the prediction transform coding, the lifting transform coding, and the RAHT transform coding are the same as those described with reference to FIGS. 1 to 9, and thus a detailed description thereof is omitted.

The arithmetic coder 12011 according to the embodiments may encode the coded attributes based on the arithmetic coding. The arithmetic coder 12011 performs an operation and/or method the same as or similar to the operation and/or method of the arithmetic encoder 40012.

The transmission processor 12012 according to the embodiments may transmit each bitstream containing encoded geometry and/or encoded attributes and metadata, or transmit one bitstream configured with the encoded geometry and/or the encoded attributes and the metadata. When the encoded geometry and/or the encoded attributes and the metadata according to the embodiments are configured into one bitstream, the bitstream may include one or more sub-bitstreams. The bitstream according to the embodiments may contain signaling information including a sequence parameter set (SPS) for signaling of a sequence level, a geometry parameter set (GPS) for signaling of geometry information coding, an attribute parameter set (APS) for signaling of attribute information coding, and a tile parameter set (TPS or tile inventory) for signaling of a tile level, and slice data. The slice data may include information about one or more slices. One slice according to embodiments may include one geometry bitstream Geom00 and one or more attribute bitstreams Attr00 and Attr10. The TPS (or tile inventory) according to the embodiments may include information about each tile (for example, coordinate information and height/size information about a bounding box) for one or more tiles. The geometry bitstream may contain a header and a payload. The header of the geometry bitstream according to the embodiments may contain a parameter set identifier (geom_parameter_set_id), a tile identifier (geom_tile_id) and a slice identifier (geom_slice_id) included in the GPS, and information about the data contained in the payload. As described above, the metadata processor 12007 according to the embodiments may generate and/or process the signaling information and transmit the same to the transmission processor 12012. According to embodiments, the elements to perform geometry encoding and the elements to perform attribute encoding may share data/information with each other as indicated by dotted lines. The transmission processor 12012 according to the embodiments may perform an operation and/or transmission method the same as or similar to the operation and/or transmission method of the transmitter 10003. Details are the same as those described with reference to FIGS. 1 and 2, and thus a description thereof is omitted.

Figure 13:
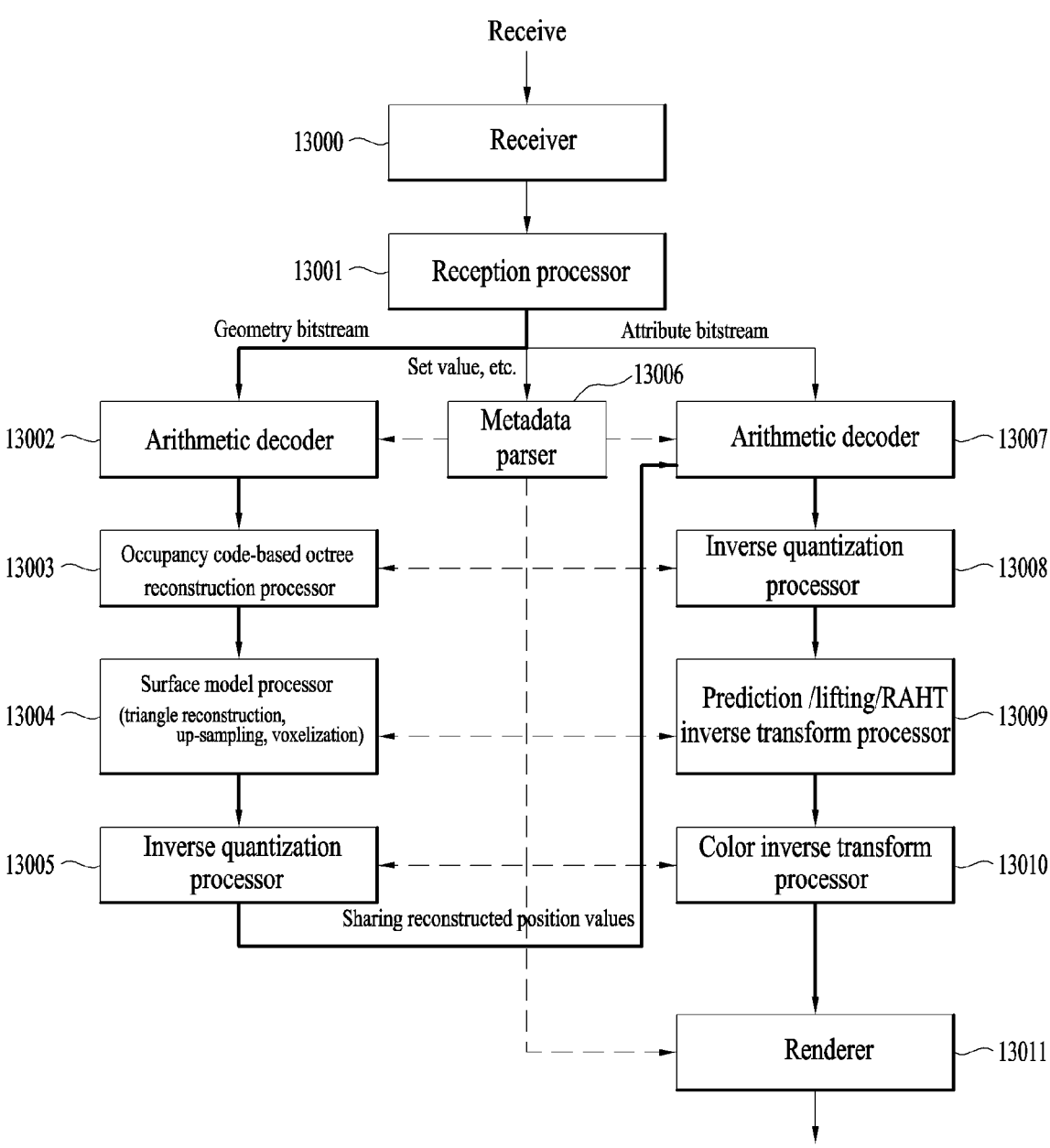
FIG. 13 illustrates a configuration for point cloud video decoding of a reception device according to embodiments.

FIG. 13 illustrates a reception device according to embodiments.

The reception device illustrated in FIG. 13 is an example of the reception device 10004 of FIG. 1 (or the point cloud video decoder of FIGS. 10 and 11). The reception device illustrated in FIG. 13 may perform one or more of the operations and methods the same as or similar to those of the point cloud video decoder described with reference to FIGS. 1 to 11.

The reception device according to the embodiment may include a receiver 13000, a reception processor 13001, an arithmetic decoder 13002, an occupancy code-based octree reconstruction processor 13003, a surface model processor (triangle reconstruction, up-sampling, voxelization) 13004, an inverse quantization processor 13005, a metadata parser 13006, an arithmetic decoder 13007, an inverse quantization processor 13008, a prediction/lifting/RAHT inverse transform processor 13009, a color inverse transform processor 13010, and/or a renderer 13011. Each element for decoding according to the embodiments may perform a reverse process of the operation of a corresponding element for encoding according to the embodiments.

The receiver 13000 according to the embodiments receives point cloud data. The receiver 13000 may perform an operation and/or reception method the same as or similar to the operation and/or reception method of the receiver 10005 of FIG. 1. A detailed description thereof is omitted.

The reception processor 13001 according to the embodiments may acquire a geometry bitstream and/or an attribute bitstream from the received data. The reception processor 13001 may be included in the receiver 13000.

The arithmetic decoder 13002, the occupancy code-based octree reconstruction processor 13003, the surface model processor 13004, and the inverse quantization processor 1305 may perform geometry decoding. The geometry decoding according to embodiments is the same as or similar to the geometry decoding described with reference to FIGS. 1 to 10, and thus a detailed description thereof is omitted.

The arithmetic decoder 13002 according to the embodiments may decode the geometry bitstream based on arithmetic coding. The arithmetic decoder 13002 performs an operation and/or coding the same as or similar to the operation and/or coding of the arithmetic decoder 11000.

The occupancy code-based octree reconstruction processor 13003 according to the embodiments may reconstruct an octree by acquiring an occupancy code from the decoded geometry bitstream (or information about the geometry secured as a result of decoding). The occupancy code-based octree reconstruction processor 13003 performs an operation and/or method the same as or similar to the operation and/or octree generation method of the octree synthesizer 11001. When the trisoup geometry encoding is applied, the surface model processor 13004 according to the embodiments may perform trisoup geometry decoding and related geometry reconstruction (for example, triangle reconstruction, up-sampling, voxelization) based on the surface model method. The surface model processor 13004 performs an operation the same as or similar to that of the surface approximation synthesizer 11002 and/or the geometry reconstructor 11003.

The inverse quantization processor 13005 according to the embodiments may inversely quantize the decoded geometry.

The metadata parser 13006 according to the embodiments may parse metadata contained in the received point cloud data, for example, a set value. The metadata parser 13006 may pass the metadata to geometry decoding and/or attribute decoding. The metadata is the same as that described with reference to FIG. 12, and thus a detailed description thereof is omitted.

The arithmetic decoder 13007, the inverse quantization processor 13008, the prediction/lifting/RAHT inverse transform processor 13009 and the color inverse transform processor 13010 perform attribute decoding. The attribute decoding is the same as or similar to the attribute decoding described with reference to FIGS. 1 to 10, and thus a detailed description thereof is omitted.

The arithmetic decoder 13007 according to the embodiments may decode the attribute bitstream by arithmetic coding. The arithmetic decoder 13007 may decode the attribute bitstream based on the reconstructed geometry. The arithmetic decoder 13007 performs an operation and/or coding the same as or similar to the operation and/or coding of the arithmetic decoder 11005.

The inverse quantization processor 13008 according to the embodiments may inversely quantize the decoded attribute bitstream. The inverse quantization processor 13008 performs an operation and/or method the same as or similar to the operation and/or inverse quantization method of the inverse quantizer 11006.

The prediction/lifting/RAHT inverse transform processor 13009 according to the embodiments may process the reconstructed geometry and the inversely quantized attributes. The prediction/lifting/RAHT inverse transform processor 13009 performs one or more of operations and/or decoding which are the same as or similar to the operations and/or decoding of the RAHT transformer 11007, the LOD generator 11008, and/or the inverse lifter 11009. The color inverse transform processor 13010 according to the embodiments performs inverse transform coding to inversely transform color values (or textures) included in the decoded attributes. The color inverse transform processor 13010 performs an operation and/or inverse transform coding the same as or similar to the operation and/or inverse transform coding of the color inverse transformer 11010. The renderer 13011 according to the embodiments may render the point cloud data.

Figure 14:
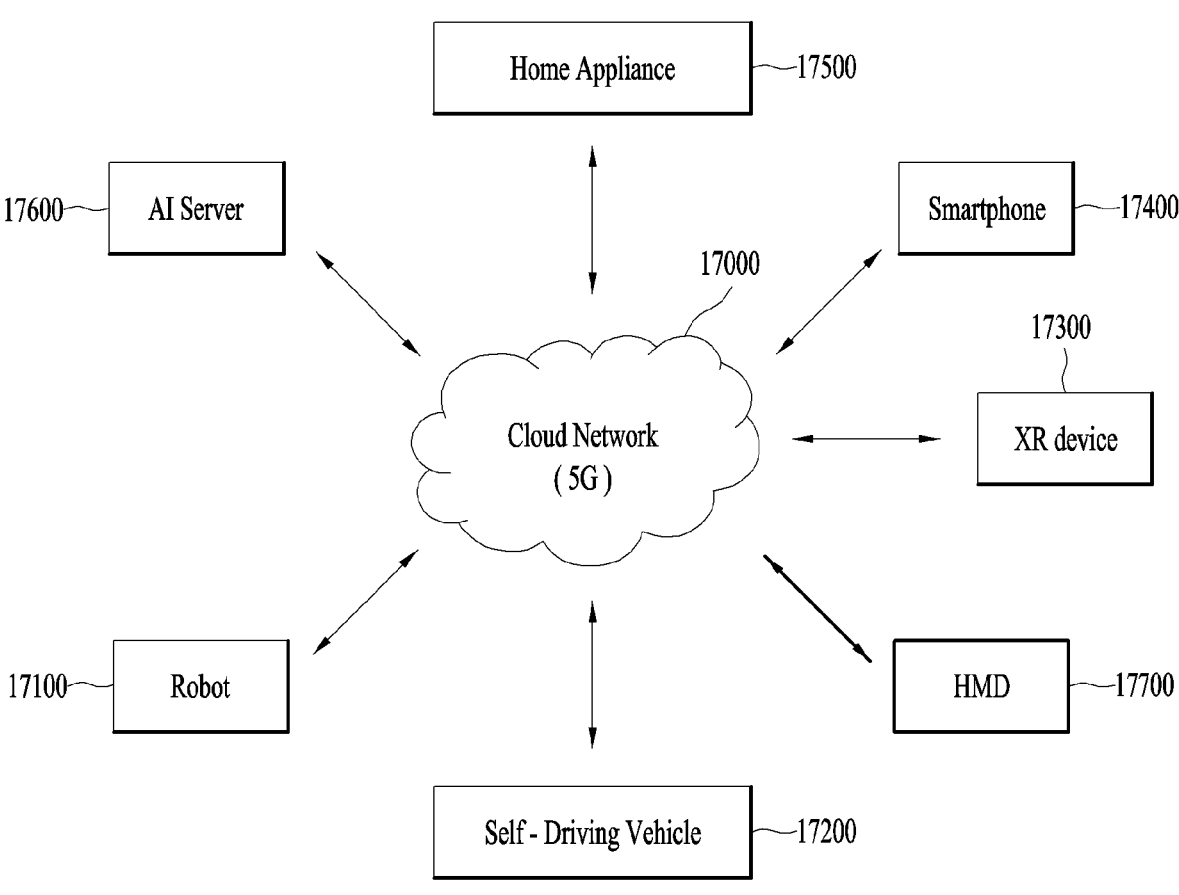
FIG. 14 illustrates an exemplary structure operable in connection with point cloud data methods/devices according to embodiments.

FIG. 14 shows an exemplary structure operatively connectable with a method/device for transmitting and receiving point cloud data according to embodiments.

The structure of FIG. 14 represents a configuration in which at least one of a server 17600, a robot 17100, a self-driving vehicle 17200, an XR device 17300, a smartphone 17400, a home appliance 17500, and/or a head-mount display (HMD) 17700 is connected to a cloud network 17000. The robot 17100, the self-driving vehicle 17200, the XR device 17300, the smartphone 17400, or the home appliance 17500 is referred to as a device. In addition, the XR device 17300 may correspond to a point cloud compressed data (PCC) device according to embodiments or may be operatively connected to the PCC device.

The cloud network 17000 may represent a network that constitutes part of the cloud computing infrastructure or is present in the cloud computing infrastructure. Here, the cloud network 17000 may be configured using a 3G network, 4G or Long Term Evolution (LTE) network, or a 5G network.

The server 17600 may be connected to at least one of the robot 17100, the self-driving vehicle 17200, the XR device 17300, the smartphone 17400, the home appliance 17500, and/or the HMD 17700 over the cloud network 17000 and may assist in at least a part of the processing of the connected devices 17100 to 17700.

The HMD 17700 represents one of the implementation types of the XR device and/or the PCC device according to the embodiments. The HMD type device according to the embodiments includes a communication unit, a control unit, a memory, an I/O unit, a sensor unit, and a power supply unit.

Hereinafter, various embodiments of the devices 17100 to 17500 to which the above-described technology is applied will be described. The devices 17100 to 17500 illustrated in FIG. 14 may be operatively connected/coupled to a point cloud data transmission device and reception according to the above-described embodiments.

<PCC+XR>

The XR/PCC device 17300 may employ PCC technology and/or XR (AR+VR) technology, and may be implemented as an HMD, a head-up display (HUD) provided in a vehicle, a television, a mobile phone, a smartphone, a computer, a wearable device, a home appliance, a digital signage, a vehicle, a stationary robot, or a mobile robot.

The XR/PCC device 17300 may analyze 3D point cloud data or image data acquired through various sensors or from an external device and generate position data and attribute data about 3D points. Thereby, the XR/PCC device 17300 may acquire information about the surrounding space or a real object, and render and output an XR object. For example, the XR/PCC device 17300 may match an XR object including auxiliary information about a recognized object with the recognized object and output the matched XR object.

<PCC+Self-Driving+XR>

The self-driving vehicle 17200 may be implemented as a mobile robot, a vehicle, an unmanned aerial vehicle, or the like by applying the PCC technology and the XR technology.

The self-driving vehicle 17200 to which the XR/PCC technology is applied may represent a self-driving vehicle provided with means for providing an XR image, or a self-driving vehicle that is a target of control/interaction in the XR image. In particular, the self-driving vehicle 17200 which is a target of control/interaction in the XR image may be distinguished from the XR device 17300 and may be operatively connected thereto.

The self-driving vehicle 17200 having means for providing an XR/PCC image may acquire sensor information from sensors including a camera, and output the generated XR/PCC image based on the acquired sensor information. For example, the self-driving vehicle 17200 may have an HUD and output an XR/PCC image thereto, thereby providing an occupant with an XR/PCC object corresponding to a real object or an object present on the screen.

When the XR/PCC object is output to the HUD, at least a part of the XR/PCC object may be output to overlap the real object to which the occupant's eyes are directed. On the other hand, when the XR/PCC object is output on a display provided inside the self-driving vehicle, at least a part of the XR/PCC object may be output to overlap an object on the screen. For example, the self-driving vehicle 17200 may output XR/PCC objects corresponding to objects such as a road, another vehicle, a traffic light, a traffic sign, a two-wheeled vehicle, a pedestrian, and a building.

The virtual reality (VR) technology, the augmented reality (AR) technology, the mixed reality (MR) technology and/or the point cloud compression (PCC) technology according to the embodiments are applicable to various devices.

In other words, the VR technology is a display technology that provides only CG images of real-world objects, backgrounds, and the like. On the other hand, the AR technology refers to a technology that shows a virtually created CG image on the image of a real object. The MR technology is similar to the AR technology described above in that virtual objects to be shown are mixed and combined with the real world. However, the MR technology differs from the AR technology in that the AR technology makes a clear distinction between a real object and a virtual object created as a CG image and uses virtual objects as complementary objects for real objects, whereas the MR technology treats virtual objects as objects having equivalent characteristics as real objects. More specifically, an example of MR technology applications is a hologram service.

Recently, the VR, AR, and MR technologies are sometimes referred to as extended reality (XR) technology rather than being clearly distinguished from each other. Accordingly, embodiments of the present disclosure are applicable to any of the VR, AR, MR, and XR technologies. The encoding/decoding based on PCC, V-PCC, and G-PCC techniques is applicable to such technologies.

The PCC method/device according to the embodiments may be applied to a vehicle that provides a self-driving service.

A vehicle that provides the self-driving service is connected to a PCC device for wired/wireless communication.

When the point cloud compression data (PCC) transmission/reception device according to the embodiments is connected to a vehicle for wired/wireless communication, the device may receive/process content data related to an AR/VR/PCC service, which may be provided together with the self-driving service, and transmit the same to the vehicle. In the case where the PCC transmission/reception device is mounted on a vehicle, the PCC transmission/reception device may receive/process content data related to the AR/VR/PCC service according to a user input signal input through a user interface device and provide the same to the user. The vehicle or the user interface device according to the embodiments may receive a user input signal. The user input signal according to the embodiments may include a signal indicating the self-driving service.

As described with reference to FIGS. 1 to 14, the point cloud data may include a set of points, and each point may have a geometry (referred to also as geometry information) and an attribute (referred to as attribute information). The geometry information represents three dimensional position information (xyz) of each point. That is, the position of each point is represented by parameters in a coordinate system representing a three-dimensional space (e.g., parameters (x, y, z) of three axes, X, Y, and Z axes, representing a space). The attribute information represents color (RGB, YUV, etc.), reflectance, normal vectors, transparency, etc. of the point.

The point cloud data transmission device according to the embodiments may perform low-latency coding according to content characteristics of point cloud data. For example, when point cloud data is data captured in real time from a LiDAR or a 3D map data transmitted in real time, the point cloud data transmission device needs to process the point cloud data to minimize latency and provide high compression efficiency.

According to embodiments, a point cloud data encoding process includes compressing geometry information based on an octree, a trisoup, or a predictive tree and compressing attribute information based on geometry information reconstructed (or decoded) by position information changed through compression. A point cloud data decoding process includes receiving an encoded geometry bitstream and an encoded attribute bitstream, decoding geometry information based on an octree, a trisoup, or a predictive tree, and decoding attribute information based on geometry information reconstructed through a decoding operation.

A point cloud video encoder of a transmitting side may further perform a space partitioning process of dividing or partitioning point cloud data into one or more 3D blocks before encoding the point cloud data based one an octree, a trisoup, or a predictive tree. That is, a transmission device may partition the point cloud data into a plurality of regions in order to perform encoding and transmission operations of the transmission device and decoding and rendering operations of a reception device in real time and to process the operations with low latency. The transmission device provides an effect of enabling random access and parallel encoding in a 3D space occupied by the point cloud data by independently or dependently encoding each of spatially partitioned regions (or blocks). The transmission device and the reception device may prevent errors accumulated in the encoding and decoding processes by independently performing encoding and decoding in units of the spatially partitioned region (or block).

Figure 15:
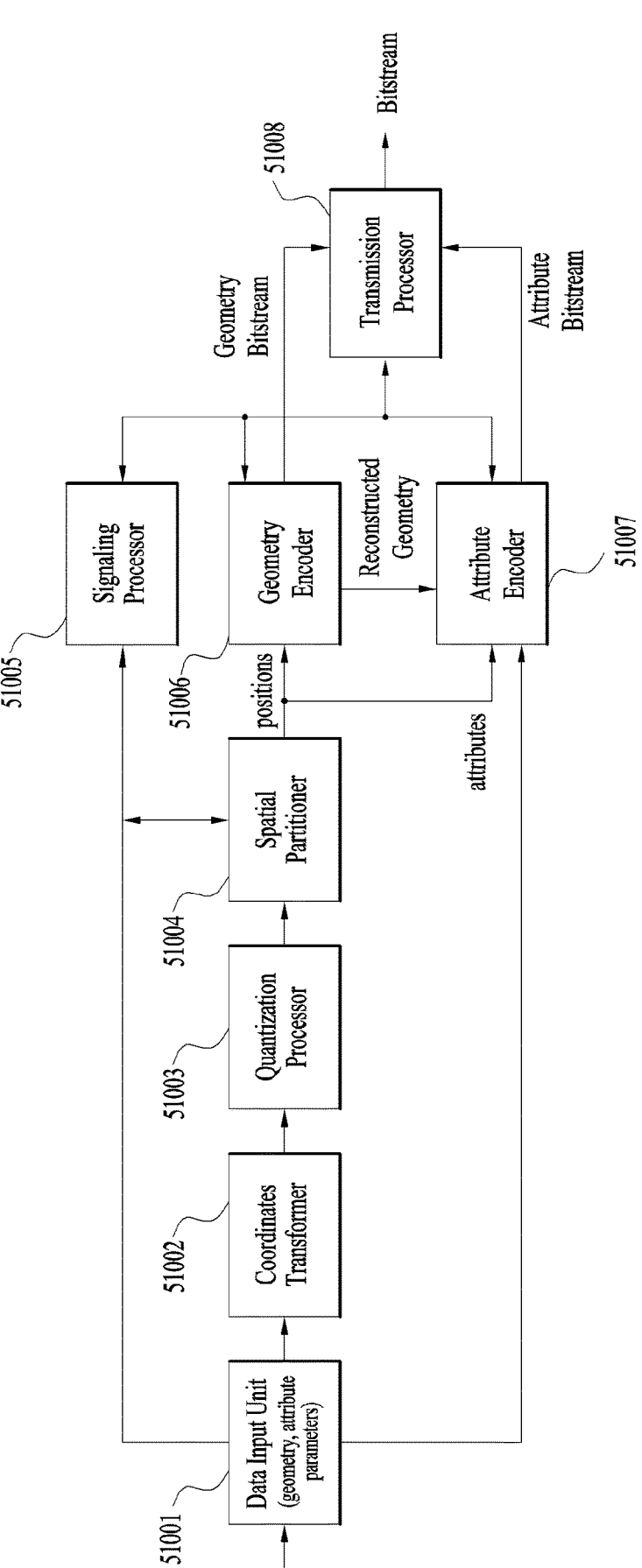
FIG. 15 is a diagram illustrating another example of a point cloud transmission device according to embodiments.
Figure 16:
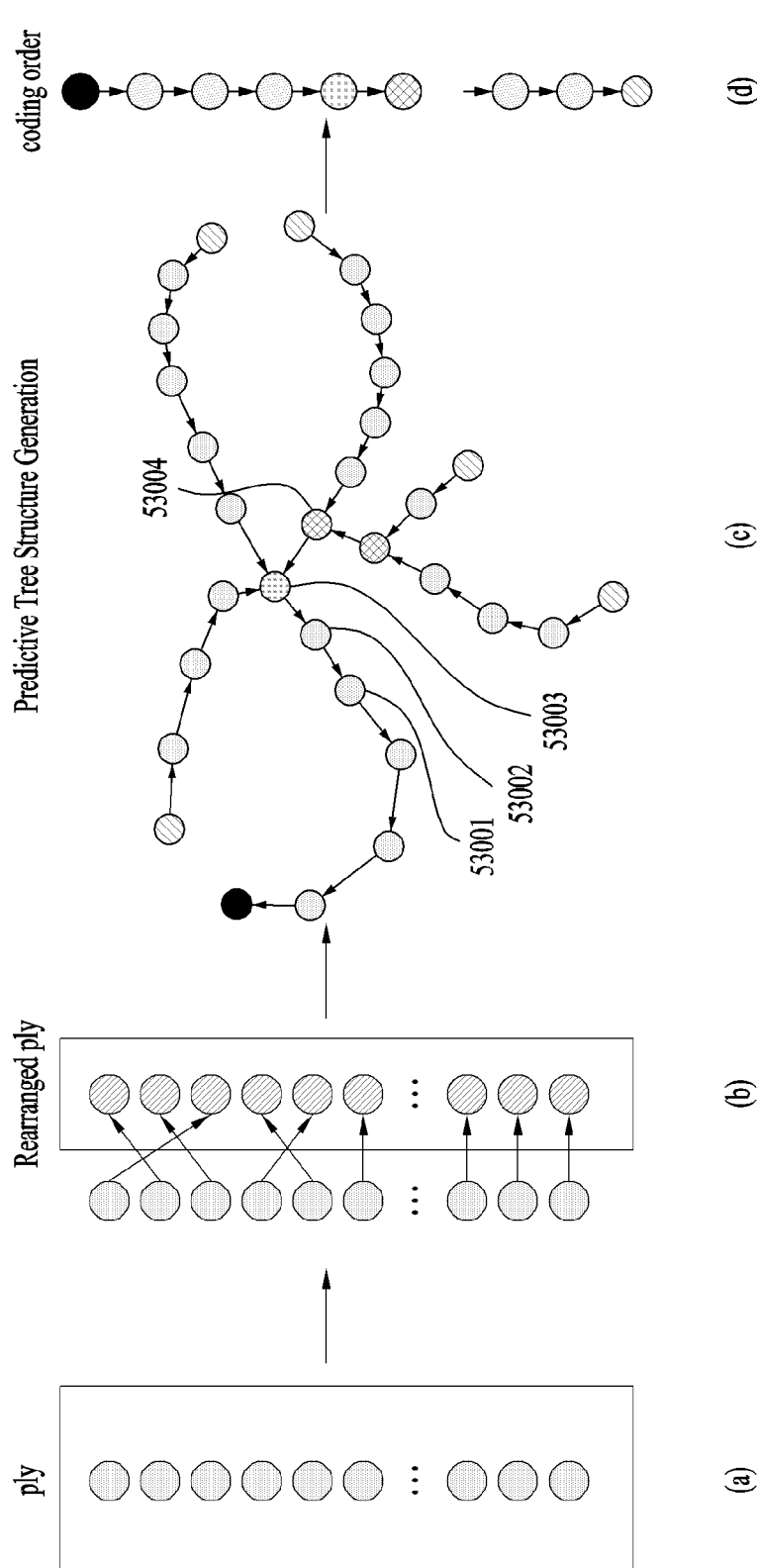
FIGS. 16(*a*) to 16(*d*) are diagrams illustrating examples of predictive tree generation and encoding according to embodiments.

FIG. 15 is a diagram illustrating another example of a point cloud transmission device according to embodiments, including a spatial partitioner.

The point cloud transmission device according to the embodiments may include a data input unit 51001, a coordinates transformer 51002, a quantization processor 51003, a spatial partitioner 51004, a signaling processor 51005, a geometry encoder 51006, an attribute encoder 51007, and a transmission processor 51008. According to embodiments, the coordinates transformer 51002, the quantization processor 51003, the spatial partitioner 51004, the geometry encoder 51006, and the attribute encoder 51007 may be referred to as point cloud video encoders.

The data input unit 51001 may perform some or all of the operations of the point cloud video acquisition unit 10001 of FIG. 1 or may perform some or all of the operations of the data input unit 12000 of FIG. 12. The coordinates transformer 51002 may perform some or all of the operations of the coordinates transformer 40000 of FIG. 4. Further, the quantization processor 51003 may perform some or all of the operations of the quantizer 40001 of FIG. 4 or may perform some or all of the operations of a quantization processor 12001 of FIG. 12.

The spatial partitioner 51004 may spatially partition point cloud data quantized and output from the quantization processor 51003 into one or more 3D blocks based on a bounding box and/or a sub-bounding box. Here, the 3D block may refer to a tile group, a tile, a slice, a coding unit (CU), a prediction unit (PU), or a transform unit (TU). In one embodiment, signaling information for spatial partition is entropy-encoded by the signaling processor 51005 and then transmitted through the transmission processor 51008 in the form of a bitstream.

In one embodiment, the point cloud content may be one person such as an actor, multiple people, one object, or multiple objects. In a larger range, the point cloud content may be a map for autonomous driving or a map for indoor navigation of a robot. In this case, the point cloud content may be a vast amount of locally connected data. Then, the point cloud content may not be simultaneously encoded/decoded, and accordingly tile partitioning may be performed before the point cloud content is compressed. For example, room #101 in a building may be partitioned into one tile and room #102 in the building may be partitioned into another tile. In order to support fast encoding/decoding by applying parallelization to the partitioned tiles, the tiles may be partitioned (or divided) into slices again. This operation may be referred to as slice partitioning (or division).

That is, a tile may represent a partial region (e.g., a rectangular cube) of a 3D space occupied by the point cloud data according to the embodiments. According to embodiments, a tile may include one or more slices. The tile according to the embodiments may be partitioned into one or more slices, and thus the point cloud video encoder may encode the point cloud data in parallel.

A slice may represent a unit of data (or bitstream) that may be independently encoded by the point cloud video encoder according to the embodiments and/or a unit of data (or bitstream) that may be independently decoded by the point cloud video decoder. A slice according to the embodiments may be a set of data in a 3D space occupied by the point cloud data or a set of some data among the point cloud data. A slice according to the embodiments may represent a region or set of points included in a tile according to the embodiments. According to embodiments, a tile may be partitioned into one or more slices based on the number of points included in one tile. For example, one tile may be a set of points partitioned by the number of points. According to embodiments, a tile may be partitioned into one or more slices based on the number of points, and some data may be split or merged in the partitioning process. That is, a slice may be a unit that may be independently coded within a corresponding tile. In this way, a tile obtained through spatial partitioning may be partitioned into one or more slices for fast and efficient processing.

The point cloud video encoder according to the embodiments may encode the point cloud data on a slice-by-slice basis or a tile-by-tile basis, wherein a tile includes one or more slices. In addition, the point cloud video encoder according to the embodiments may perform different quantization and/or transformation for each tile or each slice.

Positions of one or more 3D blocks (e.g., slices) spatially partitioned by the spatial partitioner 51004 are output to the geometry encoder 51006, and the attribute information (or attributes) is output to the attribute encoder 51007. The positions may be position information about the points included in a partitioned unit (box, block, CU, PU, TU, tile, tile group, or slice) and are referred to as geometry information.

The geometry encoder 51006 performs compression and entropy coding based on at least one of an octree, a trisoup, or a predictive tree for the positions (geometry information) output from the spatial partitioner 51004 according to a geometry coding (or geometry encoding) type to output a geometry bitstream.

To this end, the geometry encoder 51006 may include an octree-based compressor, a trisoup-based compressor, and a prediction-based compressor.

Since octree-based or trisoup-based geometry information compression according to the embodiments has been described in detail with reference to FIGS. 4 to 13, a description thereof is omitted herein.

Prediction-based geometry information compression according to the embodiments is performed by defining a prediction structure for positions (i.e., geometry information). This prediction structure is represented as a predictive tree having a vertex associated with each point.

According to embodiments, the geometry encoder 51006 may perform predictive tree-based compression on point cloud data requiring low latency.

That is, when the transmission device compresses octree-based geometry information, since the decoder of the reception device should perform octree partition up to a leaf node to perform decoding on geometry information, octree-based compression has the disadvantage of failing to support low-latency decoding. In other words, an octree-based geometry coding scheme scans and codes points using a breadth-first scheme.

In contrast, a predictive tree-based geometry compression scheme, which targets low-latency geometry compression, reduces step-by-step point scanning as much as possible using a depth-first scheme, generates a predictive value through geometry information between parent and child nodes on a tree, and entropy-codes a residual to configure a geometry bitstream. Since the depth-first scheme does not require step-by-step scanning for all points, there may be an advantage in that progressively captured point cloud data may be geometrically coded without waiting for all data to be captured. That is, a predictive tree refers to a process of creating a tree structure from the xyz coordinates of a point cloud using a connection relationship between points. In particular, in order to construct the predictive tree, a process of organizing input points based on a specific criterion is performed first. Then, a predictive tree structure is created by calculating a predictive value according to a neighboring node from points (Ply or polygon) rearranged through organization.

According to embodiments, a node, a point, and a vertex in the predictive tree structure may have the same meaning.

FIGS. 16(a) to 16(d) are diagrams illustrating examples of predictive tree generation and encoding according to embodiments.

According to embodiments, when points of point cloud data are input as illustrated in FIG. 16(a), the prediction-based compressor of the geometry encoder 51006 rearranges the points through organization as illustrated in FIG. 16(b). The point cloud data input to the prediction-based compressor of the geometry encoder 51006 may be a sequence unit, a tile group unit, a tile unit, a slice unit, a CU, a PU, or a TU. That is, prediction-based geometry encoding may be performed in the sequence unit, the tile group unit, the tile unit, the slice unit, the CU, the PU, or the TU. In addition, the points of the point cloud data input to the prediction-based compressor of the geometry encoder 51006 may be voxelized points. In other words, the sequence unit, the tile group unit, the tile unit, the slice unit, the CU, the PU, or the TU may be referred to as a compression unit. In an embodiment. predictive tree generation and encoding is performed in the compressor unit.

According to embodiments, there are broadly three methods of organizing the points of the input point cloud data. For example, the points of the input point cloud data may be organized in Morton order, radius order, or azimuth order or may be organized within one slice.

According to embodiments, the prediction-based compressor of the geometry encoder 51006 generates a predictive tree as illustrated in FIG. 16(c) based on the reorganized points. Here, the predictive tree may be referred to as a predictive tree structure, a prediction structure, a predictive tree, or a predictive tree structure.

According to embodiments, one of the reorganized points corresponds to one vertex. In addition, the depth of a vertex corresponding to a point may be determined based on order of the reorganized points.

For example, if the points are organized in ascending order of Morton codes, the depth of a vertex corresponding to a point having the smallest Morton code among the reorganized points has the smallest value (e.g., 0) and is referred to as a root vertex.

In this case, the order of the rearranged (i.e., organized) points becomes the order of predicting a parent-child relationship. The predictive tree structure of the parent-child relationship is created by a process of determining at least one near point on a K-D tree as a neighboring node. That is, at least one near point (e.g., up to three points) based on a current node in a K-D tree structure may be registered as a child node. The K-D tree structure is used to track a potential predictive parameter. In other words, a predictive tree having a neighbor that is most similar to the current point (e.g., a neighbor having the nearest Euclidean distance) from the organized points as a child node may be generated. The predictive tree represents the parent-child relationship for each point (node), and a predictive value of a point may be generated from the predictive tree. That is, the predictive tree may include a root vertex (referred to as a root point) and a leaf vertex (referred to as a leaf point). Points below the root point may have at least one child, and depth increases in the direction of the leaf point.

When the predictive tree is constructed as illustrated in FIG. 16(c), the index of a parent node, the number of child nodes, and the index of a child node may be known for each point. In addition, the index of the parent node, the number of child nodes, and the index of the child node for each point may be signaled through signaling information and transmitted to the reception device. According to embodiments, signaling information including the index of the parent node, the number of child nodes, and the index of the child node for each node may be referred to as predictive tree-related information.

FIG. 16(d) illustrates an embodiment of a coding order in the predictive tree structure generated as illustrated in FIG. 16(c). That is, the prediction-based compressor of the geometry encoder 51006 sequentially compresses geometry information from a root node to a leaf node of the predictive tree of FIG. 16(c). In this case, the geometry decoder of the reception device may receive the compressed geometry information in a coding order to reconstruct the geometry information.

According to embodiments, each node (or point) of the predictive tree may be predicted from parent nodes (or points) of the corresponding node (or point) in the predictive tree.

According to embodiments, the prediction-based compressor of the geometry encoder 51006 may select, as a predication mode of a current point, a prediction mode of previously calculating a compressed result value of the current point based on point positions of a parent, a grandparent, and a great-grandparent of the current point to be predicted according to four prediction modes as illustrated in FIG. 17 and generating a value nearest to the current point (i.e., a residual and the number of bits are the smallest values) and transmit the selected prediction mode to the reception device through signaling. That is, the selected prediction mode is a mode used to predict a position related to the current node and may be signaled in a slice unit. If the current point to be predicted in the predictive tree structure of FIG. 16(c) is 53004, a parent point is 53003, a grandparent point is 53002, and a great-grandparent point is 53001. In one embodiment, this process is performed for each point of the predictive tree.

According to embodiments, prediction mode 0 of the four prediction modes is a mode that does not perform prediction and is referred to as no prediction. That is, when prediction mode 0 is selected, a position value (i.e., coordinate value) of the current point is transmitted as it is without compression.

Prediction mode 1 is a mode for setting the position value (i.e., coordinate value) of a parent node (or parent point, p0) of the current point as a predictive value and is referred to as delta prediction. Then, a residual value (or residual position value) of prediction mode 1 is obtained by subtracting a predictive value of prediction mode 1 from the position value of the current point.

Prediction mode 2 is a mode of setting, as a predictive value, a value (=2p0−p1) obtained by subtracting a position value of a grandparent node (or grandparent point p1) of the current point from a value obtained by multiplying a position value of a parent node (or parent point p0) of the current point by 2 and is referred to as linear prediction. The residual value (or residual position value) of prediction mode 2 is obtained by subtracting the predictive value of prediction mode 2 from the position value of the current point.

Prediction mode 3 is a mode of setting, as a predictive value, a value (=p0+p1−p2) obtained by subtracting a position value of a great-grandparent node (or great-grandparent point p2) from the sum of a position value of the parent node (or parent point p0) and a position value of the grandparent node (or grandparent point p1) and is referred to as parallelogram prediction. The residual value (or residual position value) of prediction mode 3 is obtained by subtracting the predictive value of prediction mode 3 from the position value of the current point.

According to the embodiments, a prediction mode having the smallest value (i.e., (i.e., a residual and the number of bits are the smallest values) among the position value (i.e., the position value of a corresponding point) in prediction mode 0, the residual value in prediction mode 2, and the residual value in prediction mode 3 as the prediction mode of a corresponding point, and predication mode information of the selected point is transmitted to the reception device through signaling. According to embodiments, predictive tree-related information may include the prediction mode information.

That is, each point may be predicted by applying one of various prediction modes (e.g., no prediction, delta prediction, linear prediction, and parallelogram) based on the point positions of the parent, grandparent, and great-grandparent of a corresponding point.

According to the embodiments, when prediction mode 0 is selected, the position value of the corresponding point is transmitted to the reception device without compression, and when one of prediction modes 1 to 3 is selected, a residual value in the selected prediction mode is transmitted to the reception device.

In this way, predictive tree-based geometry coding performs prediction on point cloud data based on neighbor point information. In addition, since this predictive tree-based geometry coding does not perform step-by-step scanning for all points, there is no need to wait for all of the point cloud data to be captured, and progressively captured point cloud data may be encoded, so that predictive tree-based geometry coding is suitable for point cloud data content requiring low-latency processing. In other words, predictive tree-based geometry compression is more effective for real-time processing and lower latency than octree-based geometry compression.

However, when the predictive tree is generated using the above method, the predictive tree is created in such a way that as many points included in one slice/chunk as possible are connected to each other.

If a point that is included in the same root node but has less correlation with other points is present in the predictive tree, there is no way to process the point.

In particular, if a point that is not related to or less related to other points in the predictive tree is positioned in the middle of the tree, prediction accuracy of a point having a child relationship with the corresponding point may deteriorate.

In addition, when some point (or node) information is lost during an encoding/decoding process, since there is no processing method for the point (or node) information, subsequent points (or nodes) may not be encoded/decoded.

In the present specification, a point that is not related or less related (or a point having less correlation) with other points in the predictive tree will be referred to as a direct coding mode (DCM) point or an inferred direct coding mode (IDCM) point. In addition, in the present specification, the DCM point or the IDCM point may be referred to as a DCM node or an IDCM node.

The present specification serves to determine at least one IDCM point while the predictive tree is being constructed and/or after the predictive tree is constructed and process the determined IDCM point by applying a separate processing method. That is, the present specification proposes a method of applying a separate processing method by segregating points that harm the entire tree relationship among points connected to each other in a tree relationship in a predictive tree structure.

In the present specification, a node (point) having a low correlation in a predictive tree is segregated and placed at a leaf node of the predictive tree so as not to affect a predicted value of a lower node (point). That is, a node (point) with less correlation in the predictive tree is classified as an IDCM, and the point classified as the IDCM is segregated from the predictive tree and placed at the leaf node.

In the present specification, when information of some points (or nodes) is lost and unpredictable during the encoding/decoding process, the points are processed as the IDCM so that subsequent points (or nodes) may be encoded/decoded. As an embodiment, a lost point may be configured as an imaginary point, and an imaginary value may be allocated as a position value of the imaginary point. The imaginary value may be used to determine the prediction mode of the next node (point).

In this specification, only an IDCM element may be segregated and managed as a separate chunk or slice.

In this specification, a predictive tree may be regenerated in order to place a point classified as the IDCM at a leaf node.

In the present specification, a point classified as the IDCM may be placed in a separate sub-chunk and the predictive tree may be regenerated for the remaining points (nodes).

In the present specification, a slice for IDCM processing is generated. The generated slice may be placed in the first slice or the last slice in a bitstream, and the predictive tree may be regenerated for the remaining points (nodes).

In the present specification, a point classified as the IDCM may be skipped. In a process of searching for the best prediction mode, the next node of the point classified as the IDCM is connected/compared to a previous node of the point classified as the IDCM to generate the predictive tree and search for the best prediction mode.

In this specification, geometry information (i.e., uncompressed position value) may be transmitted without separately processing a point classified as the IDCM. That is, a prediction mode of the point classified as the IDCM may be set to prediction mode 0.

In this specification, a position value of a point classified as the IDCM may be replaced with an average value of child or sibling points or with a copied value of a parent point.

Figure 18:
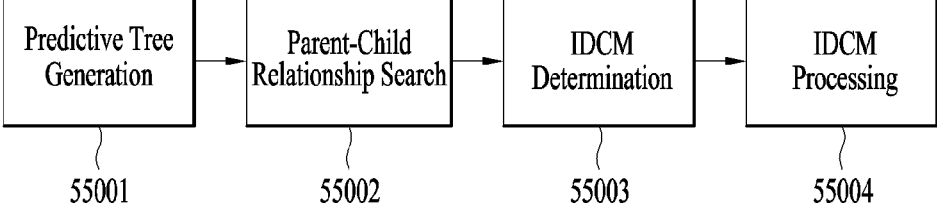
FIG. 18 is a detailed block diagram illustrating an example of a predication-based compressor in a geometry encoder according to embodiments.

FIG. 18 is a detailed block diagram illustrating an example of a prediction-based compressor in a geometry encoder according to embodiments. That is, FIG. 18 is a block diagram illustrating an embodiment of the prediction-based compressor for determining at least one IDCM point while a predictive tree is being constructed and/or after the predictive tree is constructed and processing the determined IDCM point.

For prediction-based geometry information compression, the prediction-based compressor of FIG. 18 may include one or more processors and one or more memories electrically and communicatively coupled with the one or more processors. In addition, the one or more processors may be configured by one or more hardware processes that are physically separated or may be configured by a combination of software and hardware or by a single hardware processor. The one or more processors according to the embodiments may be electrically and communicatively coupled. In addition, the one or more memories may be configured by one or more memories that are physically separated or by a single memory. The one or more memories according to the embodiments may store one or more programs for processing point cloud data.

According to embodiments, the prediction-based compressor of FIG. 18 may include a predictive tree generator 55001, a parent-child relationship searcher 55002, an IDCM point (node) determiner 55003, and an IDCM point (node) processor 55004. According to embodiments, the predictive tree generator 55001, the searcher 55002, the IDCM determiner 55003, and the IDCM processor 55004 may correspond to one or more processors.

As described above, the predictive tree generator 55001 rearranges points of input point cloud data through organization based on a specific criterion (e.g., Morton code) and generates a predictive tree structure by calculating a predictive value according to a neighbor node from the rearranged points. In other words, a tree may be sequentially generated by applying a K-D tree or a method capable of calculating a relationship between points from a root node to a leaf node.

Figure 19:
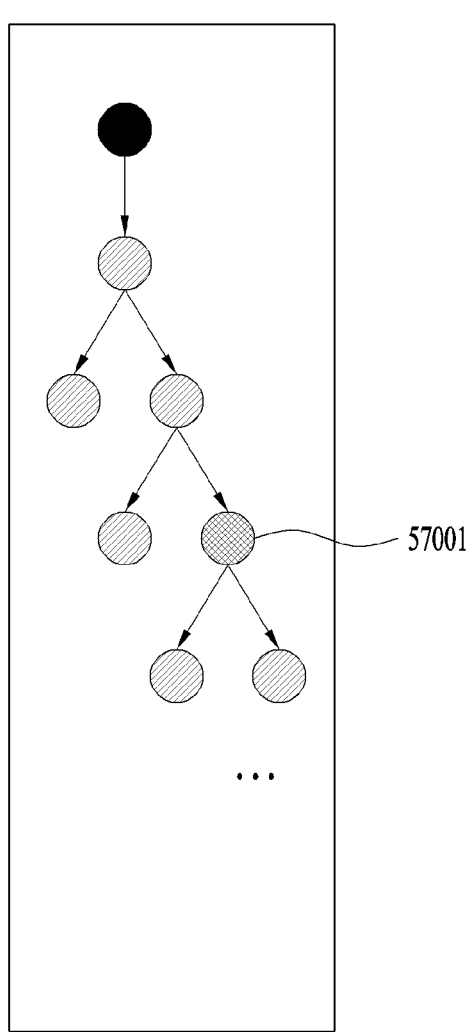
FIG. 19 is a diagram illustrating an example of a predictive tree structure according to embodiments.

FIG. 19 is a diagram illustrating an example of a predictive tree structure generated by the predictive tree generator 55001 according to embodiments. In the predictive tree structure of FIG. 19, a point 57001 is regarded as a point having less correlation with other points. In other words, in the predictive tree structure, it is assumed that the point 57001 is a point which has little relationship with other points and is far away (e.g., far Euclidean distance) from other points or a point, information about which is lost during encoding (or decoding), so that information thereabout is not present. It is also assumed that the point 57001 is located between a root node and a leaf node. In an embodiment, the point 57001 is determined as an IDCM point and is processed by applying the method proposed in this specification.

According to embodiments, the IDCM point may be determined during generation of a predictive tree and/or may be determined after generation of the predictive tree.

According to embodiments, an IDCM point determination method and an IDCM point processing method may vary according to a timing of determining the IDCM point.

According to embodiments, during the process of generating the predictive tree, the searcher 55002 searches for a relationship between a parent, a grandparent, and a child based on a corresponding point, and the IDCM determiner

55003 determines whether the corresponding point or the next point is the IDCM point based on the search result. For example, the IDCM point determiner 55003 calculates the probability that the next point (node) becomes the IDCM point based on the relationship between a parent, a grandparent, and a child of the corresponding point searched for during the predictive tree generation process. If the calculated value is greater than a predesignated threshold, the IDCM point determiner 55003 may determine the next point (node) as the IDCM point. As another example, if the next point (node) is not a leaf node and point (node) information thereabout does not exist based on the relationship between a parent, a grandparent, and a child of the corresponding point searched for during the predictive tree generation process, the IDCM point determiner 55003 may determine the next point as the IDCM point (node). The IDCM processor 55004 segregates or processes the point (node) determined as the IDCM point according to a predetermined method so that a predictive tree structure pattern generated by the remaining points (nodes) is not polluted.

Next, a process of determining an IDCM point in the IDCM determiner 55003 will be described in more detail.

Information serving as a criterion for defining the IDCM point in the IDCM determiner 55003 according to the embodiments may be as follows. In an embodiment of the present specification, whether a specific point is the IDCM point is determined by applying at least one of the following IDCM determination methods. According to embodiments, the IDCM determination method (e.g., an IDCM_track_mode field) may be signaled through at least one of a sequence parameter set, a geometry parameter set, a tile parameter set, a geometry slice header, or geometry slice data. According to embodiments, the IDCM determination method may have a fixed value known to a transmitting/receiving side, and in this case, separate signaling may not be required.

1. When the IDCM point is determined during a process of constructing the predictive tree, if a difference between an average value of distances of points in a parent-child relationship from a parent node of a current point (node) to a root node and a distance between the current point (node) and the parent point (node) of the current point is greater than a preset threshold value, the current point may be determined as the IDCM point (node).

2. When the IDCM point is determined after the predictive tree is constructed, if a corresponding point falls outside a specific range based on an average value of points having a parent-child relationship from a root node to a leaf node, corresponding to points constituting the entire predictive tree, the point (node) is determined as the IDCM point. That is, if a corresponding point is out of a specific range based on the average of distances of points in parent-child relationship from the root node to the leaf node of the predictive tree structure, the point (node) is determined as the IDCM point.

3. If a current point (node) corresponds to a specific value range, the corresponding point may be determined as the IDCM point. This may be referred to as a manual determination method. For example, if a current point p is larger than a first range (range 1) and smaller than a second range (range 2), the current point (node) may be determined as the IDCM point (node) (i.e., if range1<p<range2, p is IDCM). Here, the first range and the second range may be threshold values having different values. According to embodiments, the threshold values corresponding to the first range and the second range may be signaled as signaling information (e.g., an IDCM_threshold_low field and an IDCM_threshold_high field) through the signaling processor 51005.

4. While the predictive tree is being constructed or after the predictive tree is fully constructed, if a current point (node) is out of a certain range based on the relationship or pattern of a parent, a grandparent, and a great-grandparent of the current point (node), the current point (node) may be determined as the IDCM point.

5. If some of points are lost or not signaled while the predictive tree is being constructed, a corresponding point may be classified as the IDCM.

A certain method capable of determining whether a specific node/point deviates from a pattern constituting the entire tree may be added to the IDCM classification criteria described above. According to embodiments, a certain capable of statistically determining an abnormal value of the pattern may be applied to IDCM classification. The newly added method may be signaled as one mode to the IDCM determination method (e.g., an IDCM_track_mode field).

Next, a process of processing the IDCM point in the IDCM processor 55004 will be described in more detail.

If there is a point (node) determined as the IDCM during the predictive tree generation process, the IDCM processing unit 55004 separates the point (node) as a separate buffer, slice or chunk and performs a process of searching for a parent with respect to a point (node) corresponding to the next node index.

According to embodiments, when a point determined as the IDCM is segregated from the predictive tree and stored in a buffer, the stored IDCM point may be included in the corresponding predictive tree or processed by applying a separate processing process.

For example, when a point determined as the IDCM is included in a corresponding predictive tree and signaled, the point may be placed at a leaf node, which is the last node of the predictive tree. By doing this, when predicting other points (nodes), prediction accuracy may be prevented from being lowered due to this IDCM point. That is, a point (node) that has less correlation with other points (nodes) in the predictive tree is segregated and placed at the leaf node of the predictive tree, so that the point (node) that has less correlation with other points (nodes) does not affect, i.e., does not pollute, a predicted value of a lower point (node) thereof. According to embodiments, when a point determined as the IDCM is located at a leaf node of a corresponding predictive tree, IDCM original index information (e.g., an IDCM_original_index[ ] field) for indicating an original position of the IDCM point may be signaled through at least one of a sequence parameter set, a geometry parameter set, a tile parameter set, a geometry slice header, or geometry slice data. That is, since one or more points may be determined by the IDCM, an index for an original position of the IDCM point may be required. According to embodiments, the IDCM original index information may have a fixed value known to the transmitting/receiving side, and in this case, separate signaling may not be required.

As another example, when a process of determining the IDCM point after the predictive tree is fully generated within one CU and segregating the determined IDCM point is performed, if a point (node) determined as the IDCM point corresponds to a point between a root node and a leaf node, that is, if the IDCM point corresponds to an intermediate node, a flag value (e.g., IDCM_flag field) that may identify that the corresponding node is the IDCM point (node) may be signaled and an imaginary value may be allocated as a position value of the corresponding point (node) in order to use the corresponding point (node) to predict a child of the corresponding point (node). By doing this, the influence of the point (node) classified as the IDCM point may be minimized when predicting a child or a grandchild of the point (node) classified as the IDCM point. In an embodiment, a point to which the imaginary value is assigned may be referred to as an imaginary point.

According to embodiments, an imaginary value assigned to a point (node) determined as the IDCM may be obtained by applying at least one of the following imaginary value acquisition methods. According to embodiments, an imaginary value acquisition method (e.g., an imaginary_point_prediction_mode field) may be signaled through at least one of a sequence parameter set, a geometry parameter set, a tile parameter set, a geometry slice header, or geometry slice data. According to embodiments, the imaginary value acquisition method may have a fixed value known to the transmitting/receiving side, and in this case, separate signaling may not be required.

For example, the imaginary value may be an arithmetic or geometric (or positional) average value of siblings of the IDCM point.

As another example, the imaginary value may be an arithmetic or geometry (or positional) average value of a grandparent and a parent of the IDCM point.

As another example, the imaginary value may be a position value p1 of a parent of the IDCM point.

As another example, the imaginary value may be a value (=|p2−p1|+p1) obtained by adding the position value of a parent p1 to a difference between position values of a grandparent p2 and the parent p1 of the IDCM point.

According to embodiments, a point (node) classified as the IDCM may be placed at the position thereof but may not be used to predict another point (node or component) of the predictive tree. The imaginary value may be allocated to the position of the IDCM point (node) so that the imaginary value may be used instead of the position the IDCM point (node). In addition, information (e.g., an imaginary_point_prediction_mode field) about which value is used to predict the imaginary value while the transmission device performs encoding may be signaled and transmitted to the reception device. In addition, during a decoding process of the reception device, the imaginary value may be randomly generated based on signaling information. In an embodiment, after a child, a grandchild, and a great-grandchild are predicted, the corresponding value is reset and the point (or node) classified as the IDCM is positioned at a corresponding position based on signaling information (e.g., an IDCM_original_index[ ] field). The above-described method is one method that may be processed when the IDCM point is segregated from the predictive tree, and a certain method that may segregate the IDCM point from the predictive tree and assign the imaginary value to the position of the IDCM point instead of the IDCM point may be used.

Figure 20:
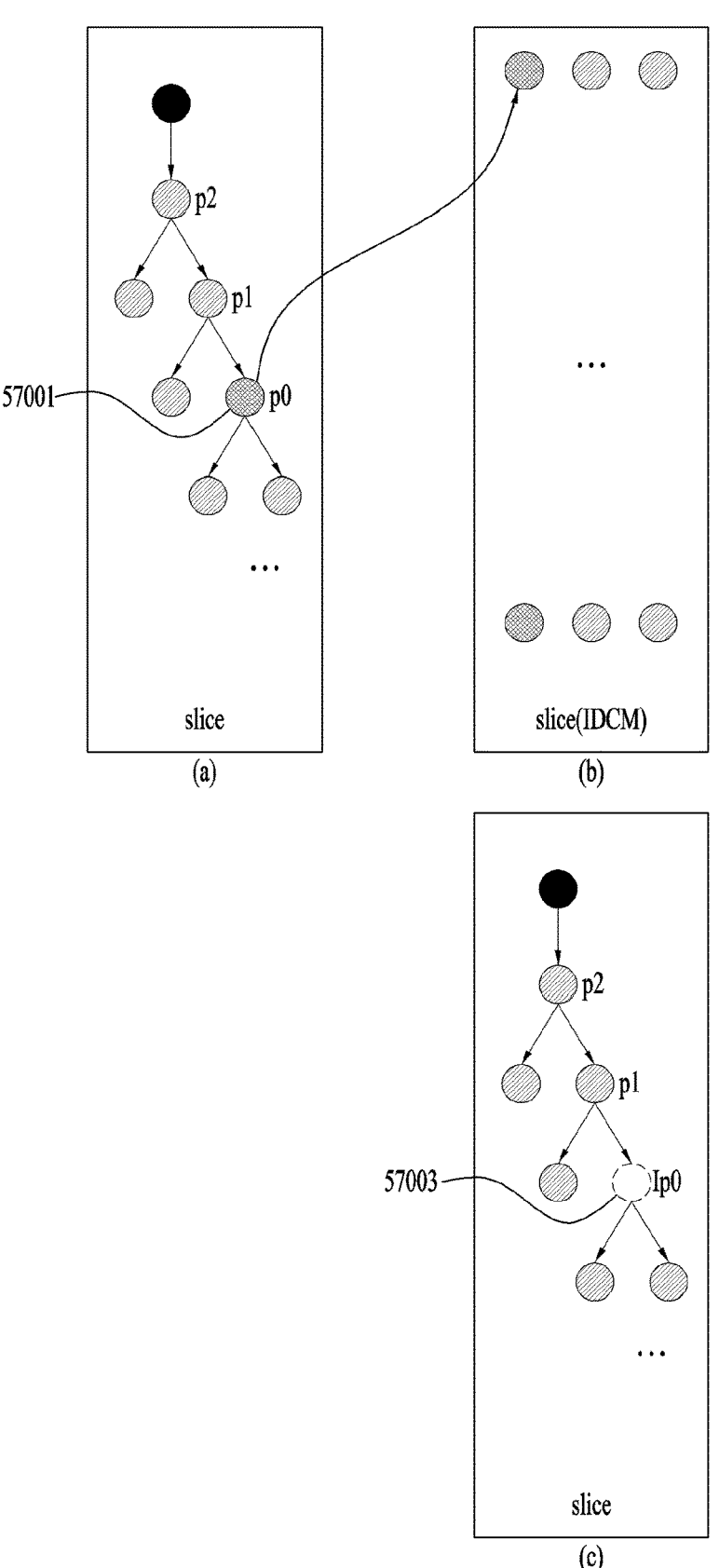
FIGS. 20(*a*) to 20(*c*) are diagrams illustrating examples of IDCM point processing according to embodiments.

FIGS. 20(*a*) to 20(*c*) are diagrams illustrating examples of IDCM point processing according to embodiments.

For example, assuming that a predictive tree is generated as illustrated in FIG. 20(*a*) and a p0 point 57001 is determined as an IDCM point, the IDCM point is segregated from the predictive tree and is separately processed in a separate slice as illustrated in FIG. 20(*b*). An imaginary value is allocated instead of the point 57001 to a position at which the IDCM point has been positioned in the predictive tree as illustrated in FIG. 20(*c*).

That is, FIGS. 20(*a*) to 20(*c*) illustrate the case in which the p0 point 57001 is determined as the IDCM and is separately processed in a separate slice in an existing predictive geometry coding scheme. That is, in a predictive tree structure of FIG. 20(a), information of the p0 point 57001 is moved to a slice for the IDCM of FIG. 20(b). In this case, points classified as the IDCM may not be represented as a separate preceding/following relationship or parent/child relationship. Instead of the p0 point 57001 classified as the IDCM, an imaginary value Ip0 is calculated and assigned to a corresponding position 57003. This imaginary value Ip0 may be used to search for a prediction mode of the next point (i.e., child point) of the IDCM point.

According to embodiments, when the point determined as the IDCM is separately processed in a separate slice as illustrated in FIG. 20(b), index information (e.g., IDCM_slice_index[ ] field) of the slice including the IDCM point may be signaled through at least one of a sequence parameter set, a geometry parameter set, a tile parameter set, a geometry slice header, or geometry slice data. That is, since one or more points may be determined as the IDCM, there may be one or more slices and slice indexes may be required. According to embodiments, the index information of the slice including the IDCM point may have a fixed value known to the transmitting/receiving side, and in this case, separate signaling may not be required.

When geometry information is compressed by applying the methods of FIGS. 16 to 20, the geometry encoder 51006 may reconstruct (or restore) the compressed geometry information and output the reconstructed geometry information to the attribute encoder 51007. Reconstructed geometry may be referred to as the reconstructed geometry information or restored geometry information.

The attribute encoder 51007 compresses and entropy-codes attributes output from the spatial partitioner 51004 based on the reconstructed geometry output from the geometry encoder 51006 and outputs an attribute bitstream. The attribute encoder 51007 compresses attribute information based on at least one of prediction transform, lifting transform, or RAHT. Since compression of the attribute information has been described in detail with reference to FIGS. 4 to 13, a description thereof is omitted herein.

The geometry bitstream compressed and output from the geometry encoder 51006 and the attribute bitstream compressed and output from the attribute encoder 51007 are output to the transmission processor 51008.

The transmission processor 51008 according to the embodiments may perform an operation and/or transmission method that is the same as or similar to the operation and/or transmission method of the transmission processor 12012 of FIG. 12 and perform an operation and/or transmission method that is the same as or similar to the operation and/or transmission method of the transmitter 10003 of FIG. 1. Reference is made to a description of FIG. 1 or FIG. 12 for details of the transmission processor 51008 and a description of the transmission processor is omitted herein.

The transmission processor 51008 according to the embodiments may transmit each of the geometry bitstream output from the geometry encoder 51006, the attribute bitstream output from the attribute encoder 51007, and the signaling bitstream output from the signaling processor 51005 or transmit the same as one multiplexed bitstream.

The transmission processor 51008 according to the embodiments may encapsulate the bitstream in a file or a segment (e.g., a streaming segment) and transmit the encapsulated bitstream over various networks such as a broadcast network and/or a broadband network.

The signaling processor 51005 according to embodiments may generate and/or process signaling information and output the signaling information to the transmission processor 51008 in the form of a bitstream. The signaling information generated and/or processed by the signaling processor 51005 may be provided to the geometry encoder 51006, the attribute encoder 51007, and/or the transmission processor 51008 for geometry encoding, attribute encoding, and transmission processing. Alternatively, the signaling processor 51005 may receive the signaling information generated by the geometry encoder 51006, the attribute encoder 51007, and/or the transmission processor 51008.

In the present specification, the signaling information may be signaled and transmitted in units of a parameter set (a sequence parameter set (SPS), a geometry parameter set (GPS), an attribute parameter set (APS), a tile parameter set (TPS), etc.). In addition, the signaling information may be signaled and transmitted in a CU of each image such as a slice or a tile. In this specification, the signaling information may include metadata (e.g., setting values) related to point cloud data and may be provided to the geometry encoder 51006, the attribute encoder 51007, and/or the transmission processor 51008, for geometry encoding, attribute encoding, and transmission processing. According to an application, the signaling information may be defined in a system end such as a file format, dynamic adaptive streaming over HTTP (DASH), or an MPEG media transport (MMT) or in a wired interface end such as a high definition multimedia interface (HDMI), a display port, a video electronics standards association (VESA) interface, a CTA interface, etc.

Although not shown in the figure, the elements of the point cloud transmission device of FIG. 15 may be implemented by hardware including one or more processors or integrated circuits configured to communicate with one or more memories, software, firmware, and a combination thereof. The one or more processors may perform at least one of the operations and/or functions of the elements of the point cloud transmission device of FIG. 15 described above. In addition, the one or more processors may operate or execute a set of software programs and/or instructions for performing the operations and/or functions of the elements of the point cloud transmission device of FIG. 15. The one or more memories according to the embodiments may include a high-speed random access memory or include a non-volatile memory (e.g., one or more magnetic disk storage devices, flash memory devices, or other non-volatile solid-state memory devices).

The methods/devices according to the embodiments may signal related information to add/perform the operations of the embodiments. The signaling information according to the embodiments may be used in the transmission device and/or the reception device.

In this specification, the signaling information for compressing (transmitting side) and/or decompressing (receiving side) the geometry information based on the predictive tree may be referred to as predictive tree-related information. In an embodiment, such predictive tree-related information is signaled through at least one of a sequence parameter set, a geometry parameter set, an attribute parameter set, a tile parameter set, a geometry slice header, or geometry slice data.

The predictive tree-related information according to embodiments includes not only prediction mode information but also IDCM-related information for IDCM classification and processing in the predictive tree structure.

According to embodiments, the IDCM-related information may include IDCM flag information, IDCM determination method information, threshold value information, imaginary value acquisition method information, IDCM slice index information, and IDCM original index information.

According to embodiments, the sequence parameter set may indicate that a representative prediction mode for each section has been signaled. According to an implementation method, all or some of predictive tree-related information is transmitted through the sequence parameter set. The predictive tree-related information may be delivered through the geometry parameter set, the attribute parameter set, the tile parameter set, the slice (e.g., slice header), or an SEI message. In addition, according to an application or a system, an application range or an application method may be differently used by defining the predictive tree-related information at a corresponding location or a separate location. When a syntax element defined below is capable of being applied to a plurality of point cloud data streams as well as a current point cloud data stream, the predictive tree-related information may be delivered through a parameter set of a higher concept. A field, which is the term used in syntaxes of the present specification described later, may have the same meaning as a parameter or a syntax element.

According to embodiments, parameters (which may be variously called metadata, signaling information, etc.) may be generated by a metadata processor (or metadata generator) or a signaling processor of the transmission device and may be transmitted to the reception device and used in a reconstruction process. For example, the parameters generated and transmitted by the transmission device may be obtained by a metadata parser of the reception device.

Figure 21:
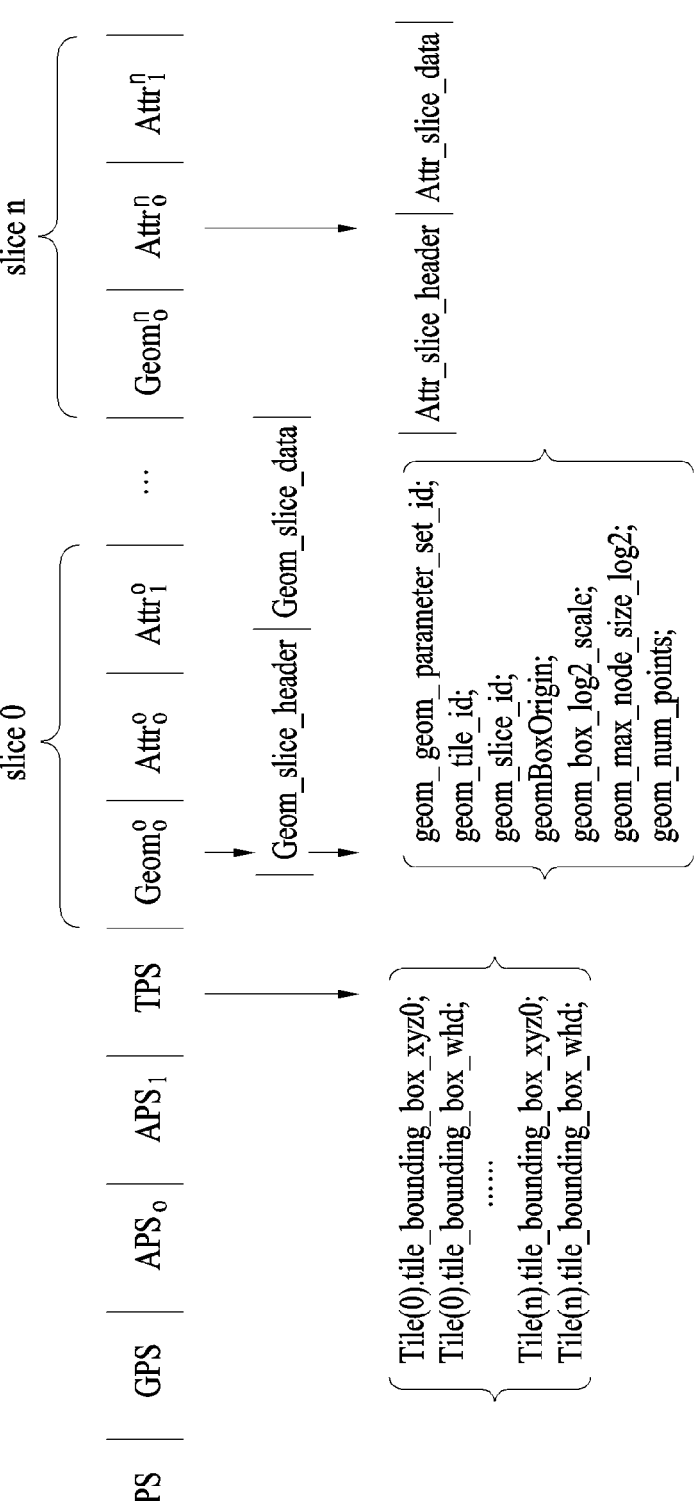
FIG. 21 illustrates an example of a bitstream structure of point cloud data for transmission/reception according to embodiments.

FIG. 21 illustrates an example of a bitstream structure of point cloud data for transmission/reception according to embodiments.

When the geometry bitstream, the attribute bitstream, and the signaling bitstream according to the embodiments are configured as one bitstream in the transmission processor 51008 of FIG. 15, the bitstream may include one or more sub-bitstreams. The bitstream according to the embodiments may include an SPS for signaling of a sequence level, a GPS for signaling of geometry information coding, and one or more APSs ($APS_0$ and $APS_1$) for signaling of attribute information coding, a TPS for signaling of a tile level, and one or more slices (slice 0 to slice n). That is, the bitstream of the point cloud data according to the embodiments may include one or more tiles, and each tile may be a slice group including one or more slices (slice 0 to slice n). The TPS according to the embodiments may include information about each tile (e.g., coordinate value information and height/size information of a bounding box) for one or more tiles. Each slice may include one geometry bitstream Geom0 and one or more attribute bitstreams Attr0 and Attrn. For example, the first slice (slice 0) may include one geometry bitstream $Geom0^0$ and one or more attribute bitstreams $Attr0^0$ and $Attr1^0$.

The geometry bitstream (also referred to as a geometry slice) within each slice may include a geometry slice header (geom_slice_header) and geometry slice data (geom_slice_data). The geometry slice header (geom_slice_header) according to the embodiments may include parameter set identification information (geom_parameter_set_id), a tile identifier (geom_tile_id), and a slice identifier (geom_slice_id) included in a GPS, and information about data (geomBoxOrigin, geom_box_log 2_scale, geom_max_node_size_log 2, and geom_num_points) included in the geometry slice data (geom_slice_data). geomBoxOrigin is geometry box origin information indicating a box origin of corresponding geometry slice data, geom_box_log 2_scale is information indicating a log scale of the corresponding geometry slice data, geom_max_node_size_log 2 is information indicating the size of a root geometry octree node, and geom_num_points is information related to the number of points of the corresponding geometry slice data. The geometry slice data (geom_slice_data) according to the embodiments may include geometry information (or geometry data) of point cloud data within a corresponding slice.

Each attribute bitstream (also referred to as an attribute slice) in each slice may include an attribute slice header (attr_slice_header) and attribute slice data (attr_slice_data). The attribute slice header (attr_slice_header) according to the embodiments may include information about the attribute slice data, and the attribute slice data may include attribute information (referred to as attribute data or an attribute value) of the point cloud data in the slice. When there is a plurality of attribute bitstreams in one slice, the attribute bitstreams may include different attribute information. For example, one attribute bitstream may include attribute information corresponding to color, and another attribute stream may include attribute information corresponding to reflectance.

According to embodiments, predictive tree-related information required for prediction-based geometry encoding/decoding may be newly defined in a parameter set of the point cloud data and/or in a corresponding slice. For example, when encoding/decoding of geometry information is performed, the predictive tree-related information may be added to a geometry parameter set and, when tile-based encoding/decoding is performed, the predictive tree-related information may be added to a tile and/or a slice.

The predictive tree-related information according to the embodiments includes IDCM-related information for IDCM classification and processing in the predictive tree structure. According to embodiments, the IDCM-related information includes IDCM flag information (e.g., an IDCM_flag field), IDCM determination method information (e.g., an IDCM_track_mode field), threshold information (e.g., an IDCM_threshold_low field and an IDCM_threshold_high field), imaginary value acquisition method information (e.g., an imaginary_point_prediction_mode field), IDCM slice index information (e.g., an IDCM_slice_index[ ] field), and IDCM original index information (e.g., an IDCM_original_index[ ] field).

According to embodiments, the bitstream of the point cloud data provides a tile or a slice so that the point cloud data may be divided and processed according to a region. Each region of a bitstream according to the embodiments may have different importance. Accordingly, when the point cloud data is divided into tiles, a different filter (encoding method) and a different filter unit may be applied to each tile. In addition, when the point cloud data is divided into slices, a different filter and a different filter unit may be applied to each slice.

The transmission device according to the embodiments may transmit point cloud data according to the bitstream structure as shown in FIG. 21. Accordingly, a method to apply different encoding operations and use a good-quality encoding method for an important region may be provided. In addition, efficient encoding and transmission may be supported according to the characteristics of point cloud data, and attribute values may be provided according to user requirements.

The reception device according to the embodiments may receive the point cloud data according to the bitstream structure as shown in FIG. 21. Accordingly, different filtering (decoding) methods may be applied to the respective regions (regions partitioned into tiles or into slices), rather than a complexly decoding (filtering) method being applied to the entire point cloud data. Therefore, better image quality in a region important is provided to the user and an appropriate latency to the system may be ensured.

A field, which is the term used in syntaxes of the present disclosure described later, may have the same meaning as a parameter or an element.

FIG. 22 shows an embodiment of a syntax structure of a sequence parameter set (SPS) (seq_parameter_set( )) according to the present disclosure. The SPS may contain sequence information about a point cloud data bitstream.

The SPS according to the embodiments may include a main_profile_compatibility_flag field, a unique_point_positions_constraint_flag field, a level_idc field, an sps_seq_parameter_set_id field, an sps_bounding_box_present_flag field, an sps_source_scale_factor_numerator_minus1 field, an sps_source_scale_factor_denominator_minus1 field, an sps_num_attribute_sets field, log 2_max_frame_idx field, an axis_coding_order field, an sps_bypass_stream_enabled_flag field, and an sps_extension_flag field.

The main_profile_compatibility_flag field may indicate whether the bitstream conforms to the main profile. For example, main_profile_compatibility_flag equal to 1 may indicate that the bitstream conforms to the main profile. For example, main_profile_compatibility_flag equal to 0 may indicate that the bitstream conforms to a profile other than the main profile.

When unique_point_positions_constraint_flag is equal to 1, in each point cloud frame that is referred to by the current SPS, all output points may have unique positions. When unique_point_positions_constraint_flag is equal to 0, in any point cloud frame that is referred to by the current SPS, two or more output points may have the same position. For example, even when all points are unique in the respective slices, slices in a frame and other points may overlap. In this case, unique_point_positions_constraint_flag is set to 0.

level_idc indicates a level to which the bitstream conforms.

sps_seq_parameter_set_id provides an identifier for the SPS for reference by other syntax elements.

The sps_bounding_box_present_flag field indicates whether a bounding box is present in the SPS. For example, sps_bounding_box_present_flag equal to 1 indicates that the bounding box is present in the SPS, and sps_bounding_box_present_flag equal to 0 indicates that the size of the bounding box is undefined.

According to embodiments, when sps_bounding_box_present_flag is equal to 1, the SPS may further include an sps_bounding_box_offset_x field, an sps_bounding_box_offset_y field, an sps_bounding_box_offset_z field, an sps_bounding_box_offset_log 2_scale field, an sps_bounding_box_size_width field, an sps_bounding_box_size_height field, and an sps_bounding_box_size_depth field.

sps_bounding_box_offset_x indicates the x offset of the source bounding box in Cartesian coordinates. When the x offset of the source bounding box is not present, the value of sps_bounding_box_offset_x is 0.

sps_bounding_box_offset_y indicates the y offset of the source bounding box in Cartesian coordinates. When the y offset of the source bounding box is not present, the value of sps_bounding_box_offset_y is 0.

sps_bounding_box_offset_z indicates the z offset of the source bounding box in Cartesian coordinates. When the z offset of the source bounding box is not present, the value of sps_bounding_box_offset_z is 0.

sps_bounding_box_offset_log 2_scale indicates a scale factor for scaling quantized x, y, and z source bounding box offsets.

sps_bounding_box_size_width indicates the width of the source bounding box in Cartesian coordinates. When the width of the source bounding box is not present, the value of sps_bounding_box_size_width may be 1.

sps_bounding_box_size_height indicates the height of the source bounding box in Cartesian coordinates. When the height of the source bounding box is not present, the value of sps_bounding_box_size_height may be 1.

sps_bounding_box_size_depth indicates the depth of the source bounding box in Cartesian coordinates. When the depth of the source bounding box is not present, the value of sps_bounding_box_size_depth may be 1.

sps_source_scale_factor_numerator_minus1 plus 1 indicates the scale factor numerator of the source point cloud.

sps_source_scale_factor_denominator_minus1 plus 1 indicates the scale factor denominator of the source point cloud.

sps_num_attribute_sets indicates the number of coded attributes in the bitstream.

The SPS according to the embodiments includes an iteration statement repeated as many times as the value of the sps_num_attribute_sets field. In an embodiment, i is initialized to 0, and is incremented by 1 each time the iteration statement is executed. The iteration statement is repeated until the value of i becomes equal to the value of the sps_num_attribute_sets field. The iteration statement may include an attribute_dimension_minus1[i] field and an attribute_instance_id[i] field. attribute_dimension_minus1[i] plus 1 indicates the number of components of the i-th attribute.

The attribute_instance_id[i] field specifies the instance ID of the i-th attribute.

According to embodiments, when the value of the attribute_dimension_minus1[i] field is greater than 1, the iteration statement may further include an attribute_secondary_bitdepth_minus1[i] field, an attribute_cicp_colour_primaries[i] field, an attribute_cicp_transfer_characteristics[i] field, an attribute_cicp_matrix_coeffs[i] field, and an attribute_cicp_video_full_range_flag[i] field.

attribute_secondary_bitdepth_minus1 [i] plus 1 specifies the bitdepth for the secondary component of the i-th attribute signal(s).

attribute_cicp_colour_primaries[i] indicates the chromaticity coordinates of the color attribute source primaries of the i-th attribute.

attribute_cicp_transfer_characteristics[i] either indicates the reference opto-electronic transfer characteristic function of the color attribute as a function of a source input linear optical intensity with a nominal real-valued range of 0 to 1 or indicates the inverse of the reference electro-optical transfer characteristic function as a function of an output linear optical intensity attribute_cicp_matrix_coeffs[i] describes the matrix coefficients used in deriving luma and chroma signals from the green, blue, and red, or Y, Z, and X primaries of the i-th attribute.

attribute_cicp_video_full_range_flag[i] specifies the black level and range of the luma and chroma signals as derived from E'Y, E'PB, and E'PR or E'R, E'G, and E'B real-valued component signals of the i-th attribute.

The known_attribute_label_flag[i] field indicates whether a know_attribute_label[i] field or an attribute_label_four_bytes[i] field is signaled for the i-th attribute. For example, when known_attribute_label_flag[i] equal to 0 indicates the known_attribute_label[i] field is signaled for the i-th attribute. known_attribute_label_flag[i] equal to 1 indicates that the attribute_label_four_bytes[i] field is signaled for the i-th attribute.

known_attribute_label[i] specifies the type of the i-th attribute. For example, known_attribute_label[i] equal to 0 may specify that the i-th attribute is color. known_attribute_label[i] equal to 1 may specify that the i-th attribute is reflectance. known_attribute_label[i] equal to 2 may specify that the i-th attribute is frame index. Also, known_attribute_label[i] equal to 4 specifies that the i-th attribute is transparency. known_attribute_label[i] equal to 5 specifies that the i-th attribute is normals.

attribute_label_four_bytes[i] indicates the known attribute type with a 4-byte code.

According to embodiments, attribute_label_four_bytes[i] equal to 0 may indicate that the i-th attribute is color. attribute_label_four_bytes[i] equal to 1 may indicate that the i-th attribute is reflectance. attribute_label_four_bytes[i] equal to 2 may indicate that the i-th attribute is a frame index. attribute_label_four_bytes[i] equal to 4 may indicate that the i-th attribute is transparency. attribute_label_four_bytes[i] equal to 5 may indicate that the i-th attribute is normals.

log 2_max_frame_idx indicates the number of bits used to signal a syntax variable frame_idx.

axis_coding_order specifies the correspondence between the X, Y, and Z output axis labels and the three position components in the reconstructed point cloud RecPic [pointidx] [axis] with and axis=0 . . . 2.

sps_bypass_stream_enabled_flag equal to 1 specifies that the bypass coding mode may be used in reading the bitstream. As another example, sps_bypass_stream_enabled_flag equal to 0 specifies that the bypass coding mode is not used in reading the bitstream.

sps_extension_flag indicates whether the sps_extension_data syntax structure is present in the SPS syntax structure. For example, sps_extension_present_flag equal to 1 indicates that the sps_extension_data syntax structure is present in the SPS syntax structure. sps_extension_present_flag equal to 0 indicates that this syntax structure is not present.

When the value of the sps_extension_flag field is 1, the SPS according to the embodiments may further include an sps_extension_data_flag field.

sps_extension_data_flag may have any value.

FIG. 23 is a diagram illustrating an embodiment of a syntax structure of an SPS (sequence_parameter_set( )) including IDCM-related information among predictive tree-related information according to embodiments.

In FIG. 23, the IDCM-related information may include an IDCM_flag field.

The IDCM_flag field indicates whether at least one point is classified as an IDCM point in a corresponding predictive tree structure. That is, the IDCM_flag field is a flag for distinguishing the case in which some points are classified as the IDCM in a predictive geometry coding scheme. For example, if the value of the IDCM_flag field is 1, this indicates that some points are classified as the IDCM in the predictive geometry coding scheme. If the value of the IDCM_flag field is 0, this indicates that there are no points classified as the IDCM in the predictive geometry coding scheme. Therefore, if the value of the IDCM_flag field is 0, the geometry encoder of the transmission device and the geometry decoder of the reception device perform geometry encoding/decoding in the same manner as an existing predictive geometry coding scheme.

If the value of the IDCM_flag field is 1, the SPS further includes the IDCM-related information capable of processing IDCM points.

The IDCM-related information may include an IDCM_threshold_low field, an IDCM_threshold_high field, an IDCM_track_mode field, an IDCM_slice_index[ ] field, an IDCM_original_index[ ] field, and an imaginary_point_prediction_mode field.

The IDCM_threshold_low field is information signaled when determining an input point as the IDCM in the case in which a criterion for determining the position of the input point (distance between a parent point and a child point, an average of a grandparent point and a child point, or a difference between a child point and an average of a great grandparent point, a grandparent point, and a parent point) is within a specific range. According to embodiments, the IDCM_threshold_low field indicates a smaller value among two ranges, that is, two threshold values. When determining whether the input point is the IDCM by setting a specific value, rather than the specific range, as a threshold, the IDCM_threshold_low field set to 0 may be signaled or signaling may be omitted.

The IDCM_threshold_high field is information signaled when determining the input point as the IDCM in the case in which a criterion for determining the position of the input point (distance between a parent point and a child point, an average of a grandparent point and a child point, or a difference between a child point and an average of a great grandparent point, a grandparent point, and a parent point) is within a specific range. According to embodiments, the IDCM_threshold_high field indicates a larger value among two ranges, that is, two threshold values. When determining whether the input point is the IDCM by setting a specific value, rather than the specific range, as a threshold, the value of the IDCM_threshold_high field may always be signaled.

That is, the IDCM_threshold_low field and the IDCM_threshold_high field are information used when determining whether a current point is an IDCM point. According to embodiments, if the position of the current point (node) is between the value of the IDCM_threshold_low field and the value of the IDCM_threshold_high field, the IDCM determiner 55003 determines the current point as the IDCM point.

The IDCM_track_mode field may signal an IDCM point determination method as illustrated in FIG. 24.

FIG. 24 is a table illustrating an IDCM determination method allocated to an IDCM_track_mode field according to embodiments.

According to embodiments, if the value of the IDCM_track_mode field is 0001, this indicates mode 1. Mode 1 represents that an IDCM point is determined while a predictive tree is being constructed. As indicated in Equation 5 below, if a difference between an average value of distances in a parent-child relationship from a parent to a root based on a current point (node) and a distance between the current point (node) and a point found as a parent of the current point is greater than a threshold value (e.g., IDCM_threshold_high field), the corresponding point is determined as the IDCM point.

$$\frac{\sum_{i=1}^{n-2} \overline{p_{0,i}p_{1,i}}}{n-2} - \overline{p_{0,c}p_{1,c}} > \text{IDCM\_threshold\_high} \qquad \text{[Equation 5]}$$

In Equation 5 above, p0 denotes position information of a child point when a predictive tree is tied to a child and a parent, and p1 denotes position information corresponding to a parent. To determine whether an N-th point is the IDCM, if a difference between an average of distances of points in a parent-child relationship from a parent of the N-th point to a root and a distance between a current point (node) and a point (node) in a parent relationship is greater than IDCM_threshold_high, the N-th point may be determined as the IDCM.

According to embodiments, if the value of the IDCM_track_mode field is 0010, this indicates mode 2. Mode 2 is the case of searching for an IDCM point after the predictive tree is constructed. If a corresponding point deviates by a specific range from an average value of points in a parent-child relationship from a root to a leaf node with respect to points constituting the entire predictive tree, the corresponding point is determined as the IDCM. A related equation is the same as that of mode 1, but the difference from mode 1 is a timing of determining the IDCM point. For example, in mode 1, whether a current point is the IDCM point is determined by comparing a representative value of points constituting the predictive tree with a position of the current point in real time in a process of constructing the predictive tree. In contrast, in mode 2, whether a current point is the IDCM point by screening points (nodes) once more in the entire tree after the predictive tree is fully constructed.

According to embodiments, if the value of the IDCM_track_mode field is 0011, this indicates mode 3. Mode 3 is a mode in which a current point is determined as the IDCM if the current point is within a specific value range. That is, if a position of an input point p0 is between a first threshold value (e.g., IDCM_threshold_low field) and a second threshold value (e.g., IDCM_threshold_high field), the corresponding point is determined as the IDCM (i.e., if IDCM_threshold_low<p0<IDCM_threshold_high, p0 is IDCM).

According to embodiments, if the value of the IDCM_track_mode field is 0100, this indicates mode 4. Mode 4 is a mode in which a current node (point) is determined as the IDCM if the current node (point) deviates by a predetermined range from a parent-grandparent-great grandparent relationship or pattern of the current node (point) after the predictive tree is constructed or while the predictive tree is being constructed. In Equation 6 below, p0 denotes a point or node to determine whether a point or node is the IDCM, and p1, p2, and p3 denote positions of a parent, a grandparent, and a great grandparent of p0, respectively.

$$\frac{p1 + p2 + p3}{3} - p0 > \text{IDCM\_threshold\_high} \qquad \text{[Equation 6]}$$

The IDCM_slice_index[ ] field may indicate the index of a slice including the IDCM point when a point classified as the IDCM is separately processed in a separate slice. In this case, since one or more points may be determined as the IDCM and there may be one or more slices, the IDCM_slice_index[ ] field is indicated to distinguish between the slices.

The IDCM_original_index[ ] field may indicate an original index of the IDCM point in order to identify an original position of the IDCM point when a point classified as the IDCM is located at a leaf node in a corresponding predictive tree. In this case, since one or more points may be determined as the IDCM, the IDCM_original_index[ ] field is indicated to distinguish between IDCM points.

The imaginary_point_prediction_mode field indicates an imaginary value acquisition method assigned to a position of a point (node) classified as the IDCM. According to embodiments, a random value (i.e., an imaginary value) is assigned to the position of the point (node) classified as the IDCM so that the imaginary value may be used to determine a prediction mode of the next point (node). In this case, the imaginary_point_prediction_mode field indicates the imaginary value acquisition (or determination) method. According to embodiments, when the prediction mode at a position on a predictive tree of the point (node) classified as the IDCM is NaN (optional, for example, no input value) or is not signaled, the imaginary value acquisition method may be signaled as illustrated in FIG. 25 to acquire the imaginary value.

FIG. 25 is a table illustrating an example of an imaginary value acquisition method assigned to an imaginary_point_prediction_mode field according to embodiments.

According to embodiments, if the value of the imaginary_point_prediction_mode field is 0001, this indicates mode 1. Mode 1 is a mode for determining an arithmetic or geometric average of position values of siblings of a corresponding IDCM point as an imaginary value of the IDCM point.

According to embodiments, if the value of the imaginary_point_prediction_mode field is 0010, this indicates mode 2. Mode 2 is a mode for determining an arithmetic or geometric average of position values of a grandparent and a parent of the IDCM point as the imaginary value of the IDCM point.

According to embodiments, if the value of the imaginary_point_prediction_mode field is 0011, this indicates mode 3. Mode 3 is a mode for determining a position value p1 of a parent of the IDCM point as the imaginary value of the IDCM point.

According to embodiments, if the value of the imaginary_point_prediction_mode field is 0100, this indicates mode 4. Mode 4 is a mode for determining a value (=|p2−p1|+p1) obtained by adding a position value p1 of a parent to a difference between a position value p2 of a grandparent and a position value p1 of the parent of the IDCM point as the imaginary value of the IDCM point.

According to embodiments, the imaginary value may be assigned to a position of the point classified as the IDCM, and signaling of the imaginary value calculated when construction of a predictive tree is completed or during encoding is omitted. Instead, only mode information used in calculation of the imaginary value of a corresponding IDCM point position is signaled. As another embodiment, the mode information may be omitted when the imaginary value is directly signaled.

According to embodiments, if there is no prediction mode information when reconstructing the predictive tree, the geometry decoder of the reception device may calculate arbitrary position information by referring to the imaginary_point_prediction_mode field and use the corresponding information to predict the next node (point). According to embodiments, in addition to the method defined in the imaginary_point_prediction_mode field, any value capable of indicating a tendency of a pattern may be added to the imaginary value acquisition method.

According to embodiments, the IDCM-related information of FIG. 23 may be included in an arbitrary position of the SPS of FIG. 22.

FIG. 26 is a diagram illustrating an example of a syntax structure of a TPS (tile_parameter_set( )) according to embodiments. According to embodiments, a TPS may be referred to as a tile inventory. The TPS according to the embodiments includes tile-related information for each tile.

The TPS according to embodiments includes a num_tiles field.

The num_tiles field indicates the number of tiles signaled for the bitstream. If no tiles exist, the value of the num_tiles field is inferred to be 0.

The TPS according to the embodiments includes a repetitive statement repeated as many times as the value of the num_tiles field. In this case, i is initialized to 0 and is incremented by 1 each time the repetitive statement is executed. In an embodiment, the repetitive statement is repeated until the value of i becomes the value of the num_tiles field. This repetitive statement may include a tile_bounding_box_offset_x[i] field, a tile_bounding_box_offset_y[i] field, a tile_bounding_box_offset_z[i] field, a tile_bounding_box_size_width[i] field, a tile_bounding_box_size_height[i] field, a tile_bounding_box_size_depth[i] field, and an attribute_pred_residual_separate_encoding_flag[i] field.

The tile_bounding_box_offset_x[i] field indicates the x offset of the i-th tile in the cartesian coordinates.

The tile_bounding_box_offset_y[i] field represents the y offset of the i-th tile in the cartesian coordinates.

The tile_bounding_box_offset_z[i] field represents the z offset of the i-th tile in the cartesian coordinates.

The tile_bounding_box_size_width[i] field indicates the width of the i-th tile in the cartesian coordinates.

The tile_bounding_box_size_height[i] field indicates the height of the i-th tile in the cartesian coordinates.

The tile_bounding_box_size_depth[i] field indicates the depth of the i-th tile in the cartesian coordinates.

FIG. 27 is a diagram illustrating an embodiment of a syntax structure of a TPS (tile_parameter_set( )) including IDCM-related information among predictive tree-related information according to embodiments.

Since the fields included in the IDCM-related information of FIG. 27 have been described in detail in FIGS. 23 to 25, a description thereof is omitted herein to avoid redundancy.

According to embodiments, the IDCM-related information of FIG. 27 may be included in an arbitrary position (e.g., within a repetitive statement) of the TPS of FIG. 26. The IDCM-related information of FIG. 27 may be applied when prediction-based geometry compression is performed in units of a tile or in units of a tile group.

FIG. 28 shows an embodiment of a syntax structure of the GPS (geometry_parameter_set( )) according to the present disclosure. The GPS may include information on a method of encoding geometry information of point cloud data included in one or more slices.

According to embodiments, the GPS may include a gps_geom_parameter_set_id field, a gps_seq_parameter_set_id field, gps_box_present_flag field, a unique_geometry_points_flag field, a geometry_planar_mode_flag field, a geometry_angular_mode_flag field, a neighbour_context_restriction_flag field, a inferred_direct_coding_mode_enabled_flag field, a bitwise_occupancy_coding_flag field, an adjacent_child_contextualization_enabled_flag field, a log 2_neighbour_avail_boundary field, a log 2_intra_pred_max_node_size field, a log 2_trisoup_node_size field, a geom_scaling_enabled_flag field, a gps_implicit_geom_partition_flag field, and a gps_extension_flag field.

The gps_geom_parameter_set_id field provides an identifier for the GPS for reference by other syntax elements.

The gps_seq_parameter_set_id field specifies the value of sps_seq_parameter_set_id for the active SPS.

The gps_box_present_flag field specifies whether additional bounding box information is provided in a geometry slice header that references the current GPS. For example, the gps_box_present_flag field equal to 1 may specify that additional bounding box information is provided in a geometry slice header that references the current GPS. Accordingly, when the gps_box_present_flag field is equal to 1, the GPS may further include a gps_gsh_box_log 2_scale_present_flag field.

The gps_gsh_box_log 2_scale_present_flag field specifies whether the gps_gsh_box_log 2_scale field is signaled in each geometry slice header that references the current GPS. For example, the gps_gsh_box_log 2_scale_present_flag field equal to 1 may specify that the gps_gsh_box_log 2_scale field is signaled in each geometry slice header that references the current GPS. As another example, the gps_gsh_box_log 2_scale_present_flag field equal to 0 may specify that the gps_gsh_box_log 2_scale field is not signaled in each geometry slice header and a common scale for all slices is signaled in the gps_gsh_box_log 2_scale field of the current GPS.

When the gps_gsh_box_log 2_scale_present_flag field is equal to 0, the GPS may further include a gps_gsh_box_log 2_scale field.

The gps_gsh_box_log 2_scale field indicates the common scale factor of the bounding box origin for all slices that refer to the current GPS.

unique_geometry_points_flag indicates whether all output points have unique positions in one slice in all slices currently referring to GPS. For example, unique_geometry_points_flag equal to 1 indicates that in all slices that refer to the current GPS, all output points have unique positions within a slice. unique_geometry_points_flag field equal to 0 indicates that in all slices that refer to the current GPS, the two or more of the output points may have same positions within a slice.

The geometry_planar_mode_flag field indicates whether the planar coding mode is activated. For example, geometry_planar_mode_flag equal to 1 indicates that the planar coding mode is active. geometry_planar_mode_flag equal to 0 indicates that the planar coding mode is not active.

When the value of the geometry_planar_mode_flag field is 1, that is, TRUE, the GPS may further include a geom_planar_mode_th_idcm field, a geom_planar_mode_th[1] field, and a geom_planar_mode_th[2] field.

The geom_planar_mode_th_idcm field may specify the value of the threshold of activation for the direct coding mode.

geom_planar_mode_th[i] specifies, for i in the range of 0 . . . 2, specifies the value of the threshold of activation for planar coding mode along the i-th most probable direction for the planar coding mode to be efficient.

geometry_angular_mode_flag indicates whether the angular coding mode is active. For example, geometry_angular_mode_flag field equal to 1 may indicate that the angular coding mode is active. geometry_angular_mode_flag field equal to 0 may indicate that the angular coding mode is not active.

When the value of the geometry_angular_mode_flag field is 1, that is, TRUE, the GPS may further include an lidar_head_position[0] field, a lidar_head_position[1] field, a lidar_head_position[2] field, a number_lasers field, a planar_buffer_disabled field, an implicit_qtbt_angular_max_node_min_dim_log 2_to_split_z field, and an implicit_qtbt_angular_max_diff_to_split_z field.

The lidar_head_position[0] field, lidar_head_position[1] field, and lidar_head_position[2] field may specify the (X, Y, Z) coordinates of the lidar head in the coordinate system with the internal axes.

number_lasers specifies the number of lasers used for the angular coding mode.

The GPS according to the embodiments includes an iteration statement that is repeated as many times as the value of the number_lasers field. In an embodiment, i is initialized to 0, and is incremented by 1 each time the iteration statement is executed. The iteration statement is repeated until the value of i becomes equal to the value of the number_lasers field. This iteration statement may include a laser_angle[i] field and a laser_correction[i] field.

laser_angle[i] specifies the tangent of the elevation angle of the i-th laser relative to the horizontal plane defined by the 0-th and the 1st internal axes.

laser_correction[i] specifies the correction, along the second internal axis, of the i-th laser position relative to the lidar_head_position[2].

planar_buffer_disabled equal to 1 indicates that tracking the closest nodes using a buffer is not used in process of coding the planar mode flag and the plane position in the planar mode. planar_buffer_disabled equal to 0 indicates that tracking the closest nodes using a buffer is used.

implicit_qtbt_angular_max_node_min_dim_log 2_to_split_z specifies the log 2 value of a node size below which horizontal split of nodes is preferred over vertical split.

implicit_qtbt_angular_max_diff_to_split_z specifies the log 2 value of the maximum vertical over horizontal node size ratio allowed to a node.

neighbour_context_restriction_flag equal to 0 indicates that geometry node occupancy of the current node is coded with the contexts determined from neighbouring nodes which is located inside the parent node of the current node. neighbour_context_restriction_flag equal to 1 indicates that geometry node occupancy of the current node is coded with the contexts determined from neighbouring nodes which is located inside or outside the parent node of the current node.

The inferred_direct_coding_mode_enabled_flag field indicates whether the direct_mode_flag field is present in the geometry node syntax. For example, the inferred_direct_coding_mode_enabled_flag field equal to 1 indicates that the direct_mode_flag field may be present in the geometry node syntax. For example, the inferred_direct_coding_mode_enabled_flag field equal to 0 indicates that the direct_mode_flag field is not present in the geometry node syntax.

The bitwise_occupancy_coding_flag field indicates whether geometry node occupancy is encoded using bitwise contextualization of the syntax element occupancy map. For example, the bitwise_occupancy_coding_flag field equal to 1 indicates that geometry node occupancy is encoded using bitwise contextualisation of the syntax element ocupancy_map. For example, the bitwise_occupancy_coding_flag field equal to 0 indicates that geometry node occupancy is encoded using the dictionary encoded syntax element occupancy_byte.

The adjacent_child_contextualization_enabled_flag field indicates whether the adjacent children of neighboring octree nodes are used for bitwise occupancy contextualization. For example, the adjacent_child_contextualization_enabled_flag field equal to 1 indicates that the adjacent children of neighboring octree nodes are used for bitwise occupancy contextualization. For example, adjacent_child_contextualization_enabled_flag equal to 0 indicates that the children of neighbouring octree nodes are not used for occupancy contextualization. The log 2_neighbour_avail_boundary field specifies the value of the variable NeighbAvailBoundary that is used in the decoding process.

For example, when the neighbour_context_restriction_flag field is equal to 1, NeighbAvailabilityMask may be set equal to 1. For example, when the neighbour_context_restriction_flag field is equal to 0, NeighbAvailabilityMask may be set equal to 1<<log 2_neighbour_avail_boundary.

The log 2_intra_pred_max_node_size field specifies the octree node size eligible for occupancy intra prediction.

The log 2_trisoup_node_size field specifies the variable TrisoupNodeSize as the size of the triangle nodes.

geom_scaling_enabled_flag indicates specifies whether a scaling process for geometry positions is applied during the geometry slice decoding process. For example, geom_scaling_enabled_flag equal to 1 specifies that a scaling process for geometry positions is applied during the geometry slice decoding process. geom_scaling_enabled_flag equal to 0 specifies that geometry positions do not require scaling.

geom_base_qp indicates the base value of the geometry position quantization parameter.

gps_implicit_geom_partition_flag indicates whether the implicit geometry partition is enabled for the sequence or slice. For example, equal to 1 specifies that the implicit geometry partition is enabled for the sequence or slice. gps_implicit_geom_partition_flag equal to 0 specifies that the implicit geometry partition is disabled for the sequence or slice. When gps_implicit_geom_partition_flag is equal to 1, the following two fields, that is, a gps_max_num_implicit_qtbt_before_ot field and a gps_min_size_implicit_qtbt field, are signaled.

gps_max_num_implicit_qtbt_before_ot specifies the maximal number of implicit QT and BT partitions before OT partitions. Then, the variable K is initialized by gps_max_num_implicit_qtbt_before_ot as follows.

K=gps_max_num_implicit_qtbt_before_ot.

gps_min_size_implicit_qtbt specifies the minimal size of implicit QT and BT partitions. Then, the variable M is initialized by gps_min_size_implicit_qtbt as follows.

M=gps_min_size_implicit_qtbt gps_extension_flag indicates whether a gps_extension_data syntax structure is present in the GPS syntax structure. For example, gps_extension_flag equal to 1 indicates that the gps_extension_data syntax structure is present in the GPS syntax. For example, gps_extension_flag equal to 0 indicates that the gps_extension_data syntax structure is not present in the GPS syntax.

When gps_extension_flag is equal to 1, the GPS according to the embodiments may further include a gps_extension_data_flag field.

gps_extension_data_flag may have any value. Its presence and value do not affect decoder conformance to profiles.

FIG. 29 is a diagram illustrating an embodiment of a syntax structure of a GPS (geometry_parameter_set( )) including IDCM-related information among predictive tree-related information according to embodiments.

Since the fields included in the IDCM-related information of FIG. 29 have been described in detail in FIGS. 23 to 25, a description thereof is omitted herein to avoid redundancy.

According to embodiments, the IDCM-related information of FIG. 29 may be included in an arbitrary position of the GPS of FIG. 28.

FIG. 30 shows an embodiment of a syntax structure of the attribute parameter set (APS) (attribute_parameter_set( )) according to the present disclosure. The APS according to the embodiments may contain information on a method of encoding attribute information about point cloud data contained in one or more slices.

The APS according to the embodiments may include an aps_attr_parameter_set_id field, an aps_seq_parameter_set_id field, an attr_coding_type field, an aps_attr_initial_qp field, an aps_attr_chroma_qp_offset field, an aps_slice_qp_delta_present_flag field, and an aps_extension_flag field.

The aps_attr_parameter_set_id field provides an identifier for the APS for reference by other syntax elements.

The aps_seq_parameter_set_id field specifies the value of sps_seq_parameter_set_id for the active SPS.

The attr_coding_type field indicates the coding type for the attribute.

According to embodiments, the attr_coding_type field equal to 0 may indicate predicting weight lifting as the coding type. The attr_coding_type field equal to 1 may indicate RAHT as the coding type. The attr_coding_type field equal to 2 may indicate fix weight lifting.

The aps_attr_initial_qp field specifies the initial value of the variable SliceQp for each slice referring to the APS.

The aps_attr_chroma_qp_offset field specifies the offsets to the initial quantization parameter signaled by the syntax aps_attr_initial_qp.

The aps_slice_qp_delta_present_flag field specifies whether the ash_attr_qp_delta_luma and ash_attr_qp_delta_chroma syntax elements are present in the attribute slice header (ASH). For example, the aps_slice_qp_delta_present_flag field equal to 1 specifies that the ash_attr_qp_delta_luma and ash_attr_qp_delta_chroma syntax elements are present in the ASH. For example, the aps_slice_qp_delta_present_flag field specifies that the ash_attr_qp_delta_luma and ash_attr_qp_delta_chroma syntax elements are not present in the ASH.

When the value of the attr_coding_type field is 0 or 2, that is, the coding type is predicting weight lifting or fix weight lifting, the APS according to the embodiments may further include a lifting_num_pred_nearest_neighbours_minus1 field, a lifting_search_range_minus1 field, and a lifting_neighbour_bias [k] field.

lifting_num_pred_nearest_neighbours plus 1 specifies the maximum number of nearest neighbors to be used for prediction. According to embodiments, the value of NumPredNearestNeighbours is set equal to lifting_num_pred_nearest_neighbours.

lifting_search_range_minus1 plus 1 specifies the search range used to determine nearest neighbours to be used for prediction and to build distance-based levels of detail (LODs). The variable LiftingSearchRange for specifying the search range may be obtained by adding 1 to the value of the lifting_search_range_minus1 field (LiftingSearchRange= lifting_search_range_minus1+1).

The lifting_neighbour_bias[k] field specifies a bias used to weight the k-th components in the calculation of the Euclidean distance between two points as part of the nearest neighbor derivation process.

When the value of the attr_coding_type field is 2, that is, when the coding type indicates fix weight lifting, the APS according to the embodiments may further include a lifting_scalability_enabled_flag field.

The lifting_scalability_enabled_flag field specifies whether the attribute decoding process allows the pruned octree decode result for the input geometry points. For example, the lifting_scalability_enabled_flag field equal to 1 specifies that the attribute decoding process allows the pruned octree decode result for the input geometry points. The lifting_scalability_enabled_flag field equal to 0 specifies that that the attribute decoding process requires the complete octree decode result for the input geometry points.

According to embodiments, when the value of the lifting_scalability_enabled_flag field is FALSE, the APS may further include a lifting_num_detail_levels_minus1 field.

The lifting_num_detail_levels_minus1 field specifies the number of levels of detail for the attribute coding. The variable LevelDetailCount for specifying the number of LODs may be obtained by adding 1 to the value of the lifting_num_detail_levels_minus1 field. (LevelDetailCount= lifting_num_detail_levels_minus1+1).

According to embodiments, when the value of the lifting_num_detail_levels_minus1 field is greater than 1, the APS may further include a lifting_lod_regular_sampling_enabled_flag field.

The lifting_lod_regular_sampling_enabled_flag field specifies whether levels of detail (LODs) are built by a regular sampling strategy. For example, the lifting_lod_regular_sampling_enabled_flag equal to 1 specifies that levels of detail (LOD) are built by using a regular sampling strategy. The lifting_lod_regular_sampling_enabled_flag equal to 0 specifies that a distance-based sampling strategy is used instead.

According to embodiments, when the value of the lifting_scalability_enabled_flag field is FALSE, the APS may further include an iteration statement iterated as many times as the value of the lifting_num_detail_levels_minus1 field. In an embodiment, the index (idx) is initialized to 0 and incremented by 1 every time the iteration statement is executed, and the iteration statement is iterated until the index (idx) is greater than the value of the lifting_num_detail_levels_minus1 field. This iteration statement may include a lifting_sampling_period_minus2 [idx] field when the value of the lifting_lod_decimation_enabled_flag field is TRUE (e.g., 1), and may include a lifting_sampling_distance_squared_scale_minus1 [idx] field when the value of the lifting_lod_regular_sampling_enabled_flag field is FALSE (e.g., 0). Also, when the value of idx is not 0 (idx !=0), a lifting_sampling_distance_squared_offset [idx] field may be further included.

lifting_sampling_period_minus2 [idx] plus 2 specifies the sampling period for the level of detail idx.

lifting_sampling_distance_squared_scale_minu1 [idx] plus 1 specifies the scale factor for the derivation of the square of the sampling distance for the level of detail idx.

The lifting_sampling_distance_squared_offset [idx] field specifies the offset of the derivation of the square of the sampling distance for the level of detail idx.

When the value of the attr_coding_type field is 0, that is, when the coding type is predicting weight lifting, the APS according to the embodiments may further include a lifting_adaptive_prediction_threshold field, a lifting_intra_lod_prediction_num_layers field, a lifting_max_num_direct_predictors field, and an inter_component_prediction_enabled_flag field.

The lifting_adaptive_prediction_threshold field specifies the threshold to enable adaptive prediction. According to embodiments, a variable AdaptivePredictionThreshold for specifying a threshold for switching an adaptive predictor selection mode is set equal to the value of the lifting_adaptive_prediction_threshold field (AdaptivePrediction Threshold=lifting_adaptive_prediction_threshold).

The lifting_intra_lod_prediction_num_layers field specifies the number of LOD layers where decoded points in the same LOD layer could be referred to generate a prediction value of a target point. For example, the lifting_intra_lod_prediction_num_layers field equal to LevelDetailCount indicates that target point could refer to decoded points in the same LOD layer for all LOD layers. For example, the lifting_intra_lod_prediction_num_layers field equal to 0 indicates that target point could not refer to decoded points in the same LoD layer for any LoD layers. The lifting_max_num_direct_predictors field specifies the maximum number of predictors to be used for direct prediction. The value of the lifting_max_num_direct_predictors field shall be in the range of 0 to LevelDetailCount.

The inter_component_prediction_enabled_flag field specifies whether the primary component of a multi component attribute is used to predict the reconstructed value of non-primary components. For example, if the inter_component_prediction_enabled_flag field equal to 1 specifies that the primary component of a multi component attribute is used to predict the reconstructed value of non-primary components. The inter_component_prediction_enabled_flag field equal to 0 specifies that all attribute components are reconstructed independently.

According to the embodiments, when the value of the attr_coding_type field is 1, that is, when the attribute coding type is RAHT, the APS may further include a raht_prediction_enabled_flag field.

The raht_prediction_enabled_flag field specifies whether the transform weight prediction from the neighbor points is enabled in the RAHT decoding process. For example, the raht_prediction_enabled_flag field equal to 1 specifies the transform weight prediction from the neighbor points is enabled in the RAHT decoding process. raht_prediction_enabled_flag equal to 0 specifies that the transform weight prediction is disabled in the RAHT decoding process.

According to embodiments, when the value of the raht_prediction_enabled_flag field is TRUE, the APS may further include a raht_prediction_threshold0 field and a raht_prediction_threshold1 field.

The raht_prediction_threshold0 field specifies a threshold to terminate the transform weight prediction from neighbour points.

The raht_prediction_threshold1 field specifies a threshold to skip the transform weight prediction from neighbour points.

The aps_extension_flag field specifies whether the aps_extension_data_flag syntax structure is present in the APS syntax structure. For example, aps_extension_flag equal to 1 indicates that the aps_extension_data syntax structure is present in the APS syntax structure. For example, aps_extension_flag equal to 0 indicates that the aps_extension_data syntax structure is not present in the APS syntax structure.

When the value of the aps_extension_flag field is 1, the APS according to the embodiments may further include an aps_extension_data_flag field.

The aps_extension_data_flag field may have any value. Its presence and value do not affect decoder conformance to profiles.

The APS according to the embodiments may further include information related to LoD-based attribute compression.

FIG. 31 is a diagram illustrating an embodiment of a syntax structure of an APS (attribute_parameter_set( )) including IDCM-related information among predictive tree-related information according to embodiments.

Since the fields included in the IDCM-related information of FIG. 31 have been described in detail in FIGS. 23 to 25, a description thereof is omitted herein to avoid redundancy.

According to embodiments, the IDCM-related information of FIG. 31 may be included in an arbitrary position of the APS FIG. 30.

FIG. 32 is a diagram illustrating an embodiment of a syntax structure of a geometry slice bitstream( ) according to the present disclosure. According to embodiments, the geometry slice bitstream( ) is also referred to as a geometry data unit.

The geometry slice bitstream (geometry_slice_bitstream ( )) according to embodiments may include a geometry slice header (geometry_slice_header( )) and geometry slice data (geometry_slice_data( )).

FIG. 33 shows an embodiment of a syntax structure of a geometry slice header (geometry_slice_header( )) according to the present disclosure.

A bitstream transmitted by the transmission device (or a bitstream received by the reception device) according to the embodiments may contain one or more slices. Each slice may include a geometry slice and an attribute slice. The geometry slice includes a geometry slice header (GSH). The attribute slice includes an attribute slice header (ASH).

The geometry slice header (geometry_slice_header( )) according to the embodiments may include a gsh_geometry_parameter_set_id field, a gsh_tile_id field, gsh_slice_id field, a frame_idx field, a gsh_num_points field, and a byte_alignment( ) field.

When the value of the gps_box_present_flag field included in the GPS is TRUE (e.g., 1), and the value of the gps_gsh_box_log 2_scale_present_flag field is TRUE (e.g., 1), the geometry slice header (geometry_slice_header ( )) according to the embodiments may further include a gsh_box_log 2_scale field, a gsh_box_origin_x field, a gsh_box_origin_y field, and a gsh_box_origin_z field.

gsh_geometry_parameter_set_id specifies the value of the gps_geom_parameter_set_id of the active GPS.

The gsh_tile_id field specifies the value of the tile id that is referenced by the GSH.

The gsh_slice_id specifies ID of the slice for reference by other syntax elements.

The frame_idx field indicates log 2_max_frame_idx+1 least significant bits of a conceptual frame number counter. Consecutive slices with differing values of frame_idx form parts of different output point cloud frames. Consecutive slices with identical values of frame_idx without an intervening frame boundary marker data unit form parts of the same output point cloud frame.

The gsh_num_points field indicates the maximum number of coded points in a slice. According to embodiments, it is a requirement of bitstream conformance that gsh_num_points is greater than or equal to the number of decoded points in the slice.

The gsh_box_log 2_scale field specifies the scaling factor of the bounding box origin for the slice.

The gsh_box_origin_x field specifies the x value of the bounding box origin scaled by the value of the gsh_box_log 2_scale field.

The gsh_box_origin_y field specifies the y value of the bounding box origin scaled by the value of the gsh_box_log 2_scale field.

The gsh_box_origin_z field specifies the z value of the bounding box origin scaled by the value of the gsh_box_log 2_scale field.

Here, the variables slice_origin_x, slice_origin_y, and slice_origin_z may be derived as follows.

When gps_gsh_box_log 2_scale_present_flag is equal to 0, originScale is set to gsh_box_log 2_scale.

When gps_gsh_box_log 2_scale_present_flag is equal to 1, originScale is set to gps_gsh_box_log 2_scale.

When gps_box_present_flag is equal to 0, the values of the variables slice_origin_x, slice_origin_y, and slice_origin_z are inferred to be 0.

When gps_box_present_flag is equal to 1, the following equations will be applied to the variables slice_origin_x, slice_origin_y, and slice origin_z.

$$\text{slice\_origin\_}x = \text{gsh\_box\_origin\_}x << \text{originScale}$$

$$\text{slice\_origin\_}y = \text{gsh\_box\_origin\_}y >> \text{originScale}$$

$$\text{slice\_origin\_}z = \text{gsh\_box\_origin\_}z << \text{originScale}$$

When the value of the gps_implicit_geom_partition_flag field is TRUE (i.e., 0), the geometry slice header ((geometry_slice_header( )) may further include a gsh_log 2_max_nodesize_x field, a gsh_log 2_max_nodesize_y_minus_x field, and a gsh_log 2_max_nodesize_z_minus_y field. When the value of the gps_implicit_geom_partition_flag field is FALSE (i.e., 1), the geometry slice header may further include a gsh_log 2_max_nodesize field.

The gsh_log 2_max_nodesize_x field specifies the bounding box size in the x dimension, i.e., MaxNodesizeXLog 2 that is used in the decoding process as follows.

$$\text{MaxNodeSize}X \text{ Log } 2 = \text{gsh\_log } 2\_\text{max\_nodesize\_}x$$

$$\text{MaxNodeSize}X = 1 << \text{MaxNodeSize}X \text{ Log } 2$$

The gsh_log 2_max_nodesize_y_minus_x field specifies the bounding box size in the y dimension, i.e., MaxNodesizeYLog 2 that is used in the decoding process as follows.

$$\text{MaxNodeSize}Y \text{ Log } 2 = \text{gsh\_log } 2\_\text{max\_nodesize\_}y\_\text{minus\_}x + \text{MaxNodeSize}X \text{ Log } 2.$$

$$\text{MaxNodeSize}Y = 1 << \text{MaxNodeSize}Y \text{ Log } 2.$$

The gsh_log 2_max_nodesize_z_minus_y field specifies the bounding box size in the z dimension, i.e., MaxNodesizeZLog 2 that is used in the decoding process as follows.

$$\text{MaxNodeSize}Z \text{ Log } 2 = \text{gsh\_log } 2\_\text{max\_nodesize\_}z\_\text{minus\_}y + \text{MaxNodeSize}Y \text{ Log } 2$$

$$\text{MaxNodeSize}Z = 1 << \text{MaxNodeSize}Z \text{ Log } 2$$

When the value of the gps_implicit_geom_partition_flag field is 1, gsh_log 2_max_nodesize is obtained as follows.
gsh_log 2_max_nodesize=max{MaxNodeSizeXLog 2, MaxNodeSizeYLog 2, MaxNodeSizeZLog 2}

The gsh_log 2_max_nodesize field specifies the size of the root geometry octree node when gps_implicit_geom_partition_flag is equal to 0.

Here, the variables MaxNodeSize and MaxGeometryOctreeDepth are derived as follows.

$$\text{MaxNodeSize} = 1 << \text{gsh\_log } 2\_\text{max\_nodesize}$$

MaxGeometryOctreeDepth=gsh_log 2_max_nodesize-log 2_trisoup_node_size

When the value of the geom_scaling_enabled_flag field is TRUE, the geometry slice header (geometry_slice_header ( )) according to the embodiments may further include a geom_slice_qp_offset field and a geom_octree_qp_offsets_enabled_flag field.

The geom_slice_qp_offset field specifies an offset to the base geometry quantization parameter geom_base_qp.

The geom_octree_qp_offsets_enabled_flag field specifies whether the geom_octree_qp_ofsets_depth field is present in the geometry slice header. For example, geom_octree_qp_offsets_enabled_flag equal to 1 specifies that the geom_octree_qp_ofsets_depth field is present in the geometry slice header. geom_octree_qp_offsets_enabled_flag equal to 0 specifies that the geom_octree_qp_ofsets_depth field is not present.

The geom_octree_qp_offsets_depth field specifies the depth of the geometry octree.

FIG. 34 is a diagram illustrating an embodiment of a syntax structure of a geometry slice header (geometry_slice_header( )) including IDCM-related information among predictive tree-related information according to embodiments.

Since the fields included in the IDCM-related information of FIG. 34 have been described in detail in FIGS. 23 to 25, a description thereof is omitted herein to avoid redundancy.

According to embodiments, the IDCM-related information of FIG. 34 may be included in an arbitrary position of the geometry slice header of FIG. 33.

FIG. 35 shows an embodiment of a syntax structure of geometry slice data (geometry_slice_data( )) according to the present disclosure. The geometry slice data (geometry_slice_data( )) according to the embodiments may carry a geometry bitstream belonging to a corresponding slice.

The geometry_slice_data( ) according to the embodiments may include a first iteration statement repeated as many times as by the value of MaxGeometryOctreeDepth. In an embodiment, the depth is initialized to 0 and is incremented by 1 each time the iteration statement is executed, and the first iteration statement is repeated until the depth becomes equal to MaxGeometryOctreeDepth. The first iteration statement may include a second loop statement repeated as many times as the value of NumNodesAtDepth. In an embodiment, nodeidx is initialized to 0 and is incremented by 1 each time the iteration statement is executed. The second iteration statement is repeated until nodeidx becomes equal to NumNodesAtDepth. The second iteration statement may include xN=NodeX[depth][nodeIdx], yN=NodeY[depth][nodeIdx], zN=NodeZ[depth][nodeIdx], and geometry_node (depth, nodeidx, xN, yN, zN). MaxGeometryOctreeDepth indicates the maximum value of the geometry octree depth, and NumNodesAtDepth[depth] indicates the number of nodes to be decoded at the corresponding depth. The variables NodeX[depth][nodeIdx], NodeY[depth][nodeIdx], and NodeZ[depth][nodeIdx] indicate the x, y, z coordinates of the idx-th node in decoding order at a given depth. The geometry bitstream of the node of the depth is transmitted through geometry_node(depth, nodeIdx, xN, yN, zN).

The geometry slice data (geometry_slice_data( )) according to the embodiments may further include geometry_trisoup_data( ) when the value of the log 2_trisoup_node_size field is greater than 0. That is, when the size of the triangle nodes is greater than 0, a geometry bitstream subjected to trisoup geometry encoding is transmitted through geometry_trisoup_data( )).

FIG. 36 is a diagram illustrating an embodiment of a syntax structure of geometry slice data (geometry_slice_data( )) including IDCM-related information among predictive tree-related information according to embodiments.

Since the fields included in the IDCM-related information of FIG. 36 have been described in detail in FIGS. 23 to 25, a description thereof is omitted herein to avoid redundancy.

According to embodiments, the IDCM-related information of FIG. 36 may be included in an arbitrary position of the geometry slice data of FIG. 35.

FIG. 37 is a diagram illustrating an embodiment of a syntax structure of an attribute slice bitstream( ) according to the present disclosure. According to embodiments, the attribute slice bitstream( ) is also referred to as an attribute data unit.

The attribute slice bitstream (attribute_slice_bitstream ( )) according to the embodiments may include an attribute slice header (attribute_slice_header( )) and attribute slice data (attribute_slice_data( )).

FIG. 38 shows an embodiment of a syntax structure of an attribute slice header (attribute_slice_header( )) according to the present disclosure.

The attribute slice header (attribute_slice_header( )) according to the embodiments may include an ash_attr_parameter_set_id field, an ash_attr_sps_attr_idx field, an ash_attr_geom_slice_id field, an ash_attr_layer_qp_delta_present_flag field, and an ash_attr_region_qp_delta_present_flag field.

When the value of the aps_slice_qp_delta_present_flag field of the APS is TRUE (e.g., 1), the attribute slice header (attribute_slice_header( )) according to the embodiments may further include a ash_attr_qp_delta_luma field. When the value of the attribute_dimension_minus1 [ash_attr_sps_attr_idx] field is greater than 0, the attribute slice header may further include an ash_attr_qp_delta_chroma field.

The ash_attr_parameter_set_id field specifies the value of the aps_attr_parameter_set_id field of the current active APS.

The ash_attr_sps_attr_idx field specifies an attribute set in the current active SPS.

The ash_attr_geom_slice_id field specifies the value of the gsh_slice_id field of the current geometry slice header.

The ash_attr_qp_delta_luma field specifies a luma delta quantization parameter qp derived from the initial slice qp in the active attribute parameter set.

The ash_attr_qp_delta_chroma field specifies the chroma delta qp derived from the initial slice qp in the active attribute parameter set.

The variables InitialSliceQpY and InitialSliceQpC are derived as follows.

$$\text{InitialSlice}QpY = \text{aps\_attr}\text{attr\_initial\_}qp + \text{ash\_at-}\\\text{tr\_}qp\text{\_delta\_luma}$$

$$\text{InitialSlice}QpC = \text{aps\_attr}\text{attr\_initial\_}qp + \text{aps\_at-}\\\text{tr\_chroma\_}qp\text{\_offset} + \text{ash\_attr\_}qp\text{\_delta\_chroma}$$

The ash_attr_layer_qp_delta_present_flag field specifies whether the ash_attr_layer_qp_delta_luma field and the ash_attr_layer_qp_delta_chroma field are present in the ASH for each layer. For example, when the value of the ash_attr_layer_qp_delta_present_flag field is 1, it indicates that the ash_attr_layer_qp_delta_luma field and the ash_attr_layer_qp_delta_chroma field are present in the ASH. When the value is 0, it indicates that the fields are not present.

When the value of the ash_attr_layer_qp_delta_present_flag field is TRUE, the ASH may further include an ash_attr_num_layer_qp_minus1 field.

ash_attr_num_layer_qp_minus1 plus 1 indicates the number of layers through which the ash_attr_qp_delta_luma field and the ash_attr_qp_delta_chroma field are signaled. When the ash_attr_num_layer_qp field is not signaled, the value of the ash_attr_num_layer_qp field will be 0. According to embodiments, NumLayerQp specifying the number of layers may be obtained by adding 1 to the value of the ash_attr_num_layer_qp_minus1 field (NumLayerQp=ash_attr_num_layer_qp_minus1+1).

According to embodiments, when the value of the ash_attr_layer_qp_delta_present_flag field is TRUE, the geometry slice header may include a loop iterated as many times as the value of NumLayerQp. In this case, in an embodiment, i may be initialized to 0 and incremented by 1 every time the loop is executed, and the loop is iterated until the value of i reaches the value of NumLayerQp. This loop contains an ash_attr_layer_qp_delta_luma[i] field. Also, when the value of the attribute_dimension_minus1[ash_attr_sps_attr_idx] field is greater than 0, the loop may further include an ash_attr_layer_qp_delta_chroma[i] field.

The ash_attr_layer_qp_delta_luma field indicates a luma delta quantization parameter qp from InitialSliceQpY in each layer.

The ash_attr_layer_qp_delta_chroma field indicates a chroma delta quantization parameter qp from InitialSliceQpC in each layer.

The variables SliceQpY[i] and SliceQpC[i] with i=0, . . . , NumLayerQPNumQPLayer-1 are derived as follows.

for (i=0; i<NumLayerQPNumQPLayer; i++) {

$$\text{Slice}QpY[i] = \text{InitialSlice}QpY + \text{ash\_attr\_layer\_}qp\text{\_del-}\\\text{ta\_luma}[i]$$

$$\text{Slice}QpC[i] = \text{InitialSlice}QpC + \text{ash\_attr\_layer\_}qp\text{\_del-}\\\text{ta\_chroma}[i]$$

} ash_attr_region_qp_delta_present_flag equal to 1 indicates that ash_attr_region_qp_delta, region bounding box origin, and size are present in the current the attribute slice header (attribute_slice_header( )) according to the embodiments. ash_attr_region_qp_delta_present_flag equal to 0 indicates that the ash_attr_region_qp_delta, region bounding box origin, and size are not present in the current attribute slice header.

That is, when the value of the ash_attr_layer_qp_delta_present_flag field is 1, the attribute slice header may further include an ash_attr_qp_region_box_origin_x field, an ash_attr_qp_region_box_origin_y field, an ash_attr_qp_region_box_origin_z field, an ash_attr_qp_region_box_width field, an ash_attr_qp_region_box_height field, an ash_attr_qp_region_box_depth field, and an ash_attr_region_qp_delta field.

The ash_attr_qp_region_box_origin_x field indicates the x offset of the region bounding box relative to slice_origin_x.

The ash_attr_qp_region_box_origin_y field indicates the y offset of the region bounding box relative to slice_origin_y.

The ash_attr_qp_region_box_origin_z field indicates the z offset of the region bounding box relative to slice_origin_z.

The ash_attr_qp_region_box_size_width field indicates the width of the region bounding box.

The ash_attr_qp_region_box_size_height field indicates the height of the region bounding box.

The ash_attr_qp_region_box_size_depth field indicates the depth of the region bounding box.

The ash_attr_region_qp_delta field indicates delta qp from SliceQpY[i] and SliceQpC[i] of a region specified by the ash_attr_qp_region_box field.

According to embodiments, the variable RegionboxDeltaQp specifying a region box delta quantization parameter is set equal to the value of the ash_attr_region_qp_delta field (RegionboxDeltaQp=ash_attr_region_qp_delta).

FIG. 39 is a diagram illustrating an embodiment of a syntax structure of attribute slice data (attribute_slice_data ( )) according to the present disclosure. The attribute slice data (attribute_slice_data( )) according to the embodiments may carry an attribute bitstream belonging to a corresponding slice. The attribute slice data according to the embodiments may include an attribute or attribute-related data in relation to some or all point clouds.

In the attribute slice data (attribute_slice_data( )) of FIG. 39, dimension=attribute_dimension[ash_attr_sps_attr_idx] represents an attribute dimension (attribute_dimension) of an attribute set identified by an ash_attr_sps_attr_idx field in a corresponding attribute slice header. The attribute dimension (attribute_dimension) indicates the number of components constituting an attribute. The attribute according to the embodiments represents reflectance, color, and the like. Therefore, the number of components that each attribute has is different. For example, an attribute corresponding to color may have three color components (e.g., RGB). Therefore, an attribute corresponding to reflectance may be a mono-dimensional attribute, and the attribute corresponding to color may be a 3-dimensional attribute.

The attribute according to the embodiments may be attribute-encoded in units of a dimension.

For example, each of the attribute corresponding to reflectance and the attribute corresponding to color may be attribute-encoded. In addition, the attributes according to the embodiments may be attribute-encoded together regardless of the dimension. For example, the attribute corresponding to reflectance and the attribute corresponding to color may be attribute-encoded together.

In FIG. 39, zerorun specifies the number of 0s prior to a residual attribute value.

In an embodiment, in FIG. 39, i denotes the i-th point value of the attribute, and an attr_coding_type field and a lifting_adaptive_prediction_threshold field are signaled through an APS.

MaxNumPredictors of FIG. 39 is a variable used in a point cloud data decoding process and may be obtained as follows based on the value of the lifting_adaptive_prediction_threshold field signaled through the APS.

$$\text{MaxNumPredictors=lifting\_max\_num\_direct\_predicots field+1}$$

where the lifting_max_num_direct_predictors field denotes a maximum number of predictors to be used for direct prediction.

predIndex[i] according to the embodiments specifies a predictor index (also referred to as a prediction mode) for decoding the i-th point value of the attribute. The value of the predIndex[i] ranges from 0 to the value of the lifting_max_num_direct_predictors field.

The above-described operations of the embodiments may also be performed through elements of the point cloud transmission/reception device/method according to the embodiments described below. Each element according to the embodiments may correspond to hardware, software, a processor, and/or a combination thereof. In this embodiment, while a geometry information compression method of point cloud data is described, the method described in this specification may be applied to attribute information compression and other compression methods.

Figure 40:
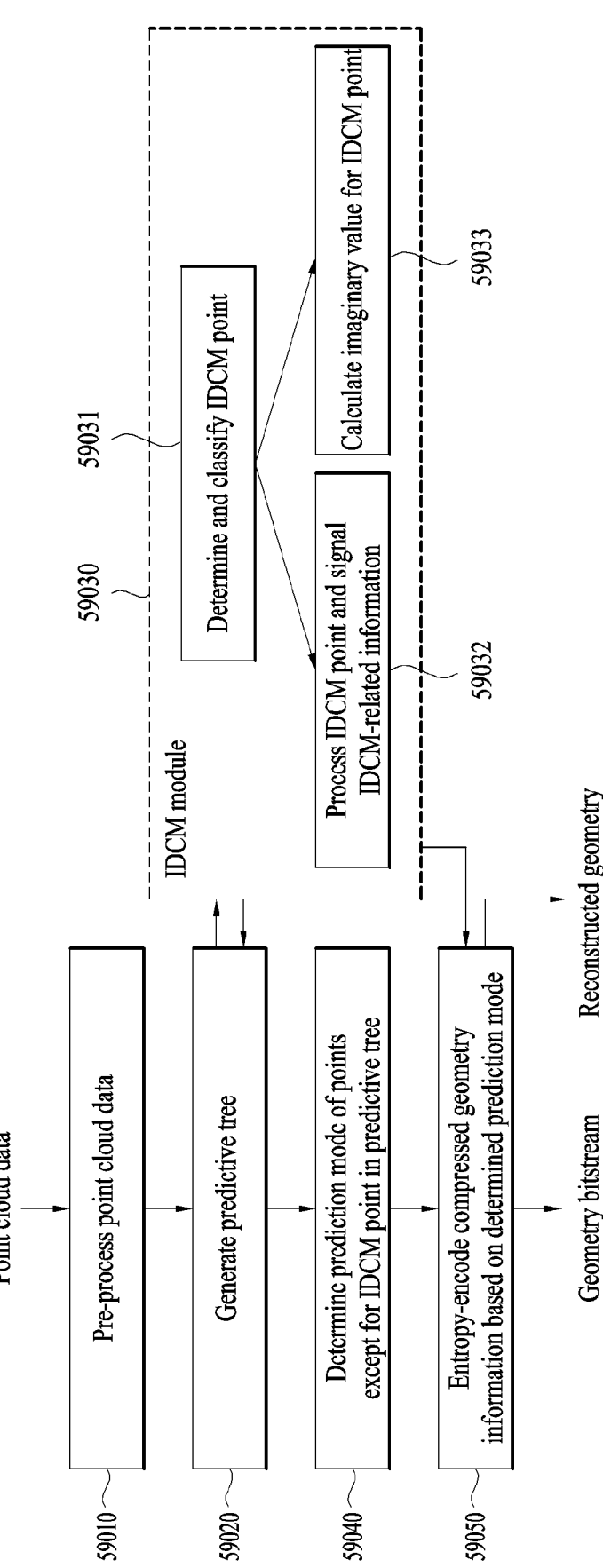
FIG. 40 is a flowchart illustrating a process of encoding geometry information based on a predictive tree according to embodiments.

FIG. 40 is a flowchart illustrating a process of encoding geometry information based on a predictive tree according to embodiments.

According to embodiments, the prediction-based geometry encoding process of FIG. 40 may be performed by the point cloud video encoder of FIG. 1, 2, 4, 12, or 15 or the prediction-based compressor of FIG. 18. The point cloud video encoder of FIG. 1, 2, 4, 12, or 15 or the prediction-based compressor of FIG. 18 may include one or more processors and one or more memories electrically and communicatively coupled with the one or more processors. In addition, the one or more processors may be configured by one or more hardware processes that are physically separated or may be configured by a combination of software and hardware or by a single hardware processor. The one or more processors according to the embodiments may be electrically and communicatively coupled. In addition, the one or more memories may be configured by one or more memories that are physically separated or by a single memory. The one or more memories according to the embodiments may store one or more programs for processing point cloud data.

That is, the point cloud video encoder or the prediction-based compressor receives point cloud data, separates the point cloud data into position (geometry) information and attribute information from each point, and performs coordinate transformation of transforming coordinates of the position information into internal coordinates capable of being coded. In addition, the encoder or the compressor performs quantization and voxelization using the transformed coordinate value of the geometry information and outputs the quantized and voxelized data to the predictive tree generator 59020 (step 59010). In addition, the voxelized point cloud data may be spatially partitioned into a compression unit such as a tile and a slice. In this specification, step 59010 may be referred to as a pre-processing process for points of the point cloud data.

According to the embodiments, since the coordinate transformation process is the same as that described in FIG. 4, a detailed description thereof will be omitted. In addition, since the quantization and voxelization processes are the same as those described in FIGS. 4 and 12, a detailed description thereof will be omitted. The spatial division is the same as that described in FIG. 15, and therefore, a detailed description thereof will be omitted.

In operation 59020, if the preprocessing process is performed on the points of the point cloud data, the encoder or the compressor organizes the points based on a specific criterion (e.g., Morton code) and generates a predictive tree based on rearranged points through organizing (step 59020). Since the predictive tree generation process is the same as that described in FIGS. 15 and 18, a detailed description thereof will be omitted.

Then, while the predictive tree is being generated or after the predictive tree is generated, the encoder or the compressor determines whether a specific point is an IDCM and performs a process of processing the point determined as the IDCM (step 59030). In the present specification, step 59030 may be referred to as an IDCM process or IDCM module.

In step 59030, the encoder or the compressor determines a point to be classified as the IDCM while the predictive tree is being generated or after the predictive tree or is generated (step 59031) and processes the determined IDCM point (step 59032). If an imaginary value is assigned instead of the position value of the determined IDCM point, the encoder or the compressor calculates the imaginary value for the IDCM point (operation 59033).

In step 59032, the encoder or the compressor generates IDCM-related information, and the IDCM-related information is transmitted to be used in step 59020 and/or 59050.

The IDCM-related information may include IDCM flag information (e.g., IDCM_flag field), IDCM determination method information (e.g., an IDCM_track_mode field), threshold information (e.g., an IDCM_threshold_low field and an IDCM_threshold_high field), imaginary value acquisition method information (e.g., an imaginary_point_prediction_mode field), IDCM slice index information (e.g., an IDCM_slice_index[ ] field), and IDCM original index information (e.g., an IDCM_original_index[ ] field). Since each field has been described in detail in FIGS. 23 to 25, a description thereof is omitted to avoid redundancy.

Since the IDCM point determination, segregation, processing, and signaling methods of the IDCM module 59030 are the same as those described in FIGS. 15 to 25, a detailed description thereof will be omitted.

For example, in the process of generating the predictive tree, if a current node (point) satisfies a criterion determined as the IDCM, the current node (point) is classified as an IDCM point, and the point is transmitted to the geometry decoder of the reception device through a separate processing/signaling process. At the same time, an imaginary point (e.g., an IDCM point or a lost point) is selected or calculated, and an imaginary value may be assigned to the imaginary point (a position at which the corresponding point is located) so that the imaginary value may be used as tree construction information of the next node (point). In this case, prediction mode information of the imaginary point is not transmitted to the reception device, and a method for calculating the imaginary value (e.g., the imaginary_point_prediction_mode field) is signaled through at least one of an SPS, a GPS, an APS, a TPS, or a geometry slice and transmitted to the reception device. According to embodiments, a threshold value may be used as a criterion for determining whether the current point is the IDCM, and the threshold value (e.g., the IDCM_threshold_low field and/or the IDCM_threshold_high field) may be applied to at least one of the SPS, the GPS, the APS, the TPS, or the geometry slice and transmitted to the reception device.

As another example, if an IDCM point is determined between a root node and a leaf node, the IDCM point may be located at the leaf node. In this case, index information (e.g., IDCM_original_index[ ] field) for identifying the position of an original point may be signaled through at least one of the SPS, the GPS, the APS, the TPS, or the geometry slice and transmitted to the reception device.

When predictive tree generation and IDCM point processing are performed in steps 59020 and 59030, prediction for the remaining points except for the IDCM point in the predictive tree is performed (step 59040). In this case, each point may be predicted by applying an optimal prediction mode (i.e., best mode) among various prediction modes (e.g., no prediction, delta prediction, linear prediction, and parallelogram) based on point positions of a parent, a grandparent, and a great-grandparent of the corresponding point. Information about the prediction mode applied to each point may be signaled and transmitted to the reception device.

Geometry information of each point compressed based on the prediction mode applied to each point (e.g., a residual value or a residual position value of each point) is entropy-encoded and output as a geometry bitstream (operation 59050).

In addition, the compressed geometry information is reconstructed and output for compression of attribute information. Since compression of the attribute information has been described in detail in FIGS. 4 to 13, a description thereof is omitted herein.

Figure 41:
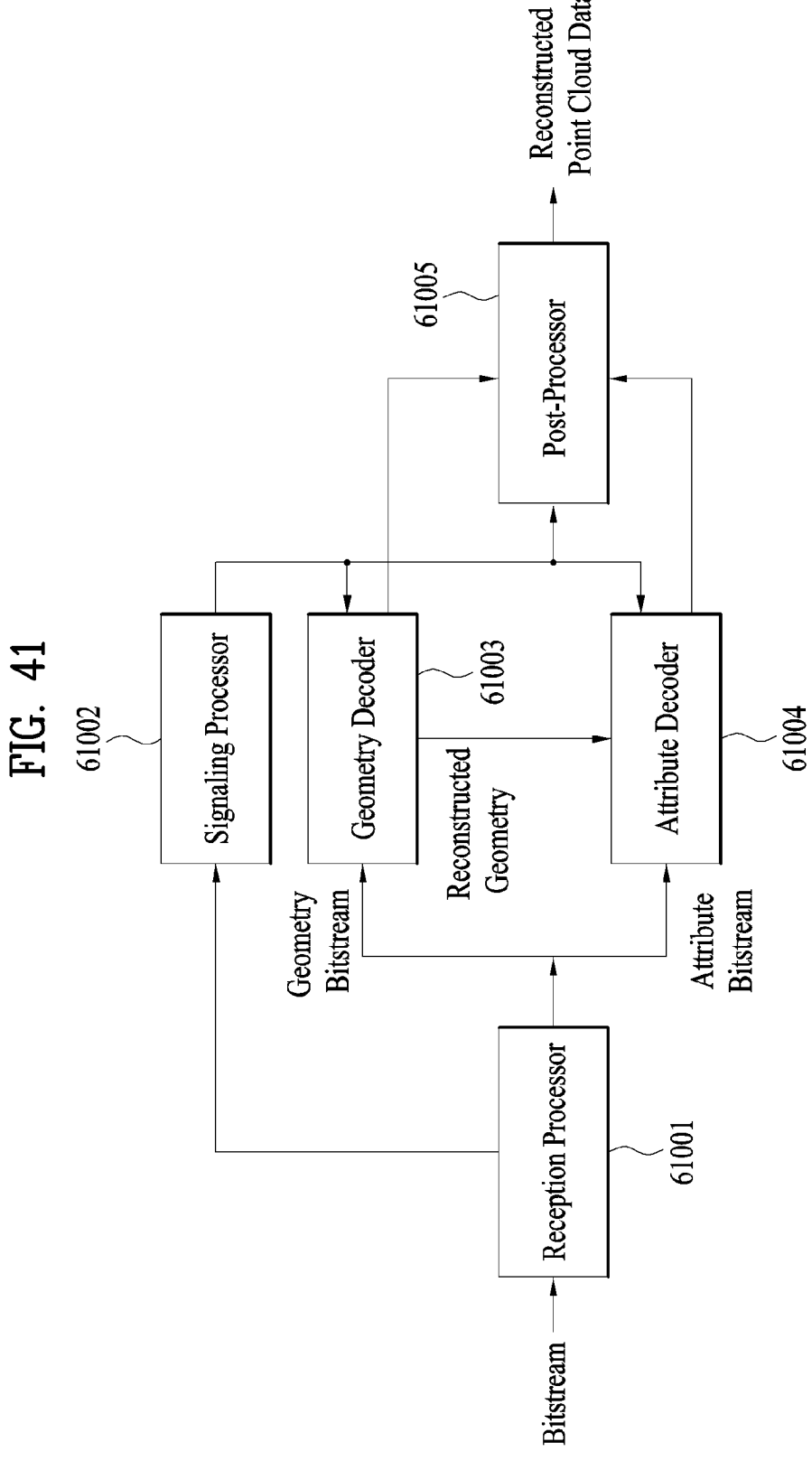
FIG. 41 is a diagram illustrating another example of a point cloud reception device according to embodiments.

FIG. 41 is a diagram illustrating another example of a point cloud reception device according to embodiments. Elements of the point cloud reception device illustrated in FIG. 41 may be implemented as hardware, software, processor(s), and/or a combination thereof.

According to embodiments, the point cloud reception device may include a reception processor 61001, a signaling processor 61002, a point cloud video decoder 61005, and a post-processor 61005.

The reception processor 61001 according to the embodiments may receive one bitstream or receive each of a geometry bitstream, an attribute bitstream, and a signaling bitstream. Upon receiving a file and/or a segment, the reception processor 61001 according to the embodiments may decapsulate the received file and/or segment and output the decapsulated file and/or segment as a bitstream.

When one bitstream is received (or decapsulated), the reception processor 61001 according to the embodiments may demultiplex the geometry bitstream, the attribute bitstream, and the signaling bitstream from one bitstream and output the demultiplexed signaling bitstream to the signaling processor 61003 and the geometry bitstream and the attribute bitstream to the point cloud video decoder 61005.

Upon receiving (or decapsulating) each of the geometry bitstream, the attribute bitstream, and the signaling bitstream, the reception processor 61001 according to the embodiments may transmit the signaling bitstream to the signaling processor 61003 and the geometry bitstream and the attribute bit stream to the point cloud video decoder 61005.

The signaling processor 61003 may parse and process signaling information, for example, information included in an SPS, a GPS, an APS, a TPS, meta data, etc., from the input signaling bitstream and provide the parsed and processed information to the point cloud video decoder 61005 and/or a post-processor 61007. As another embodiment, signaling information including IDCM-related information may also be pre-parsed by the signaling processor 61003 before corresponding slice data is decoded.

According to embodiments, the signaling processor 61003 may also parse and process the IDCM-related information signaled through at least the SPS, the GPS, the APS, the TPS, or the geometry slice and provide the parsed and processed data to the point cloud video decoder 61005 and/or post-processor 61007.

The IDCM-related information may include IDCM flag information (e.g., an IDCM_flag field), IDCM determination method information (e.g., an IDCM_track_mode field), threshold value information (e.g., an IDCM_threshold_low field and an IDCM_threshold_high field), imaginary value acquisition method information (e.g., an imaginary_point_prediction_mode field), IDCM slice index information (e.g., an IDCM_slice_index[ ] field), and IDCM original index information (e.g., an IDCM_original_index[ ] field).

According to embodiments, the point cloud video decoder 61005 may include a geometry decoder and an attribute decoder. The point cloud video decoder 61005 may reconstruct geometry information and attribute information by performing a reverse process of the geometry encoder 51006 and the attribute encoder 51007 of FIG. 15 based on signaling information for the compressed geometry bitstream and attribute bitstream. The point cloud video decoder 61005 may perform some or all of the operations described in the point cloud video decoder of FIG. 1, decoding of FIG. 2, the point cloud video decoder of FIG. 11, and the point cloud video decoder of FIG. 13.

According to embodiments, the geometry decoder of the point cloud video decoder 61005 may include a prediction-based reconstructor for reconstructing a geometry bitstream including the compressed geometry information based on prediction.

The prediction-based reconstructor may reconstruct the compressed geometry information based on prediction by performing a reverse process of the prediction-based compressor of FIG. 18 based on predictive tree-related information including the prediction mode information and the IDCM-related information.

The prediction-based reconstructor may process an IDCM point based on the IDCM-related information. The prediction-based reconstructor may perform decoding based on the IDCM-related information even when information about some points (nodes) is lost during encoding/decoding.

According to embodiments, when the transmission device assigns an imaginary value to the IDCM point in a predictive tree and transmits the imaginary value, the prediction-based reconstructor may obtain the imaginary value based on imaginary value acquisition information of the IDCM-related information. Then, after a child, a grandchild, and a great-grandchild are predicted based on the obtained imaginary value, the transmission device resets the imaginary value and positions a point (node) classified as the IDCM at a corresponding position.

According to embodiments, if there is no prediction mode information upon reconstructing the predictive tree, the prediction-based instructor calculates arbitrary position information with reference to imaginary value acquisition method information (e.g., the imaginary_point_prediction_mode field) and uses the corresponding information to predict the next node (point).

According to embodiments, the post-processor 61007 may reconstruct and display/render point cloud data based on the geometry information (i.e., positions) and the attribute information reconstructed and output from the point cloud video decoder 61005.

Although not shown in the figure, the elements of the point cloud reception device of FIG. 41 may be implemented by hardware including one or more processors or integrated circuits configured to communicate with one or more memories, software, firmware, and a combination thereof. The one or more processors may perform at least one of the operations and/or functions of the elements of the point cloud reception device of FIG. 41 described above. In addition, the one or more processors may operate or execute a set of software programs and/or instructions for performing the operations and/or functions of the elements of the point cloud reception device of FIG. 41. The one or more memories according to the embodiments may include a high-speed random access memory or include a non-volatile memory (e.g., one or more magnetic disk storage devices, flash memory devices, or other non-volatile solid-state memory devices).

Figure 42:
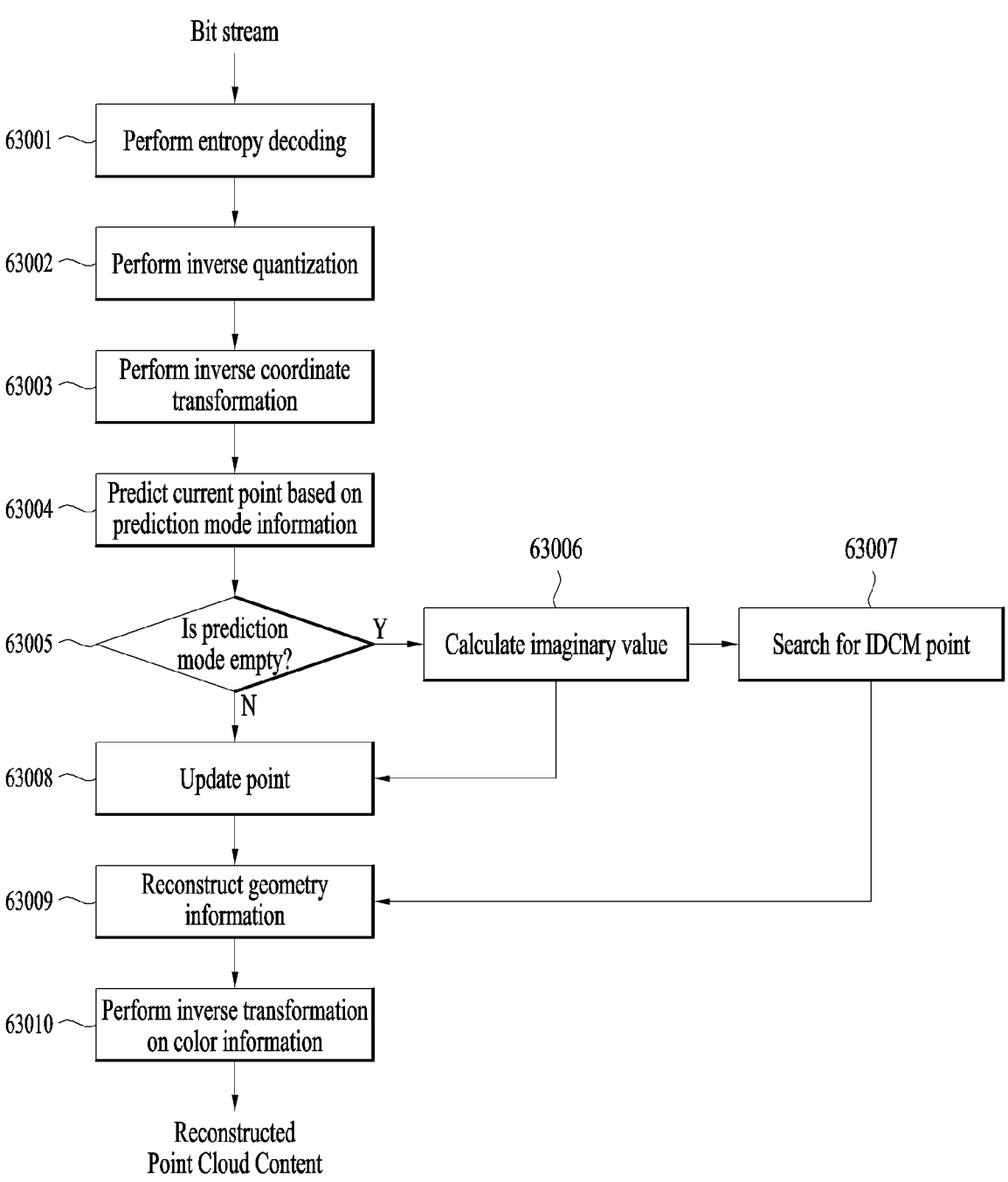
FIG. 42 is a flowchart illustrating a process of decoding geometry information based on a predictive tree according to embodiments.

FIG. 42 is a flowchart illustrating a process of decoding geometry information based on a predictive tree according to embodiments.

According to embodiments, the prediction-based geometry decoding process may be performed by the point cloud video decoder of FIG. 1, 2, 11, 13, or 41. To decode the point cloud data, the point cloud video decoder of FIG. 1, 2, 11, 13, or 41 may include one or more processors and one or more memories electrically and communicatively coupled with the one or more processors. In addition, the one or more processors may be configured by one or more hardware processes that are physically separated or may be configured by a combination of software and hardware or by a single hardware processor. The one or more processors according to the embodiments may be electrically and communicatively coupled. In addition, the one or more memories may be configured by one or more memories that are physically separated or by a single memory. The one or more memories according to the embodiments may store one or more programs for processing the point cloud data.

According to embodiments, when a geometry bitstream is input, entropy decoding is performed in a reverse process of the transmission device (step 63001). That is, residual values (or residual position values) for geometry information included in the geometry bitstream are entropy-decoded. Then, inverse quantization and inverse coordinate transform are performed on the entropy-decoded residuals (steps 63002 and 63003).

When steps 63001 to 63003 are performed, the residual values, which are prediction errors for each point, are reconstructed to reconstruct the structure of an original point cloud.

Then, prediction of a current point is performed based on prediction mode information included in predictive tree-related information (step 63004).

That is, since the structure of a predictive tree (also referred to as a predictive geometry tree) is the same as the coding order of the transmission device, a separate structure is not required, and prediction of a corresponding point is performed according to the prediction mode information signaled through the predictive tree-related information. If there is a point having no prediction mode during prediction (step 63005), an imaginary value is calculated based on an imaginary value acquisition method included in IDCM-related information (step 63006), and the corresponding point is updated based on the imaginary value. (step 63008). At the same time, an IDCM point (also referred to as an original point or a real point) corresponding to a position of an imaginary point is searched for in an IDCM group based on the IDCM-related information (step 63007). In addition, when geometry information of each point is restored (i.e., reconstructed) based on the predicted value performed in step 63004, the IDCM point found in step 63007 replaces the imaginary point value (step 63009).

When the geometry information is fully reconstructed in step 63009, color information is inversely transformed to include attribute information at a corresponding position, and the reconstructed point cloud content is delivered to the renderer (step 63010).

Figure 43:
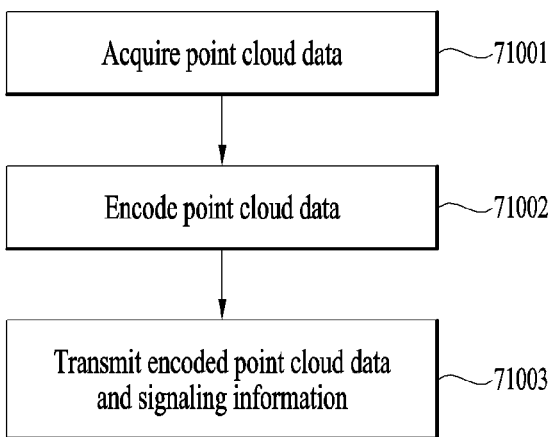
FIG. 43 is a flowchart of a point cloud data transmission method according to embodiments.

FIG. 43 is a flowchart of a point cloud data transmission method according to embodiments.

The point cloud data transmission method according to embodiments may include acquiring point cloud data (71001), encoding the point cloud data (71002), and transmitting the encoded point cloud data and signaling information (71003). In this case, a bitstream including the encoded point cloud data and the signaling information may be encapsulated in a file and transmitted.

Step 71001 of acquiring the point cloud data may perform some or all of the operations of the point cloud video acquisition unit 10001 of FIG. 1 or some or all of the operations of the data input unit 12000 of FIG. 12.

Step 71002 of encoding the point cloud data may perform some or all of the operations of the point cloud video encoder 10002 of FIG. 1, encoding 20001 of FIG. 2, the point cloud video encoder of FIG. 4, the point cloud video encoder of FIG. 12, and the point cloud video encoder of FIG. 15.

Step 71002 of encoding the point cloud data according to embodiments may include compressing geometry information based on a predictive tree, as described above with reference to FIGS. 15 to 40. In particular, for details of determining a point to be classified as an IDCM while the predictive tree is being generated or after a predictive tree is generated, and processing the point classified as the IDCM, refer to a description of FIGS. 15 to 40.

In this specification, the signaling information may be an SPS, a GPS, an APS, a TPS, metadata, and the like, and a geometry slice header may also be referred to as the signaling information. The predictive tree-related information for compressing the geometry information based on a predictive tree may include a prediction mode and IDCM-related information and may be signaled through at least one of the SPS, the GPS, the APS, the TPS, or the geometry slice. Since the predictive tree-related information has been described in detail above, a description thereof will be omitted.

Figure 44:
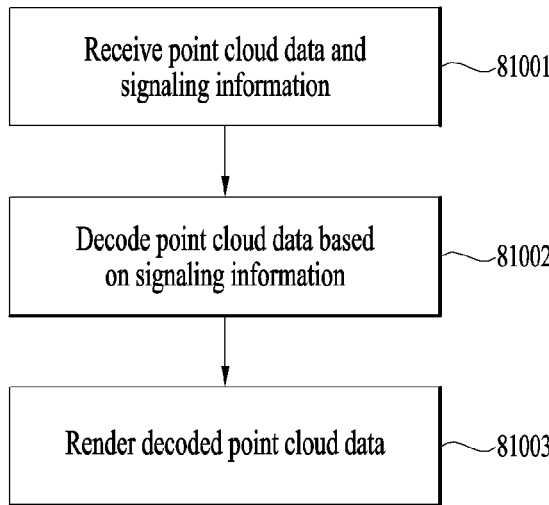
FIG. 44 is a flowchart of a point cloud data reception method according to embodiments.

FIG. 44 is a flowchart of a point cloud data reception method according to embodiments.

The point cloud data reception method according to embodiments may include receiving encoded point cloud data and signaling information (81001), decoding the point cloud data based on the signaling information (81002), and rendering the decoded point cloud data (81003).

Step 81001 of receiving the point cloud data and the signaling information according to the embodiments may be performed by the receiver 10005 of FIG. 1, transmission 20002 or decoding 20003 of FIG. 2, the receiver 13000 or the reception processor 13001 of FIG. 13.

The signaling information may be an SPS, a GPS, an APS, a TPS, or metadata, and a geometry slice header may also be referred to as the signaling information. At least one of the SPS, the GPS, the APS, the TPS, or the geometry slice may include predictive tree-related information including prediction mode information and IDCM-related information. Since the predictive tree-related information has been described in detail above, a description thereof will be omitted herein.

Step 81002 of decoding point cloud data according to embodiments may perform some or all of the operations of the point cloud video decoder 10006 of FIG. 1, decoding 20003 of FIG. 2, the point cloud video decoder of FIG. 11, the point cloud video decoder of FIG. 13, and the geometry video decoder 61003 and the attribute decoder 61004 of FIG. 41.

In step 81002 of decoding the point cloud data according to the embodiments, geometry information may be reconstructed based on a predictive tree as described above with reference to FIGS. 15 to 42. For details of reconstructing the predictive tree-based geometry information, processing an IDCM point, and reconstructing attribute information, refer to a description of FIGS. 15 to 42.

In step 81003 of performing rendering according to the embodiments, the point cloud data may be reconstructed based on the restored (or reconstructed) geometry information and the attribute information and rendered according to various rendering methods. For example, points of the point cloud content may be rendered to a vertex having a certain thickness, a cube having a specific minimum size centered at a vertex position, or a circle centered at the vertex position. All or some regions of the rendered point cloud content are provided to a user through a display (e.g., a VR/AR display or a general display). Step 81003 of rendering the point cloud data according to the embodiments may be performed by the renderer 10007 of FIG. 1, rendering 20004 of FIG. 2, or the renderer 13011 of FIG. 13.

The point cloud data transmission method and transmission device according to the embodiments may efficiently compress the point cloud data within a short time based on a predictive coding operation according to the above-described embodiments and transmit the compressed point cloud data to the reception device through signaling. Similarly, the reception method and reception device according to the embodiments have an effect of efficiently reconstructing the geometry data and/or the attribute data based on the signaling information.

The point cloud data transmission method, the transmission device, the point cloud data reception method, and the reception device according to the embodiments may reduce errors in predictive values when processing points based on a predictive tree, process lost points, classify and manage the points, and efficiently process information without the burden of a system.

Each part, module, or unit described above may be a software, processor, or hardware part that executes successive procedures stored in a memory (or storage unit). Each of the steps described in the above embodiments may be performed by a processor, software, or hardware parts. Each module/block/unit described in the above embodiments may operate as a processor, software, or hardware. In addition, the methods presented by the embodiments may be executed as code. This code may be written on a processor readable storage medium and thus read by a processor provided by an apparatus.

In the specification, when a part "comprises" or "includes" an element, it means that the part further comprises or includes another element unless otherwise mentioned. Also, the term " . . . module (or unit)" disclosed in the specification means a unit for processing at least one function or operation, and may be implemented by hardware, software or combination of hardware and software.

Although embodiments have been explained with reference to each of the accompanying drawings for simplicity, it is possible to design new embodiments by merging the embodiments illustrated in the accompanying drawings. If a recording medium readable by a computer, in which programs for executing the embodiments mentioned in the foregoing description are recorded, is designed by those skilled in the art, it may fall within the scope of the appended claims and their equivalents.

The apparatuses and methods may not be limited by the configurations and methods of the embodiments described above. The embodiments described above may be configured by being selectively combined with one another entirely or in part to enable various modifications.

Although preferred embodiments have been described with reference to the drawings, those skilled in the art will appreciate that various modifications and variations may be made in the embodiments without departing from the spirit or scope of the disclosure described in the appended claims. Such modifications are not to be understood individually from the technical idea or perspective of the embodiments.

Various elements of the apparatuses of the embodiments may be implemented by hardware, software, firmware, or a combination thereof. Various elements in the embodiments may be implemented by a single chip, for example, a single hardware circuit. According to embodiments, the components according to the embodiments may be implemented as separate chips, respectively. According to embodiments, at least one or more of the components of the apparatus according to the embodiments may include one or more processors capable of executing one or more programs. The one or more programs may perform any one or more of the operations/methods according to the embodiments or include instructions for performing the same. Executable instructions for performing the method/operations of the apparatus according to the embodiments may be stored in a non-transitory CRM or other computer program products configured to be executed by one or more processors, or may be stored in a transitory CRM or other computer program products configured to be executed by one or more processors. In addition, the memory according to the embodiments may be used as a concept covering not only volatile memories (e.g., RAM) but also nonvolatile memories, flash memories, and PROMs. In addition, it may also be implemented in the form of a carrier wave, such as transmission over the Internet. In addition, the processor-readable recording medium may be distributed to computer systems connected over a network such that the processor-readable code may be stored and executed in a distributed fashion.

In this document, the term "/" and "," should be interpreted as indicating "and/or." For instance, the expression "A/B" may mean "A and/or B." Further, "A, B" may mean "A and/or B." Further, "A/B/C" may mean "at least one of A, B, and/or C." "A, B, C" may also mean "at least one of A, B, and/or C." Further, in the document, the term "or" should be interpreted as "and/or." For instance, the expression "A or B" may mean 1) only A, 2) only B, and/or 3) both A and B. In other words, the term "or" in this document should be interpreted as "additionally or alternatively."

Various elements of the embodiments may be implemented by hardware, software, firmware, or a combination thereof. Various elements in the embodiments may be executed by a single chip such as a single hardware circuit. According to embodiments, the element may be selectively executed by separate chips, respectively. According to embodiments, at least one of the elements of the embodiments may be executed in one or more processors including instructions for performing operations according to the embodiments.

The operations according to the embodiments described in this document may be performed by a transmission/reception device including one or more memories and/or one or more processors according to the embodiments. The one or more memories may store programs for processing/controlling the operations according to the embodiments, and the one or more processors may control the various operations described in this document. The one or more processors may be referred to as a controller or the like. The operations according to the embodiments may be performed by firmware, software, and/or a combination thereof. The firmware, software, and/or combination thereof may be stored in the processors or the memories.

Terms such as first and second may be used to describe various elements of the embodiments. However, various components according to the embodiments should not be limited by the above terms. These terms are only used to distinguish one element from another. For example, a first user input signal may be referred to as a second user input signal. Similarly, the second user input signal may be referred to as a first user input signal. Use of these terms should be construed as not departing from the scope of the various embodiments. The first user input signal and the second user input signal are both user input signals, but do not mean the same user input signal unless context clearly dictates otherwise.

The terminology used to describe the embodiments is used for the purpose of describing particular embodiments only and is not intended to be limiting of the embodiments. As used in the description of the embodiments and in the claims, the singular forms "a", "an", and "the" include plural referents unless the context clearly dictates otherwise. The expression "and/or" is used to include all possible combinations of terms. The terms such as "includes" or "has" are intended to indicate existence of figures, numbers, steps, elements, and/or components and should be understood as not precluding possibility of existence of additional existence of figures, numbers, steps, elements, and/or components. As used herein, conditional expressions such as "if" and "when" are not limited to an optional case and are intended to be interpreted, when a specific condition is satisfied, to perform the related operation or interpret the related definition according to the specific condition.

Mode for Carrying Out the Disclosure

As described above, related contents have been described in the best mode for carrying out the embodiments.

INDUSTRIAL APPLICABILITY

As described above, the embodiments may be fully or partially applied to the point cloud data transmission/reception device and system. It will be apparent to those skilled in the art that variously changes or modifications may be made to the embodiments within the scope of the embodiments. Thus, it is intended that the embodiments cover the modifications and variations of this disclosure provided they come within the scope of the appended claims and their equivalents.

The invention claimed is:

1. A point cloud data encoding method, comprising:
acquiring point cloud data;
encoding geometry information including positions of points of the point cloud data based on an octree or a predictive tree;
encoding attribute information including attribute values of the points of the point cloud data based on the geometry information; and
transmitting the encoded geometry information, the encoded attribute information, and signaling information,
wherein the encoding the geometry information based on the predictive tree comprises:
generating the predictive tree based on the points of the point cloud data, and
compressing positions of points in the predictive tree by performing prediction on the positions of the points in the predictive tree based on one of a first prediction mode, a second prediction mode or a third prediction mode,
wherein traversal of the predictive tree is in depth-first order,
wherein the first prediction mode predicts a position of a current point based on a position of a parent node,
wherein the second prediction mode predicts the position of the current point based on a position derived by doubling the position of the parent node and subtracting a position of a grandparent node, and
wherein the third prediction mode predicts the position of the current point based on a position derived by adding the position of the parent node and the position of the grandparent node, and subtracting a position of a great-grandparent node.

2. The point cloud data encoding method of claim 1, wherein the generating the predictive tree further includes determining at least one inferred direct coding mode (IDCM) point to which a direct coding mode is to be applied from the predictive tree.

3. The point cloud data encoding method of claim 2, wherein the determining the IDCM includes determining the current point as the at least one IDCM point based on a difference between an average value of distances of points in a parent and child relationship from a parent node of the current point to a root node while the predictive tree is being generated and a distance between the current point and a parent point of the current point being greater than a preset threshold.

4. The point cloud data encoding method of claim 2, wherein the determining the IDCM includes positioning the at least one IDCM point at a leaf node based on the at least one IDCM point being positioned between a root node and the leaf node in the predictive tree.

5. The point cloud data encoding method of claim 2, wherein the determining the IDCM includes calculating an imaginary value to be allocated to the determined at least one IDCM point and allocating the imaginary value to the determined at least one IDCM point.

6. A point cloud data encoding device, comprising:
an acquirer configured to acquire point cloud data;
a geometry encoder configured to encode geometry information including positions of points of the point cloud data based on an octree or a predictive tree;
an attribute encoder configured to encode attribute information including attribute values of the points of the point cloud data based on the geometry information; and
a transmitter configured to transmit the encoded geometry information, the encoded attribute information, and signaling information,
wherein the geometry encoder based on the predictive tree includes:
a predictive tree generator configured to generate the predictive tree based on the points of the point cloud data, and
a compressor configured to compress positions of points in the predictive tree by performing prediction on the positions of the points in the predictive tree based on one of a first prediction mode, a second prediction mode or a third prediction mode,
wherein traversal of the predictive tree is in depth-first order,
wherein the first prediction mode predicts a position of a current point based on a position of a parent node,
wherein the second prediction mode predicts the position of the current point based on a position derived by doubling the position of the parent node and subtracting a position of a grandparent node, and
wherein the third prediction mode predicts the position of the current point based on a position derived by adding the position of the parent node and the position of the grandparent node, and subtracting a position of a great-grandparent node.

7. The point cloud data encoding device of claim 6, wherein the predictive tree generator determines at least one inferred direct coding mode (IDCM) point to which a direct coding mode is to be applied from the predictive tree.

8. The point cloud data encoding device of claim 7, wherein the predictive tree generator determines the current point as the at least one IDCM point based on a difference between an average value of distances of points in a parent and child relationship from a parent node of the current point to a root node while the predictive tree is being generated and a distance between the current point and a parent point of the current point being greater than a preset threshold.

9. The point cloud data encoding device of claim 7, wherein the predictive tree generator positions the at least one IDCM point at a leaf node based on the at least one IDCM point being positioned between a root node and the leaf node in the predictive tree.

10. The point cloud data encoding device of claim 7, wherein the predictive tree generator calculates an imaginary value to be allocated to the determined at least one IDCM point and allocates the imaginary value to the determined at least one IDCM point.

11. A point cloud data decoding method, comprising:
receiving geometry information, attribute information, and signaling information;
decoding the geometry information based on an octree or a predictive tree to derive positions of points; and
decoding the attribute information based on the signaling information and the geometry information to derive attribute values of the points,
wherein the decoding the geometry information based on the predictive tree derives the positions of the points by performing prediction in the predictive tree based on one of a first prediction mode, a second prediction mode or a third prediction mode,
wherein traversal of the predictive tree is in depth-first order,
wherein the first prediction mode predicts a position of a current point based on a position of a parent node,
wherein the second prediction mode predicts the position of the current point based on a position derived by doubling the position of the parent node and subtracting a position of a grandparent node, and
wherein the third prediction mode predicts the position of the current point based on a position derived by adding the position of the parent node and the position of the grandparent node, and subtracting a position of a great-grandparent node.

12. The point cloud data decoding method of claim 11, wherein the decoding the geometry information includes identifying at least one inferred direct coding mode (IDCM) point to which a direct coding mode is to be applied among the points based on the signaling information.

13. The point cloud data decoding method of claim 12, wherein the decoding the geometry information includes restoring the at least one IDCM point to an original point based on the signaling information.

14. The point cloud data decoding method of claim 12, wherein the decoding the geometry information includes performing prediction based on an imaginary value allocated to a position of the at least one IDCM point based on the signaling information.

15. The point cloud data decoding method of claim 11, wherein the signaling information includes at least one of IDCM determination-related information, imaginary value-related information, threshold value-related information, or index-related information.

16. A point cloud data decoding device, comprising:
a receiver configured to receive geometry information, attribute information, and signaling information;
a geometry decoder configured to decode the geometry information based on an octree or a predictive tree to derive positions of points; and
an attribute decoder configured to decode the attribute information based on the signaling information and the geometry information to derive attribute values of the points,
wherein the geometry decoder based on the predictive tree derives the positions of the points by performing prediction in the predictive tree based on one of a first prediction mode, a second prediction mode or a third prediction mode, wherein traversal of the predictive tree is in depth-first order, wherein the first prediction mode predicts a position of a current point based on a position of a parent node, wherein the second prediction mode predicts the position of the current point based on a position derived by doubling the position of the parent node and subtracting a position of a grandparent node, and wherein the third prediction mode predicts the position of the current point based on a position derived by adding the position of the parent node and the position of the grandparent node, and subtracting a position of a great-grandparent node.

17. The point cloud data decoding device of claim 16, wherein the geometry decoder identifies at least one inferred direct coding mode (IDCM) point to which a direct coding mode is to be applied among the points based on the signaling information.

18. The point cloud data decoding device of claim 17, wherein the geometry decoder restores the at least one IDCM point to an original point based on the signaling information.

19. The point cloud data decoding device of claim 17, wherein the geometry decoder performs prediction based on an imaginary value allocated to a position of the at least one IDCM point based on the signaling information.

20. The point cloud data decoding device of claim 16, wherein the signaling information includes at least one of IDCM determination-related information, imaginary value-related information, threshold value-related information, or index-related information.

* * * * *